US010054929B1

(12) United States Patent
George

(10) Patent No.: US 10,054,929 B1
(45) Date of Patent: Aug. 21, 2018

(54) INTELLIGENT MACHINE TOOLS

(71) Applicant: Accenture Global Solutions Limited

(72) Inventor: Michael L. George, Dallas, TX (US)

(73) Assignee: Accenture Global Solutions Limited, Dublin (IE)

( * ) Notice: Subject to any disclaimer, the term of this patent is extended or adjusted under 35 U.S.C. 154(b) by 313 days.

(21) Appl. No.: 15/056,024

(22) Filed: Feb. 29, 2016

Related U.S. Application Data

(60) Provisional application No. 62/187,986, filed on Jul. 2, 2015, provisional application No. 62/273,645, filed on Dec. 31, 2015.

(51) Int. Cl.
*G06Q 10/06* (2012.01)
*G05B 19/402* (2006.01)

(52) U.S. Cl.
CPC .. *G05B 19/402* (2013.01); *G05B 2219/31412* (2013.01)

(58) Field of Classification Search
CPC ............. G06Q 10/06; G06Q 10/06313; G06Q 10/0833; G06Q 10/08
See application file for complete search history.

(56) References Cited

U.S. PATENT DOCUMENTS

| 5,819,232 A * | 10/1998 | Shipman ................ G06Q 10/04 705/7.24 |
| 5,838,568 A * | 11/1998 | Dickinson .......... G01R 31/2817 700/121 |
| 8,229,691 B2 * | 7/2012 | Behm .............. G05B 19/41865 438/14 |
| 2002/0026257 A1 * | 2/2002 | Newmark ........ G05B 19/41805 700/108 |
| 2002/0198629 A1 * | 12/2002 | Ellis ........................ G06Q 10/06 700/286 |
| 2003/0033040 A1 * | 2/2003 | Billings ............... G05B 13/021 700/97 |
| 2004/0158338 A1 * | 8/2004 | Mammoser ........... G06Q 10/04 700/96 |

(Continued)

*Primary Examiner* — Jaehwan Oh
(74) *Attorney, Agent, or Firm* — Fish & Richardson P.C.

(57) ABSTRACT

Methods and systems for generating sensor data, wherein the sensor data includes measured transit time information for items flowing through a work process, accessing a set of control data for one or more machine tool workstations and accounting data for the work process, calculating a standard deviation of the measured transit time information, calculating an achievable minimum WIP for at least one of the workstations using current values of workstation performance parameters, receiving input including: information identifying process improvement projects and corresponding predictive performance parameter values, and information identifying resources available for process improvement, for the at least one of the workstations: determining an achievable minimum WIP using the corresponding predictive performance parameter values, determining a reduction in minimum WIP based on the difference between the achievable minimum WIP for the current performance parameter values and the predictive performance parameter values, and determining one or more process efficiency improvements.

19 Claims, 5 Drawing Sheets

(56) References Cited

U.S. PATENT DOCUMENTS

| | | | | |
|---|---|---|---|---|
| 2004/0260592 | A1* | 12/2004 | George | G06Q 10/06 705/7.31 |
| 2005/0154625 | A1* | 7/2005 | Chua | G06Q 10/06 700/100 |
| 2005/0177260 | A1* | 8/2005 | Schweizerhof | G06Q 10/06 700/97 |
| 2008/0235067 | A1* | 9/2008 | George | G06Q 10/06 705/7.31 |
| 2010/0249974 | A1* | 9/2010 | Fei | G05B 21/02 700/105 |
| 2011/0246257 | A1* | 10/2011 | Meade | G06Q 10/06 705/7.27 |
| 2012/0123583 | A1* | 5/2012 | Hazen | G05B 15/02 700/110 |
| 2015/0347949 | A1* | 12/2015 | Dwyer | G06Q 10/06393 705/7.39 |

\* cited by examiner

INTELLIGENT MACHINE TOOLS

CROSS-REFERENCE TO RELATED APPLICATIONS

This application claims the benefit of U.S. Provisional Application No. 62/187,986, filed Jul. 2, 2015, and titled "Sensor-Based Controller," and U.S. Provisional Application No. 62/273,645, filed Dec. 31, 2015, and titled "Sensor-Based Controller." Both of these prior applications are incorporated by reference in their entirety.

TECHNICAL FIELD

This description generally relates to controlling operations of machine tools based on sensor data.

BACKGROUND

Machine shops include machine tools to manufacture parts that may be sold in the machine industry, car industry, aircraft industry or others. Machines tools are used for shaping or machining metals or other rigid materials to make the manufactured parts through cutting, boring, grinding, shearing or other methods of deformation. Machine shops may contain raw materials, such as bar stock for machining, which are processed by machine tools to create an inventory of finished parts. Finished parts are work pieces that meet specifications set out for the work piece by engineering drawings or blue prints.

SUMMARY

A machining process, or work process, is a process in which a piece of raw material is cut or otherwise deformed into a desired final shape and size by a controlled process, such as a controlled material removal process or a controlled material addition process. The controlled process may include one or more sub processes, e.g., machining operations, each of which being capable of receiving a work part and processing the work part to generate a certain part geometry and surface texture.

An example machining operation is turning, whereby a cutting tool with a cutting edge is used to remove material from a rotating work piece to generate a cylindrical shape. The primary motion is provided by rotating the work piece and the feed motion is achieved by moving the cutting tool slowly in a direction parallel to the axis of rotation of the work piece. The primary motion is accomplished at a cutting speed, and the feed motion is accomplished at a feed rate. A further dimension of the cut is the depth of cut. Collectively, speed, feed and depth form a set of controllable parameters for the machining process that may be adjusted, for example based on the type of material being cut.

A process efficiency improvement may be implemented in a system of machine tool workstations used in a work process. One or more sensors can monitor the machine tool workstations and work process and generate a set of sensor data, including a measured transit time for parts, or items, flowing through the work process. The sensor data may be used to determine a current average efficiency for each machine tool workstation, which may be compared with an average efficiency after a realizable process improvement is implemented. Based on the sensor data and the compared efficiencies, an accurate prediction of and means of achieving one or more optimal process efficiency improvements may be determined and subsequently implemented.

Innovative aspects of the subject matter described in this specification may be embodied in systems that include a collection of machine tool workstations used in a work process, wherein each workstation is associated with a set of performance parameters and one or more of the machine tool workstations comprise (i) a cutting tool, (ii) a drilling machine, (iii) a lathe, (iv) a boring machine or (v) a grinding machine; one or more sensors, the one or more data sensors: in data communication with each other, and performing operations comprising: generating a set of sensor data, wherein the sensor data includes measured transit time information for items flowing through the work process, accessing a set of production control data for each workstation and a set of accounting data for the work process, calculating a standard deviation of the measured transit time information, and calculating an achievable minimum work in progress (WIP) for each workstation using current values of performance parameters; receiving input including (i) information identifying process improvement projects and corresponding predictive performance parameter values, and (ii) information identifying resources available for process improvement; for each workstation (i) determining an achievable minimum WIP using the corresponding predictive performance parameter values, and (ii) determining a reduction in minimum WIP based on the difference between the achievable minimum WIP for the current values of performance parameters and the predictive performance parameter values; and determining one or more process efficiency improvements associated with the determined reductions in minimum WIP, the accounting data and the calculated standard deviation.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the one or more sensors in data communication with each other perform operations further comprising implementing one or more of the determined process efficiency improvements.

In some implementations one or more of the determined process efficiency improvements includes increasing a number of units produced per unit time by a cutting tool in the collection of machine tool workstations used in the work process and implementing one or more of the determined process efficiency improvements includes adjusting the feed rate of the cutting tool.

In some cases adjusting the feed rate of the cutting tool includes adjusting one or more of (i) a desired surface finish of an item processed by the cutting tool, (ii) power available to the cutting tool, (iii) threads per inch (TPI) for threading tools included in the cutting tool, or (iv) rigidity of the cutting tool.

In other implementations the performance parameters include one or more of setup time, number of different part numbers, units produced per unit time, scrap percentage, machining time per unit, and machine downtime.

In some cases the production control data is data relating to one or more of the performance parameters.

In other cases the accounting data for the work process is data relating to overhead costs and labor costs for the work process.

In some implementations determining one or more process efficiency improvements associated with the determined reductions in minimum WIP, the accounting data and the calculated standard deviation comprises: determining a total WIP prior to a process efficiency improvement based on the set of sensor data; defining one or more histograms of K bins that represent, for one or more respective randomly selected items of WIP flowing through the work process, probability distributions that assign a probability to the velocities of the items; for each combination of determined reductions in minimum WIP for one or more corresponding workstations: subtracting the combined one or more determined reductions in minimum WIP for one or more corresponding workstations from the determined total WIP prior to process efficiency improvement; determining a process efficiency improvement using:

$$\text{process efficiency improvement} = \$\mu_{(L+O)B}\sigma_{\tau B}\sqrt{2}D(\hat{p}_{WA}|\hat{p}_{WB})$$

wherein $\$\mu_{(L+O)B}$ represents labor and overhead expended per month prior to process efficiency improvement; $\sigma_{\tau B}$ represents the calculated standard deviation; D represents a relative entropy $$D(\hat{p}_{WA}|\hat{p}_{WB}) = \sum_{j=1}^{K} \hat{p}_{WA_j} \log \frac{\hat{p}_{WA_j}}{\hat{p}_{WB_j}},$$

and $\hat{p}_{WA_j} = \frac{1}{2}(n_{Bj}\bar{b}_j/W_B)$, $\hat{p}_{WB_j} = \frac{1}{2}(n_{Aj}\bar{b}_j/W_A)$, wherein $W_B$ represents the total WIP prior to process efficiency improvement, $W_A$ represents the total WIP prior to process efficiency improvement minus the combined one or more determined reductions in minimum WIP for one or more corresponding workstations, K is a number of histogram bins, $n_{Bj}\bar{b}_j$ represents an amount of WIP prior to process efficiency improvement in the j-th bin, and $n_{Aj}\bar{b}_j$ represents an amount of WIP prior to process efficiency improvement minus the combined one or more determined reductions in minimum WIP for one or more corresponding workstations in the j-th bin.

In further implementations $\hat{p}_{WA_j}$ and $\hat{p}_{WB_j}$ are distributed according to the Maxwell-Boltzmann distribution.

In other implementations the system further comprises a thermodynamic model configured to determine the one or more process efficiency improvements for the process, the process efficiency improvements being derived from thermodynamic principles.

In some cases the thermodynamic model includes a conversion factor $\beta$ that is given by $$\left(\frac{1}{\beta}\right) = \$\mu^2_{(L+O)B}\sigma_\tau\sqrt{2}$$

wherein $\$\mu_{(L+O)B}$ represents labor and overhead expended per month prior to process efficiency improvement, and $\sigma_{\tau B}$ represents the standard deviation of the measured transit time information prior to process improvement.

In other cases the process efficiency improvement is derived from thermodynamic free energy.

In some implementations the thermodynamic model is derived from manufacturing entropy.

In some implementations the manufacturing entropy is derived from Little's Law and comprises a Shannon entropy and an entropy of scale.

In some cases the thermodynamic model is derived from maximizing the Shannon entropy.

In other cases calculating an achievable minimum work in progress (WIP) for each workstation comprises calculating an achievable minimum WIP for each workstation using $$W_{MIN} \cong \frac{SQm}{2(1 - X - m(\tilde{P}/(1-M)))} + Q$$

wherein S represents the workstation setup time, Q represents the workstation number of different part numbers, m represents the units produced by the workstation per unit time, X represents the workstation scrap percentage, $\tilde{P}$ represents the workstation machining time per unit, and M represents the machine downtime.

In some implementations calculating an achievable minimum work in progress (WIP) for each workstation comprises calculating an achievable minimum WIP for each workstation using $$W_{MIN} \cong \frac{SQm}{2(1 - X - m(\tilde{P}/(1-M)))} + Q + m\tau_t$$

wherein S represents the workstation setup time, Q represents the workstation number of different part numbers, m represents the units produced by the workstation per unit time, X represents the workstation scrap percentage, $\tilde{P}$ represents the workstation machining time per unit, M represents the machine downtime, and $\tau_t$ represents the average time WIP is in transit between workstations.

The details of one or more embodiments of the subject matter described in this specification are set forth in the accompanying drawings and the description below. Other potential features, aspects, and advantages of the subject matter will become apparent from the description, the drawings, and the claims.

DETAILED DESCRIPTION

Within work processes are costs resulting from inefficiencies and waste. Investing in process improvement may reduce the costs and increase growth. However, a quantitative, predictive method for determining potential process efficiency improvements and measuring a reduction in costs resulting from such potential process efficiency improvements, is generally not available.

This specification describes a system for determining one or more process efficiency improvements and a corresponding prioritization of process efficiency improvement projects. One or more sensors measure a transit time for items flowing through a work process and use the determined transit times to provide a process efficiency improvement associated with a reduction in a achievable minimum work in progress for the process. Based on the resources available for implementing a process efficiency improvement, the system determines an optimal prioritization of process efficiency improvement projects that modify the process and result in an improved, more efficient process.

Figure 1A:
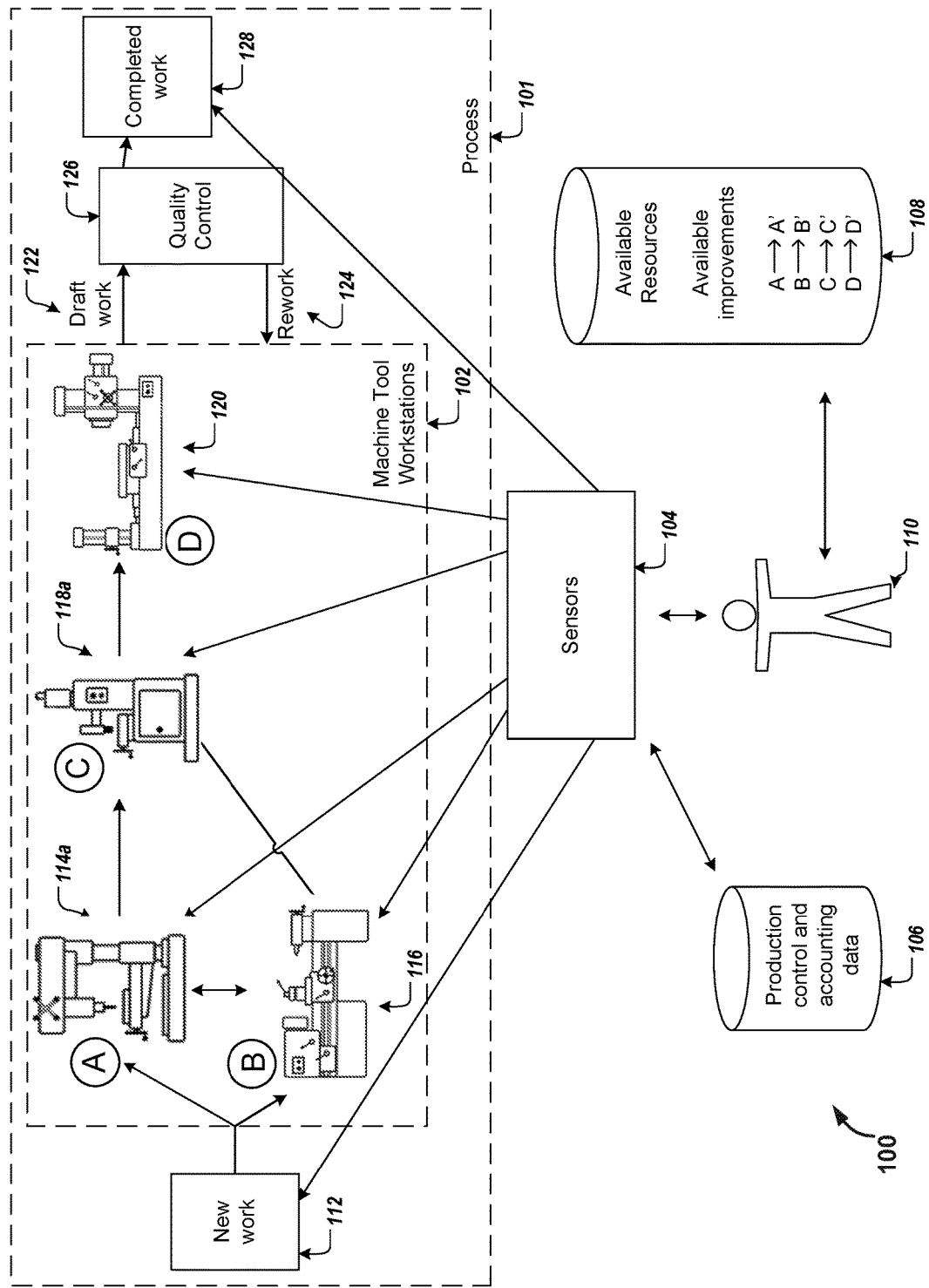
FIGS. 1A and 1B depict an example system before and after an example process efficiency improvement.
Figure 1B:
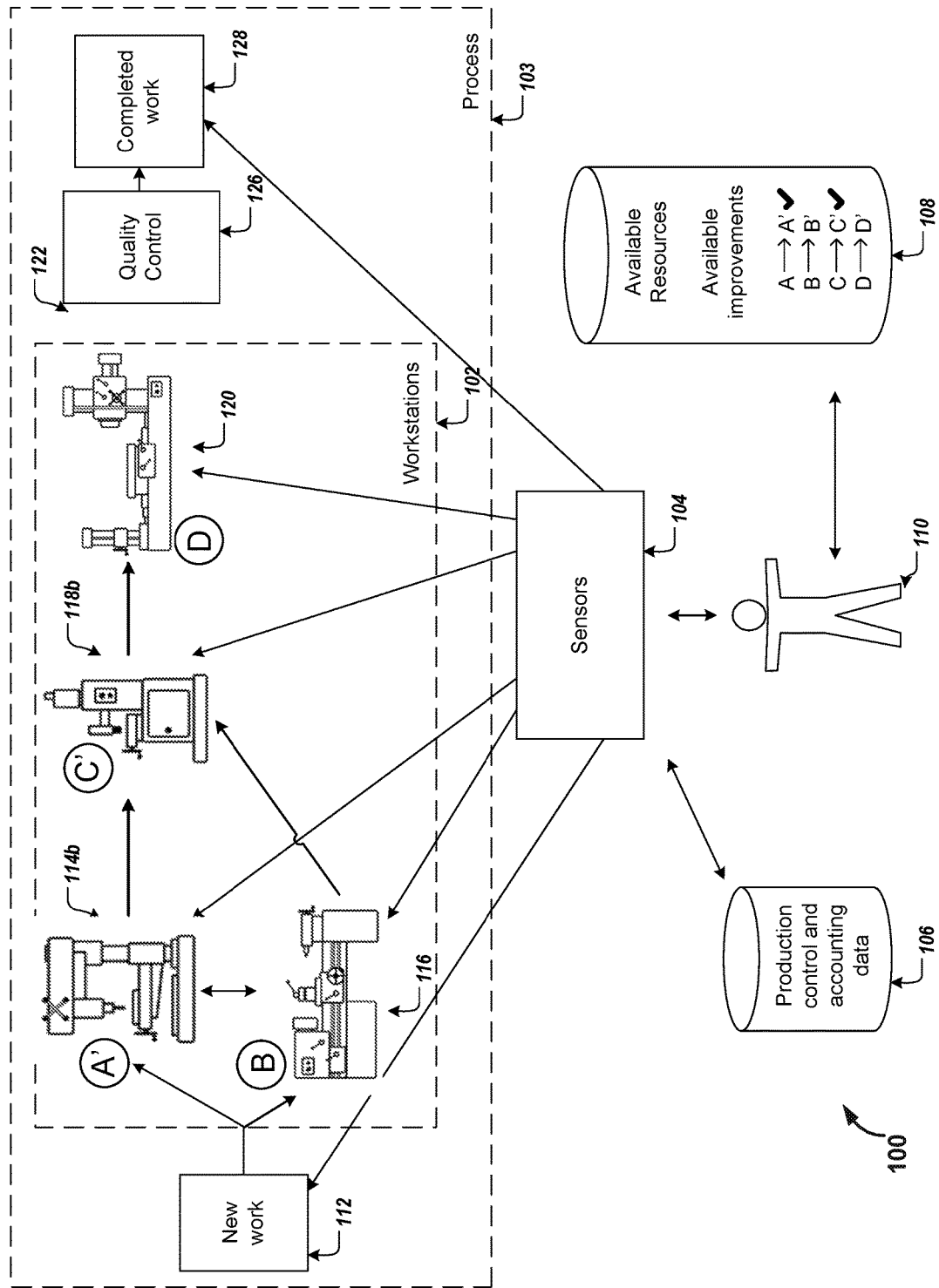

FIGS. 1A and 1B depict an example system 100 in states prior to a process efficiency improvement and after a process efficiency improvement. Specifically, the system 100 includes a work process 101, such as a manufacturing process or machining process, that may be analyzed for efficiency improvement. A process efficiency improvement may be determined by applying a thermodynamic model to parameters associated with the process 101.

The work process 101 may be any type of manufacturing or machining process implemented by, for example, an enterprise, an organization, or a group of enterprises and/or organizations. For example, work process 101 may include a controlled material removal process or a controlled material addition process. The process 101 may also be referred to as a microeconomic process. As discussed in more detail below, the process 101 is associated with a measure of efficiency related to the amount of waste in the process 101. Modifications may be made to the process 101 to improve the process 101 and reduce the inefficiency associated with the process 101 by, for example, reducing the waste in the process 101. However, making such modifications may entail making an investment in the process 101, particularly an investment in improving the process 101. Thus, predicting a quantitative measure of efficiency improvement that results from investing in the process 101 may allow for more rational investment in process improvement as compared to techniques in which a quantitative measure of efficiency improvement is not available prior to making an investment in process improvement.

A decision to improve a process of an enterprise without a predictive measure of the efficiency improvement achievable as a result of the process improvement may rest on judgment or anecdotal evidence. For example, a consultant to the enterprise may, without the benefit of a predictive efficiency improvement, estimate a certain amount of savings based on process improvements, when in fact the process improvements would result in a larger amount of savings. Had the enterprise known that a larger amount of savings was possible, the enterprise may have been more willing to invest in the process improvements. In another example, a process improvement that qualitatively appears to have the potential to greatly reduce inefficiency actually may not result in a reduction of inefficiency. In this example, a quantitative predictive efficiency improvement may save the enterprise from investing in unprofitable process improvements.

The process 101 may be any type of process. For example, the process 101 may be implemented by an enterprise. The enterprise may be an organization formed to achieve a common commercial or social goal. For example, the enterprise may be an organization that oversees, arranges and/or engages in manufacturing. For example, the process 101 may be a manufacturing process implemented by an enterprise that engages in the manufacture and sale of automobiles.

In some examples, the enterprise may be an organization that participates in transactional engagements with other enterprises or within the enterprise itself, such as an insurance company. In such cases the process 101 may be implemented to receive and process insurance claims. In another example, the enterprise may be a law firm, and the process 101 may represent a workflow that occurs when the law firm accepts a new legal case and the law firm processes the case to completion. In yet another example, the process 101 may be a process to develop proposed designs for automobiles implemented by an enterprise involved in product development. In some implementations the process 101 may be a process implemented by one or more computers. In some examples, the process 101 may include aspects of both manufacturing and transactional processes.

The process 101 is associated with an efficiency related to the amount of waste in the process 101. As discussed in more detail below, the efficiency of the process 101 may be analogized to entropy in a thermodynamic process, and the efficiency of the process 101 may be primarily driven by WIP. WIP may be the number of units of work that are in the process 101 at a particular time. In other words, WIP may be considered to be the number of units of work that are in various stages of completion within the process 101. In some examples, WIP may be a number of tasks that are in various stages of completion within the process 101. The efficiency of a process, or of a workstation within a process, may also be defined as the ratio of value added costs divided by the sum of value added and non-value added costs, where value added costs adds a form, feature or function of value to the customer, and non-value added costs are waste of no value to the customer.

For example, the process 101 may be a process to manufacture automobiles. In this example, a unit of work may be any action item related to manufacturing automobiles, such as attaching doors to an automobile frame. If the doors are attached at a particular machine tool workstation, and there are fifteen automobile frames at the machine tool workstation waiting for doors to be attached, the WIP has a value of fifteen. In another example, the process 101 may be a transactional process, such as a process to process documents related to a legal case handled by a law firm. In this example WIP may be the number of tasks in progress in the process 101. In this example, the process 101 may include a task to create binders to hold the papers and a task to scan physical documents into an electronic system. The WIP associated with the process 101 may include a variety of different items, each of which may have a different completion time. However, as discussed in more detail below, the transit time of the process 101 is governed by the average completion rate of the different items.

Although WIP is a primary driver of inefficiency in the process 101, inefficiency in the process 101 also may result from obsolescence (e.g., items made in the process 101 or tasks performed as part of the process 101 are no longer needed by a customer), quality flaws within the process 101 that cause items made in the process 101 to be defective or unusable without rework, and indirect inefficiencies, such as overhead costs stemming from administering the process, storing and retrieving inventory, loss or damage to inventory, excess capacity costs of equipment and facilities beyond average need, and research and development costs, all of which result in increases of WIP as per equations (C) and (C') above. Inefficiency is also driven by the variation of cycle times $\sigma_\tau$ noted above with reference to equation (B).

Specifically, in the example shown in FIG. 1A, the system 100 includes the process 101, a new work item 112, machine tool workstations 114a, 116, 118a, 120, a quality control module 126, a completed work item 128, one or more sensors 104, a production control and accounting data store 106, a user or work handler 110, and a data store for available resources and improvements 108. A new work item 112 may be, for example, an order, or an indication that the system 100 is to process the new work item 112 into the completed work item 128. For example, the process 101 may be an automobile manufacturing process and the new work item 112 may be an order for an automobile.

In the example shown, the system includes machine tool work stations (A)-(D). Machine tool workstations are points in the process 101 that process units of work or perform one or more tasks. The machine tool workstations (A)-(D) receive a new task or a new unit of work and process the task or unit of work to produce a draft work item. Thus, the machine tool workstations (A)-(D) transform the new work item 112 partially or completely into the completed work item 128. Although four machine tool workstations are shown in the example of FIG. 1A, in other examples, more or fewer than four workstations may be included. In some examples, the machine tool workstations (A)-(D) may perform different actions compared to each other. In some implementations, the machine tool workstations (A)-(D) may each perform more than one task or type of unit of work.

The machine tool workstations (A)-(D) may include machines, automated processes running on machines, or partially automated processes that includes human interaction by, for example, a workstation operator. For example, as shown in FIG. 1A, the machine tool workstations (A)-(D) may include drilling machines (A), turning machines, i.e., lathes, (B), grinding machines (C), or boring machines (D). Other examples include cutting tools, broaching machines, drill presses, gear shapers, hobbing machines, hones, screw machines, shears, shapers, saws, planers, stewart platform mills, or multitasking machines. When fabricating or shaping parts, some machine tool workstations such as electrical discharge machines, abrasive cutters or multiple edge cutting tools may be used to remove unwanted metal. As an example, the process 101 may be a process to manufacture automobiles, and the machine tool workstations (A)-(D) may each be stations that attach doors to automobile frames. In some examples, the process 101 may be a process for processing insurance claims and the machine tool workstations (A)-(D) may represent claims adjusters.

Each machine tool workstation (A)-(D) is associated with a set of performance parameters, that describe the performance of each machine tool workstation. The performance parameters may include one or more parameters relating to machine downtime, scrap percentage, processing time per unit, set up time, batch size, minimum work in progress (WIP) required to produce a fixed number of parts per hour, and a number of different part numbers. Some or all of the performance parameters may be adjusted by making improvements to the machine tool workstations. For example, it may be possible to reduce the set up time of a given machine tool workstation by providing the machine tool workstation with better preparation, some rapid change tooling, etc. As another example, a workstation's machine downtime may be reduced by providing the machine tool workstation with some total productive maintenance.

As an example, a machine tool workstation may be associated with a cutting speed that is defined by the rate that material moves past a cutting edge of the machine tool. For a given material that is being cut by the machine tool, an optimum cutting speed for a certain set of machining conditions will exist. Factors affecting the calculation of cutting speeds include the material that is being machines, e.g., steel, brass, plastic, wood, the material that the cutting tool is made of, e.g., carbon steel, carbide or ceramic, and the economic life of the cutter, e.g., the cost to regrind or purchase new compared to the quantity of parts produced. Parameters that may be used to calculate cutting speeds may include a metal removal rate, e.g., finishing cuts that remove a small amount of material may be run at increased speeds, full and constant flow of cutting fluids, e.g., adequate cooling and chip flushing, rigidity of the machine tool and tooling setup, e.g., reduction in vibration or chatter, continuity of cut, e.g., as compared to an interrupted cut, or condition of material, e.g., mill scale, hard spots due to white cast iron forming in castings. Cutting speeds may vary depending on conditions in which the machine tool is operated. For example, a cutting machine tool performance parameter relating to cutting speed, i.e. processing time per unit, may be adjusted by improving the coolant available to the cutting machine tool, or by providing the cutting machine tool with an improved grade of HSS (such as one that includes cobalt).

As another example, a machine tool workstation may be associated with a feed rate that is defined by the velocity at which the machine tool is fed, i.e. advanced against the work piece. For a given material that is being processed by the machine tool, an optimum feed rate for a certain set of machining conditions will exist. Factors affecting the calculation of feed rates include the type of machine tool, e.g., a small drill or large drill, boxtool or recess, the surface finish desired, the power available at the spindle to prevent stalling of the machine tool, rigidity of the machine tool and tooling set up, ability to withstand vibration or chatter, strength of the work piece—high feed rates will collapse thin wall tubing —, characteristics of the material being cut, chip flow—ideal chip shapes are small and break free early to carry heat away from the machine tool and the work piece, and threads per inch for taps, die heads and threading tools. A feed rate may be chosen depending on the above factors.

As another example, a drilling machine tool may be associated with a spindle speed that defines a rotational frequency of the spindle of the machine. An excessive spindle speed may cause the drilling machine tool premature tool wear or breakage, and may cause tool chatter—all of which can lead to potentially dangerous conditions. Therefore, a drilling machine tool performance parameter relating to machine downtime, may be adjusted by carefully monitoring the spindle speed.

Further examples of machine parameters that may affect machine tool performance parameters may include (i) material machinability, e.g., how easy or difficult a material is to cut, (ii) cutting tool material, e.g., the tool's hardness, strength, wear resistance and thermal stability—all of which decide how fast a tool can cut efficiently on a job, (iii) depth of cut, e.g., how much the tool digs into the component to remove material in the current pass, (iv) feed rate, e.g., the relative speed at which the tool is linearly traversed over the work piece to remove material—feed per minute may be used to determine a time taken for a cutting job, (v) tool geometry, e.g., the angle in which a cutting tool tip is ground to such as rake angle, clearance angle, relief angle, approach angle, (vi) coolant, e.g., cutting oils, water-soluble oils, oil-water sprays—all of which take away the heat produced in cutting and acts a lubricant in cutting to reduce tool wear, (vii) machine power, e.g., power to drive spindles or provide feed movement to the tool—the power required is based on a rate of material removed in a given time which may depend on work material, tool material, cutting speed, depth of cut and feed rate, and (viii) rigidity of machine, e.g., a rigidity based on the design, construction, age, and extent of use of the machine—such factors play a role in the machining of components and getting a desired accuracy, finish and speed of production.

The machine tool workstations (A)-(D) may include existing WIP that is waiting to be processed by the machine tool workstation (A)-(D), respectively. Such WIP may be considered to be, for example, a backlog of work units or tasks that have accumulated at a particular machine tool workstation. As discussed above, the machine tool workstations (A)-(D) may be considered as processing points within the process 101 that transform the new work item 112, partially or completely, into a completed work item 128. For example, the process 101 may be a process to manufacture a welded work piece, and the machine tool workstation (A) may be a welding station, the new task 112 may be a part to be welded to partially complete the work piece, and WIP may include other parts to be welded. Additionally, new work may be entering the system 100 at any point in the process, assigned to a machine tool workstation (A), and added to the existing WIP.

A quality control module 126 reviews the draft work item 122 and determines if the draft work 122 is satisfactory. If the draft work 122 is satisfactory, the draft work 122 becomes the completed work item 128. However, if the draft work 122 is not satisfactory, rework is needed, and the task is returned to the machine tool workstation 102 as rework 124. In some implementations, the rework 124 may be assigned to a machine tool workstation other than the machine tool workstation that produced the draft work item 122.

Rework may cause a delay in the transition of the new work item 112 into the completed work item 128. In particular, without rework the transition from the new work item 112 to the completed work item 128 occurs smoothly and in an expected time period. However, in examples in which the quality control module 126 determines that rework is needed, the new work item 112 transitions to the completed work item 128 at a later than expected time. In some examples, more than one cycle of rework occurs, thus the transition from the new work item 112 to the completed work item 128 may occur at an even later time. Accordingly, as rework does not add features to the completed work item 128 beyond what was originally intended for the completed work item 128, rework adds a non-value-added cost to the process 101. Other non-value-added costs include costs resulting from items that are unusable or defective to the point that the items cannot be made satisfactory through rework. The total cost of the process includes value-added costs, such as research and development costs, in addition to non-value added costs.

Thus, rework may increase the total cost associated with the process 101. For example, in a particularly inefficient process, non-value added costs, such as rework, may account for 50% or more of a total cost associated with a process.

The system 100 includes one or more sensors 104. The one or more sensors 104 may be used to monitor the process 101 and determine one or more process efficiency improvements. In particular, the one or more sensors may be configured to generate sensor data associated with the machine tool workstations involved in a work process, such as machine tool workstations (A)-(D) involved in process 101. In some implementations the one or more sensors may include barcode scanners that scan items as they pass through different points in the process 101. The sensor data may include a measured transit time for items being processed by each machine tool workstation, and a measured transit time for items flowing through the entire work process, e.g., a measured duration of time for each item to enter the process as new work 112 and leave the process as completed work 128. The sensor data may also include WIP data, such as a quantity of WIP in each machine tool workstation, a measure of all WIP in a process at a particular time, or all WIP in the process over a defined time period. The WIP in any process may include more than one type of work unit or more than one type of task. The sensor data may also include a measured WIP for a particular part number, a particular type of machine tool workstation or a particular task within a transactional process. A sensor system 104 for determining one or more process efficiency improvements is described in more detail below with reference to FIG. 2.

The one or more sensors 104 are in communication with a work handler or user of the system 110, a production control and accounting data store 106 and an available resources and improvements data store 108. The production control and accounting data store 106 stores data regarding the machine tool workstations involved in a process, e.g., machine tool workstations (A)-(D), and data regarding the costs and overheads associated with a process, e.g., data regarding the dollars of labor and supply chain overhead expended per month. Each machine tool workstation involved in a process is associated with a set of performance parameters, such as machine downtime, scrap percentage, machining time per unit, set up time, batch size, minimum WIP required to produce a fixed number of parts per hour, and number of different part numbers. The data stored in the production control and accounting data store may include data relating to these performance parameters, such as values for each performance parameter for each machine tool workstation at a particular time or for a defined time period.

The available resources and improvements data store 108 stores data regarding potential improvement projects and available resources for realizing the improvement projects associated with the one or more machine tool workstations and work process. For example, the improvement projects data may include potential process improvement projects for each machine tool workstation (A)-(D), and corresponding predictive performance parameter values, e.g., A to A', B to B', C to C' and D to D', as indicated in FIG. 1A. The data stored in the available resources and improvement projects data store 108 may be provided by a work handler or user 110 of the system. As an example, a potential process improvement project for a metal cutting machine tool workstation may include providing the machine tool with a higher quality coolant in order to more efficiently take away the heat produced in cutting, thus reducing the wear of the machine tool and improving its longevity. As another example, a potential process improvement project for a machine tool may include replacing one or more cutting parts of the tool with a more durable material in order to increase the machine tool's strength and thermal stability.

FIG. 1B depicts the example system 100 in a state after a process efficiency improvement. The system includes a modified work process 103 that incorporates feedback from the available resources and available improvements data store 108. In this example, the modified process 103 is an improved version of the process 101 discussed above with reference to FIG. 1A. The system has prioritized the implementation of two process improvement projects, that is projects A to A' and C to C'. As an example, the system may have determined that, given the current financial resources available, an optimal way to improve the efficiency of the work process is to provide machine tool (A) with a higher quality of coolant and machine tool (C) with a more durable cutting part. In the modified process 103, a new work item 112 enters the process and is processed by machine tool workstations A', B, C' and D. The new work item 112 is processed into a draft work item and the draft work item is checked by the quality control module 126. The completed work item 128 then exits the system. An example process for determining a prioritization of projects and corresponding process efficiency improvement for a process including one or more machine tool workstations is described in more detail below with reference to FIG. 3.

Figure 2:
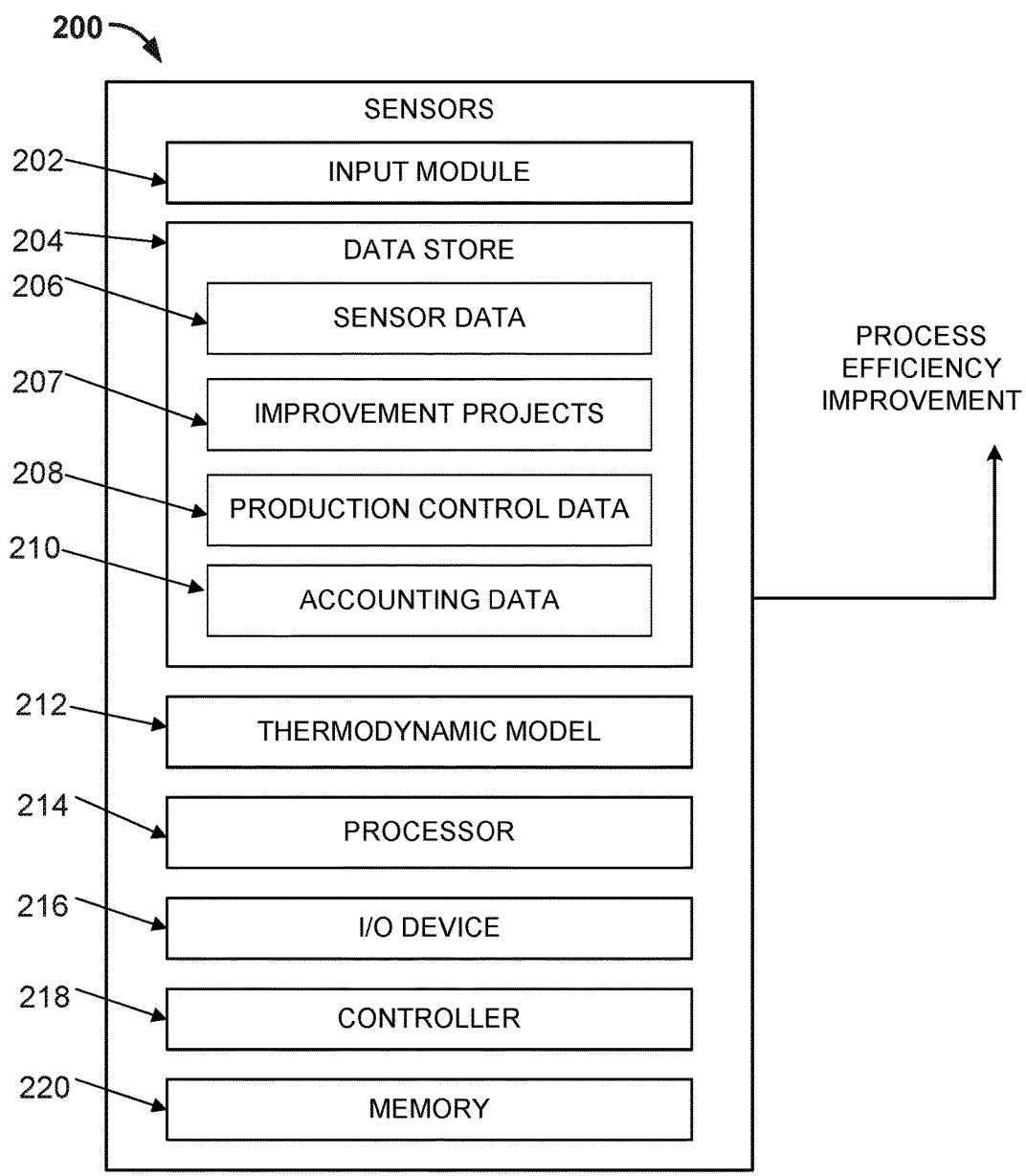
FIG. 2 depicts a block diagram of an exemplary system.

FIG. 2 is a block diagram of a sensor system 200 for determining one or more process efficiency improvements. The sensor system includes an input module 202, a data store 204, a thermodynamic model 212, a processor 214, an I/O device 216, a controller 218 and a memory 220. The sensor system 200 may be used to determine one or more process efficiency improvements and an associated predictive cost reduction in a process. The sensor system 200 may be implemented within hardware or software architecture.

The input module 202 imports data associated with the workstations involved in a work process. The data may include transit time information items being processed by each workstation, and transit time information for items flowing through the work process, as measured by the one or more sensors. In some implementations, the input module 202 reformats and/or transforms the data such that the data may be processed and stored by other components within the system. The data imported by the input module 202 may also include production control data and accounting data. The input module 202 may receive data from a source external to the system 200, or may receive data from a source within the system 200. The input module 202 may also access data, either from within the system 200 or from a source external to the system 200.

The system 200 also includes a data store 204. In some implementations, data received through the input module 202 is stored in the data store 204. The data store 204 may be, for example, a relational database that logically organizes data into a series of database tables. The data included in the data store 204 may be, for example, data associated with a process. Each database table arranges data in a series of columns (where each column represents an attribute of the data stored in the database) and rows (where each row represents attribute values). The data store 204 may be, for example, an object-oriented database that logically or physically organizes data into a series of objects. Each object may be associated with a series of attribute values. The data store 204 may also be a type of database management system that is not necessarily a relational or object-oriented database. For example, a series of XML (Extensible Mark-up Language) files or documents may be used, where each XML file or document includes attributes and attribute values. Data included in the data store 204 may be identified by a unique identifier such that data related to a particular process may be retrieved from the data store 204.

The data store 204 includes sensor data 206, improvement project data 207, production control data 208 and accounting data 210. The sensor data 206 includes data accessed or measured by the sensors. For example, the sensor data 206 may include measured transit time information for items flowing through a process. The sensor data may also include work in progress (WIP) data, such as a quantity of WIP in each workstation, a measure of all WIP in a process at a particular time, or all WIP in the process over a defined time period. The WIP in any process may include more than one type of work unit or more than one type of task. The sensor data may also include a measured WIP for a particular part number, a particular type of workstation or a particular task within a transactional process.

The improvement projects data 207 may include data relating to potential improvement projects associated with the one or more workstations and work process. For example, the improvement projects data may include potential, realizable process improvement projects and corresponding predictive performance parameter values, e.g., an improvement project for a specific workstation for reducing an initial set up time from 10 hours to 2 hours by investing a fixed amount of money in providing rapid change tooling. The improvement projects data 207 may be provided to the system 200 by a work handler or user of the system.

The production control data 208 includes accessed data regarding the workstations involved in a process. As described above with reference to FIG. 1A and FIG. 1B, each workstation involved in a process is associated with a set of performance parameters, such as machine downtime, scrap percentage, machining time per unit, set up time, batch size, minimum WIP required to produce a fixed number of parts per hour, and number of different part numbers. The production control data may include data relating to these performance parameters, such as values for each performance parameter for each workstation at a particular time or for a defined time period. The accounting data 210 includes data accessed by the sensors regarding the costs and overheads associated with a process. For example, the accounting data may include information regarding the dollars of labor and supply chain overhead expended per month.

The sensor system also includes a thermodynamic model 212. The thermodynamic model 212 may determine a process efficiency improvement based on an equation of efficiency improvement derived from thermodynamic principles, such as equation (A) above. For example, reduction in transit time (e.g., the time from the injection of an item into the process until the time at which the item is completed) as expressed by Little's Law (2) below, leads to an expression for the reduction of waste in the process. In some implementations, the thermodynamic model 212 receives data relating to production control, accounting and measured transit time information from the data store 204. In other implementations, the thermodynamic model 212 may access such data from the data store 204, or a source external to the process efficiency improvement system.

The thermodynamic model 212 receives data indicative of a quantity of WIP in a process at various times. In other implementations, the thermodynamic model 212 may access such data from the data store 204, the sensor data 206, or a source external to system 200. The components of the system 200 may translate or reformat data received from the input module 202 into data suitable for the thermodynamic model 212. For example, data associated with a process at various times may be received from the input module 202 and used to determine constants indicative of a standard deviation of transit time through the entire process, and overhead and labor costs.

The thermodynamic model 212 may be a specialized hardware or software module that is pre-programmed or pre-configured to invoke specialized or proprietary thermodynamic functionality only. In another aspect, the thermodynamic module 212 may be a more generic hardware or software module that is capable of implementing generic and specialized functionality, including thermodynamic functionality.

The system 200 also includes the processor 214. The processor 214 may be a processor suitable for the execution of a computer program such as a general or special purpose microprocessor, and any one or more processors of any kind of digital computer. Generally, a processor receives instructions and data from a read-only memory or a random access memory or both. The processor 214 receives instruction and data from the components of the sensor system 200 to, for example, output a suggested optimal process efficiency improvement. In some implementations, the sensor system 200 includes more than one processor. In other implementations the processor 214 may be external to the sensor system 200 and in data communication with the sensor system 200.

The sensor system 200 also includes the I/O device 216, which is configured to allow a user input and selection. For example, the I/O device 216 may be a mouse, a keyboard, a stylus, or any other device that allows a user to input data into the sensor system 200 or otherwise communicate with the system 205. In some implementations, the user may be a machine and the user input may be received from an automated process running on the machine. In other implementations, the user may be a person. The I/O device 216 also may include a device configured to output the optimal process efficiency improvement.

The sensor system 200 also includes the controller 218. The controller 218 is an interface to a process. The controller 218 may receive feedback from the process, such as quantities of WIP and data associated with the process at various times. The controller 218 may also cause changes in the system in response to the feedback, such as, for example, actuating a control valve in a pipeline such that the pipeline is opened or shut to accommodate a higher or lower flow of material, respectively. In other examples, the controller 218 may turn a tool on or off, shut down or activate a system, or activate a user interface that affects a transactional process.

The sensor system 200 also includes a memory 220. The memory 220 may be any type of machine-readable storage medium. The memory 220 may, for example, store the data included in the data store 204. In some implementations, the memory 220 may store instructions that, when executed, cause the thermodynamic model 212 to determine an optimal process efficiency improvement.

Although the example sensor system 200 is shown as a single integrated component, one or more of the modules and applications included in the sensor system 200 may be implemented separately from the system but in communication with the system. For example, the data store 204 may be implemented on a centralized server that communicates and exchanges data with the system 200.

Figure 3:
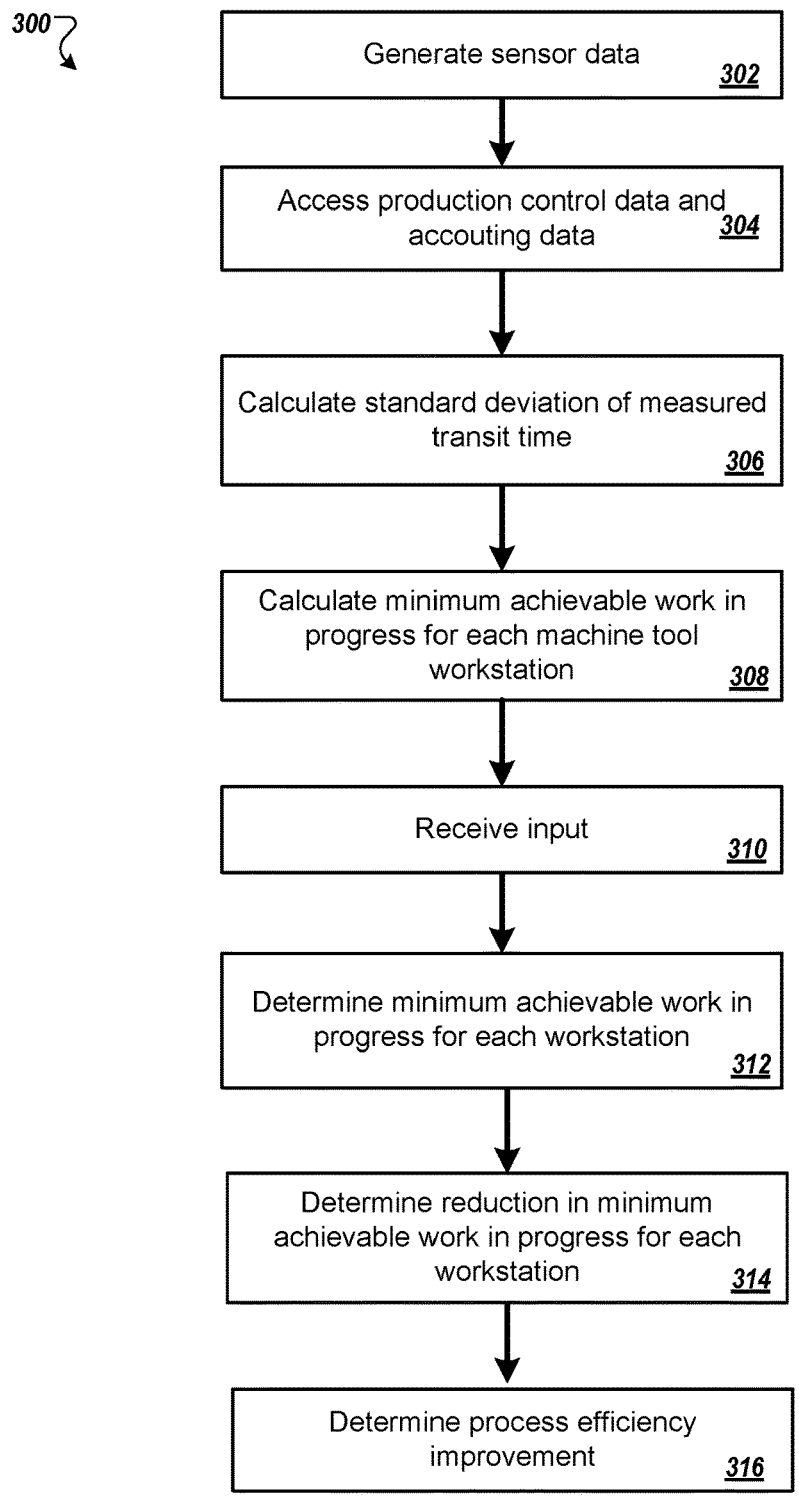
FIG. 3 depicts a flowchart of an example process.

FIG. 3 presents an example process 300 for determining a process efficiency improvement for a work process including one or more workstations. For example, the process 300 may be performed by one or more processors included in a processing system such as the system 100 described with reference to FIG. 1A above. The work process may be a process such as the process 101 described in FIG. 1A.

At step 302, the system generates a set of sensor data for a given process. For example, the sensors 104 of FIG. 1A and FIG. 1B may be used to generate the set of sensor data. As described above with reference to FIG. 2, the sensor data includes data accessed or measured by the sensors. For example, generating the sensor data may include measuring a transit time for items flowing through the entire process, measuring a transit time for items as they are processed by a machine tool workstation, measuring a quantity of WIP in each machine tool workstation, or measuring the total WIP in the process over a defined time period. The generated sensor data may be provided to the system for immediate use, or stored in a data store, such as data store 204 of FIG. 2 for future use.

At step 304, the system accesses production control data and accounting data relating to the given process. The production control data may include data accessed or measured regarding the machine tool workstations involved in the process. As described above with reference to FIG. 1A and FIG. 1B, each workstation involved in the process is associated with a set of performance parameters, such as setup time, number of different part numbers, units produced per unit time, scrap percentage, machining time per unit, and machine downtime. The production control data may include data relating to these performance parameters, such as values for each performance parameter for each machine tool workstation at a particular time or for a defined time period. The accounting data includes data accessed by the sensors regarding the costs and overheads associated with a process. For example, the accounting data may include information regarding the dollars of labor and supply chain overhead expended per month.

At step 306 the system calculates a standard deviation of the measured transit time information generated in step 302. For example, the system may calculate a standard deviation of the time taken for each item to transit the process in a given month.

At step 308 the system calculates a total average achievable minimum work in progress (WIP) for each machine tool workstation involved in the process using current values of performance parameters associated with each workstation, using equation (C') below.

$$W_{MIN} \cong \frac{SQm}{2(1 - X - m(\tilde{P}/(1 - M)))} + Q + m\tau_t \tag{C'}$$

In the above equation, S represents the workstation setup time, Q represents the workstation number of different part numbers, m represents the units produced by the workstation per unit time, X represents the workstation scrap percentage, $\tilde{P}$ represents the workstation machining time per unit, and M represents the machine downtime, $\tau_t$ is the average time WIP spends in non-processing travel time. The total average achievable minimum WIP describes the minimum WIP required in order to complete m units per unit time of finished goods.

In some implementations the system calculates a total average achievable minimum work in progress (WIP) for each machine tool workstation involved in the process using current values of performance parameters associated with each workstation, using equation (C) below.

$$W_{MIN} \cong \frac{SQm}{2(1 - X - m(\tilde{P}/(1 - M)))} + Q \tag{C}$$

In the equation (C), S represents the workstation setup time, Q represents the workstation number of different part numbers, m represents the units produced by the workstation per unit time, X represents the workstation scrap percentage, $\tilde{P}$ represents the workstation machining time per unit, and M represents the machine downtime.

At step 310 the system receives input including (i) information identifying process improvement projects and corresponding predictive performance parameter values, and (ii) information identifying resources available for process improvement. For any given process associated with one or more workstations, there may be several potential process improvement projects that could be implemented in order to improve the process efficiency. For example, process improvement projects and corresponding predictive performance parameter values can include reducing an initial set up time from 10 hours to 2 hours by investing a fixed amount of money in providing rapid change tooling. Another example could include reducing a workstation's machine downtime from 10% to 1% by investing a second fixed amount of money on total productive maintenance. Clearly, all potential process improvement projects compete for limited resources and money. A method of prioritizing projects based on Return on Investment is described below. A user may input a list of such possible process improvement projects to the system, along with an indication of the resources available for such process improvement projects. The indication of the resources available may include a fixed overall amount of money available for investing in process efficiency improvement, as well as limitations regarding the process improvement projects. For example, whilst it may be desirable to predict values of performance parameters that would reduce machine downtime to 0%, and set up time to 0 minutes, such values are unrealizable and not available for process improvement.

At step 312 the system determines a total average achievable minimum WIP for each machine tool workstation and each received process improvement project using the corresponding predictive performance parameter values using Equation (C) or Equation (C') above, where now S represents the predicted workstation setup time, Q represents the predicted workstation number of different part numbers, m represents the predicted units produced by the workstation per unit time, X represents the predicted workstation scrap percentage, $\tilde{P}$ represents the predicted workstation machining time per unit, and M represents the predicted machine downtime.

At step 314 the system determines a reduction in minimum WIP for each workstation. The system determines the reduction in minimum WIP for each station by calculating the difference between the total average achievable minimum WIP for the current values of the performance parameters and the total average achievable minimum WIP for the predictive values of the performance parameters.

At step 316 the system determines a process efficiency improvement associated with the reduction in minimum WIP, the accounting data accessed in step 304 and the standard deviation calculated in step 306. In order to determine the process efficiency improvement, the system first determines a total WIP for a given time period prior to a process efficiency improvement, based on the set of sensor data generated in step 302.

The system further defines one or more histograms of K bins that represent, for one or more respective randomly selected items of WIP flowing through the work process, probability distributions that assign a probability to the velocities of the items. A few units of WIP may travel a process path which has a smaller amount of WIP, and hence whose velocity will be faster than the average, and vice versa. The velocities of the pieces of WIP may then be distributed in a histogram of K bins with an associated probability distribution. In some implementations a most likely probability distribution may be proven to be the Maxwell-Boltzmann distribution.

The system then determines, for each combination of determined reductions in minimum WIP for one or more corresponding machine tool workstations, a reduction in minimum WIP. The system may implement an optimization algorithm to determine an optimal combination of process improvement projects received at step 310. The optimal combination is a combination of process improvement projects given the available resources, also received at step 310. Optimality may be measured by the largest efficiency gain achieved, which is determined via the efficiency increase formula under the constraint of the given limited resources. When considering large scale systems including several machine tool workstations and a complex work process, there may be a large number of competing potential process improvement projects. A formula connecting the change in performance parameters with WIP reduction and profit increase which is implemented on a computer is therefore not only desirable, but essential for determining such optimal combinations of process improvement projects.

The system subtracts each combined one or more determined reductions in minimum WIP for one or more corresponding machine tool workstations from the determined total WIP for a given time period prior to a process efficiency improvement. In some implementations the system may determine a corresponding process efficiency improvement using Equation (A) below.

$$\text{process efficiency improvement} = \$\mu_{(L+O)B}\sigma_{\tau B} \sqrt{2}D(\hat{p}_{WA}|\hat{p}_{WB}) \quad (A)$$

In Equation (A), $\$\mu_{(L+O)B}$ represents labor and overhead expended per month prior to process efficiency improvement; $\sigma_{\tau B}$ represents the calculated standard deviation; D represents a relative entropy $$D(\hat{p}_{WA}|\hat{p}_{WB}) = \sum_{j=1}^{K} \hat{p}_{WA_j} \log \frac{\hat{p}_{WA_j}}{\hat{p}_{WB_j}},$$

and $\hat{p}_{WA_j} = \frac{1}{2}(n_{Bj}\overline{b}_j/W_B)$, $\hat{p}_{WB_j} = \frac{1}{2}(n_{Aj}\overline{b}_j/W_A)$, wherein $W_B$ represents the total WIP prior to process efficiency improvement, $W_A$ represents the total WIP prior to process efficiency improvement minus the combined one or more determined reductions in minimum WIP for one or more corresponding workstations, K is a number of histogram bins, $n_{Bj}\overline{b}_j$ represents an amount of WIP prior to process efficiency improvement in the j-th bin, and $n_{Aj}\overline{b}_j$ represents an amount of WIP prior to process efficiency improvement minus the combined one or more determined reductions in minimum WIP for one or more corresponding workstations in the j-th bin.

The process efficiency improvement may be derived from thermodynamic principles, for example from thermodynamic free energy. In some implementations, the system may include a thermodynamic model that is derived from manufacturing entropy. The manufacturing entropy may be derived from Little's Law and include a Shannon entropy and an entropy of scale. In some cases the thermodynamic model may be derived from maximizing the Shannon entropy.

The determined process efficiency improvement may be used to prioritize and rank potential process improvement projects. For example, in some implementations a work handler may compare the determined process efficiency improvements for each combination of determined reductions in minimum WIP for the one or more workstations and prioritize implementation of one or more process efficiency projects according to some metric such as largest efficiency increase (given the limited available resources). In other implementations, a work handler may decide that no combination of process efficiency improvement projects is worth implementing. Obtaining such information prior to investing resources in process improvement projects may be extremely valuable and beneficial.

The system may then use the ranked potential process improvement projects to implement a process efficiency improvement associated with the corresponding reduction in minimum WIP, the accounting data and the calculated standard deviation. In some implementations, the determined process efficiency improvements include increasing a number of units produced per unit time by a cutting tool in the collection of machine tool workstations used in the work process and implementing one or more of the determined process efficiency improvements may include adjusting the feed rate of the cutting tool. Adjusting the feed rate of the cutting tool may include adjusting one or more of (i) a desired surface finish of an item processed by the cutting tool, (ii) power available to the cutting tool, (iii) threads per inch (TPI) for threading tools included in the cutting tool, or (iv) rigidity of the cutting tool.

The above Equation for the process efficiency improvement is derived from thermodynamic principles, and may be determined using a thermodynamic model such as the thermodynamic model 212 of FIG. 2 above. The thermodynamic model may be derived from manufacturing entropy, which in turn may be derived from Little's Law, and includes a Shannon entropy and an entropy of scale. The thermodynamic model is derived from maximizing the Shannon entropy in accordance with the Jaynes methodology, and includes a conversion factor $\beta$ where $$\left(\frac{1}{\beta}\right) = \$\mu_{(L+O)B}^2 \sigma_\tau \sqrt{2}.$$

More details describing FIGS. 1 to 3 may be found below.

The following provides additional details for determining a process efficiency improvement associated with an improvement of a work process, such as the process 101 described above with relation to FIG. 1A, as output by the system 100.

Manufacturing Cycle Time may be defined as an average time from the release of raw material into Work-In-Process (WIP) inventory, until its completion as Finished Goods. It may be shown that faster cycle time is the result of reducing waste using process improvement methods such as Lean Six Sigma. The reduction of waste increases process efficiency, for example by increasing EBITDA (Earnings Before Interest, Taxes, Depreciation and Amortization) dollar for dollar.
1.0 Little's Law The following provides details about Little's Law. John D. C. Little proved that the average manufacturing cycle time $\bar{\tau}$ is, from the release of raw material into work in progress (WIP), until its completion as finished goods is given by equation (1) below.

$$\bar{\tau} = \frac{W}{m} = \frac{\$\omega}{\$\mu} \quad (1)$$

The WIP W is defined as the number of pieces that have been released from Raw Material into the Work-In-Process inventory (WIP), but which have not yet exited WIP as a unit of Finished Goods Inventory. Little's Law is stated in (1) as the number of pieces of WIP divided by the number of pieces m per unit time which exit from WIP to finished goods inventory. "m" is the "departure rate" from WIP. Since the Dollars of WIP per unit are randomly distributed by part number, Little's Law may also be stated in terms of dollars, as in the second expression of (1). $\$\omega$ denotes the number of dollars of Work-In-Process inventory (WIP) inventory of direct labor and overhead cost, and $\$\mu$ as the dollars exiting WIP as finished goods per unit of time. Therefore Little's Law results in the conclusion that the reduction of dollars of waste is a function of WIP reduction assuming constant departure rate $\$\mu$ per unit time. Cycle time, and hence Little's Law, may be related to dollars of waste.

An analogy to manufacturing waste is the energy waste in a Thermodynamic Carnot cycle engine, which is proportional to Boltzmann Entropy $S_B$, as given by equation (2) below.

$$S_B = k_B \sum_{i=1}^{Q} p_i \log p_i \quad (2)$$

In equation (2), $k_B$ is the Boltzmann constant, and $p_i$ is the probability that all the molecules of the gas are in the $i^{th}$ state of the set of all the Q possible states of molecular positions and velocities. Thermodynamics also derives the Free Energy $\Delta F$ which is available to do external Work which may be analogous to the EBITDA created by a well-managed company and is given by equation (3) below.

$$\Delta F = F(p) - F(q) = \left(\frac{1}{\beta_B}\right)\left(\sum_{i=1}^{Q} p_i \log p_i - \sum_{i=1}^{Q} p_i \log q_i\right) = \quad (3)$$

$$\left(\frac{1}{\beta_B}\right)\left(\sum_{i=1}^{Q} p_i \log[p_i/q_i]\right) = \left(\frac{1}{\beta_B}\right) D(p_{A_i} | q_{B_i})$$

In equation (3), $\beta_B=1/k_B T$ where T=Temperature. $p_i$ is again the probability that all the positions and velocities of the molecules of the gas are in the $i^{th}$ state of the Q possible states for a starting Boltzmann distribution p of initial Energy $E_i$. Likewise, $q_i$ is the probability that all the molecules of the gas are in the $i^{th}$ state for a final Boltzmann distribution q of Energy $E_f$, resulting in $\Delta F>0$. $D(p_{Ai}|p_{Bi})$ is known as the Relative Entropy and is defined by equation (3). Equation (3) may be valid only for transformations from distribution p to q at the same Temperature. Thus, if entropy (2) exists in Little's Law, as an ansatz a profit function may be related to cycle time and be similar to equation (3).

The analogy of equation (2) suggests that e the logarithm of the cycle time as determined by Little's Law (1) is to be calculated. Thus, in equation (8) below, the log of Little's Law is calculated. A function identical to (2) results, and it may be concluded that Entropy exists in manufacturing and may be quantitatively related to waste. To determine the most probable state, the Jaynes Maximum Entropy Principle is applied in Appendix 1 to the entropy (8). This calculation results in a function identical to the Free Energy (3). $\beta_M$ is derived for manufacturing in (26), resulting in a Formula for Process Efficiency Increase (27). Thus Little's Law and Jaynes Maximum Entropy transforms an analogy to a mathematical equivalence, resulting in the Formula of Efficiency Increase derived with no reference to Thermodynamics.

2.0 Little's Law Results in Shannon Entropy

The following provides details about Little's Law and Shannon Entropy. To determine if the Manufacturing process contains entropy, the logarithm of (1) is calculated and obtains equation (4) below:

$$\log \bar{\tau} = \log(W) - \log(m) \qquad (4)$$

The number of pieces of Work-In-Process inventory (WIP) W is an endogenous variable which is a function of internal process improvement by management as discussed in (29) below. By contrast, exit rate m from WIP to finished goods, and on to the customer, is an exogenous variable that is independently related to market demand. The impact on waste of these independent variables may therefore be studied separately. Therefore only log(W) in (4) is calculated.

Let the WIP inventory W consist of Q different part number types 1, 2, ... Q, with $w_i$ being the number of pieces of WIP of the $i^{th}$ part number type. Then W may be written as in equation (5) below.

$$W = w_1 + w_2 + \ldots w_Q = \sum_{i=1}^{Q} w_i \qquad (5)$$

The logarithm of W in (5) can then be written as in equation (6) below.

$$\log W = \sum_{i=1}^{Q} \frac{w_i}{W} \log W = -\sum_{i=1}^{Q} \frac{w_i}{W}\left(\frac{1}{W}\right) + \sum_{i=1}^{Q} \overbrace{\left(+\frac{w_i}{W}\log w_i - \frac{w_i}{W}\log w_i\right)}^{=Zero} \qquad (6)$$

Combining the first and third terms in the right hand-side of (6) gives equation (7) below.

$$\log W = -\sum_{i=1}^{Q} \frac{w_i}{W} \log\left(\frac{w_i}{W}\right) + \sum_{i=1}^{Q} \frac{w_i}{W} \log w_i \qquad (7)$$

There may be W pieces of WIP randomly scattered throughout the factory. Thus the probability $p_i$ that any one piece of WIP will be of the $i^{th}$ part number type is $p_i = w_i/W$. Thus (7) can be written as equation (8) below.

$$\log W = \underbrace{-\sum_{i=1}^{Q} p_i \log p_i}_{\text{Shannon Entropy Hs}} + \underbrace{\sum_{i=1}^{Q} p_i \log w_i}_{\text{Entropy of WIP/part no. Hw}} = H_S + H_W = H_T \qquad (8)$$

The first term, $H_s$, may be recognized as Shannon's Entropy of Information as given by equation (9) below. The second term of (8) is a function of the average amount of WIP per part number $w_i$. Note that Shannon Entropy enters the theory as a natural consequence of Little's Law.

$$H_S = -\sum_{i=1}^{Q} p_i \log p_i \qquad (9)$$

The formula for Shannon Entropy (9) is identical to Boltzmann's Entropy of Energy (2), except for the conversion factor $k_B$. The presently unknown Manufacturing conversion factor $k_M$ may be used to obtain equation (10) below.

$$S_M = k_M \log W = -k_M \sum_{i=1}^{Q} p_i \log p_i + k_M \sum_{i=1}^{Q} p_i \log w_i \qquad (10)$$

$k_M$ is derived presently. Note: Without loss of generality, the present specification uses natural logarithms, hence (10) is expressed in "nats" rather than "bits".

Little's Law and the Jaynes Maximum Entropy Result in the Formula for Process Efficiency Increase The following provides a discussion of Little's law and the Jaynes Maximum Entropy result in the formula for process efficiency increase. The most probable state of any system occurs at maximum entropy. Thus the entropy $S_M$ in (10) is maximized by setting $dS_M = 0$ and determining the probability distribution $p_i = \hat{p}_i$ at which maximum entropy occurs. Maximizing the entropy (10) cancels the log $w_i$ term leaving only Shannon Entropy. An expression identical to (3) results, which is the Formula for Process Efficiency Increase (27) derived in the next Section. Thus the combination of Little's Law and the Jaynes Maximum Entropy methodology derive a EBITDA increase in manufacturing with no reference to Thermodynamics.

3.0 the Formula for Process Efficiency Increase

The derivation of the Formula for Process Efficiency Increase employs maximization techniques. A summary derivation is therefore provided.

Definitions and Assumptions: Given the results of Section 2.0, Supply chain "Energy" may be defined as in Newtonian dynamics as half the effective Mass $M_e$ of WIP times the square of the average Velocity of WIP as given by equation (11) below.

$$E = (\tfrac{1}{2}) M_e V^2 \qquad (11)$$

From Little's Law (1), which governs the time $\tau$ per manufacturing cycle, process velocity V may be defined as the number of manufacturing cycles per unit time, as given by equation (12) below.

$$V = \frac{1}{\tau} = \frac{\$\mu_{L+O}}{\$\omega_{L+O}} = \frac{m}{W} \qquad (12)$$

The effective Mass $M_e$ is derived in Appendix 3.
The effective mass $M_e$ is that mass which minimizes Action.
Action A is defined by equation (13) below.

$$A = \int_{ti}^{tr} (L+H) dt = 2 \int_{ti}^{tr} (E) dt \qquad (13)$$

Equation (13) is defined for both non-dissipative and dissipative systems where L is the Lagrangian L=E−V, and H is the Hamiltonian H=E+V, where E=Kinetic Energy, V=Potential Energy, and $t_f - t_i$ is the time required for the particles to move from the initial to the final position. Little's Law (1) yields equation (14) below.

$$E = (1/2) M_e V^2 = \frac{1}{2} M_e \left(\frac{\$\mu_{(L+O)B}}{\$\omega_{(L+O)B}}\right)^2 \qquad (14)$$

The effective mass will be that value of $M_e$ which minimizes Action at $\delta A=0$ in equation (15) below [see also (78) below].

$$\delta A = 0 = \delta \int_{ti}^{tf} \frac{1}{2}\left(M_e \frac{(\$\mu_{(L+O)B})}{(\$\omega_{(L+O)B})^2}\right) dt \tag{15}$$

In Appendix 3, equation (80) it may be seen that $\$\mu_{(L+O)B}$ cancels out in (15). Little's Law thus leads to equation (16) below [(83) below].

$$M_e = \$\omega_{(L+O)B}^2 \tag{16}$$

The energy of the process, using equations (11), (12) and (16) results in equation (17) below [(85) below] in which $\$\omega$ drops out.

$$E_B = \frac{1}{2}M_e V^2 = \frac{1}{2}(\$\omega_{(L+O)B})^2 \left(\frac{\$\mu_{(L+O)B}}{\$\omega_{(L+O)B}}\right)^2 = \frac{1}{2}(\$\mu_{(L+O)B})^2 \tag{17}$$

Supply Chain energy in equation (17) is a function of $\$\mu_{(L+O)B}$, the total dollars of Labor and Overhead cost exiting WIP per unit time "Before" process improvement. "After" process improvement described in Section 1.1, the labor and overhead cost will be reduced per unit time to $\$\mu_{(L+O)A}$ for constant revenue. Hence the Supply Chain Energy will also be reduced, see equation (18) below.

$$E_a = \frac{1}{2}(\$\mu_{(L+O)A})^2 \tag{18}$$

3.1 Formula for Process Efficiency Increase:

The following provides a discussion about the Formula for Process Efficiency Increase. Using equation (17) the Jaynes Maximum Entropy methodology may be applied. In Appendix 1 Entropy is maximised by setting $dS_M=0$ in equation (10) to obtain equation (19) below [(38) below].

$$dS_M = -k_M \sum_{i=1}^{Q}(\log p_i + 1)dp_i + k_M \sum_{i=1}^{Q}\log w_i dp_i + 0 = 0 \tag{19}$$

To maximize entropy, Lagrange multipliers $\lambda$ and $\mu$ are introduced, to form the expression (20) below [(45) below].

$$dL = \tag{20}$$
$$-k_M \sum_{i=1}^{Q}(\log p_i + 1)dp_i + k_M \sum_{i=1}^{Q}\log w_i dp_i + \lambda \sum_{i=1}^{Q}E_i dp_i + \mu \sum_{i=1}^{Q}dp_i = 0$$

Normalizing $p_i$ and eliminating $\mu$ causes the term in $w_i$ to drop out of expression (20) [(55) below], resulting in the distribution (21) below [(49) below].

$$\hat{p}_i = \frac{e^{-\beta E_i}}{\sum_{i=1}^{Q} e^{-\beta E_i}} \tag{21}$$

In equation (21), E is the energy of the $i^{th}$ batch of WIP. Equation (21) is the Maxwell-Boltzmann distribution, see also Appendix 8.

The second term of equation (8) in $w_i$ thus drops out with $dS_M=0$, and results in Shannon Entropy (9). $\hat{p}_{Bi}$ and $\hat{p}_{Ai}$ may be separately substituted into (9) and to form the Shannon Entropies: $H_{SA}-H_{SB}$ in equation (54) which, with equation (36), yields the formal Formula for Process Efficiency Increase (22) [(65) below]:

$$\Delta\$\text{Profit} = \$\mu_{(L+O)A} - \$\mu_{(L+O)B} = \left(\frac{1}{\beta_M}\right)\frac{D(\hat{p}A_i | \hat{p}B_j)}{\$\mu_{(L+O)B}} \tag{22}$$

Formula (22) may be referred to as a "formal" equation in that $1/\beta_M$ needs to be derived in order to make calculations. In Appendix 2 equation (21) is used to derive $(1/\beta_M)$ by differentiating the average energy<E> of WIP in equation (24) [(67) below]. A transition from discrete energy $E_i$ to continuous energy E and p=p(E) may be performed by defining $\omega(E)$ as the density of energy states as a function of E, between E and $E+\delta E$, with $\beta$ an unknown constant, $p_i e^{-\beta E_i} \to p e^{-\beta E}$ $$\langle E \rangle = \frac{\int_{-\infty}^{+\infty} E\omega(E)pdE}{\int_{-\infty}^{+\infty} \omega(E)pdE} = \frac{\int_{-\infty}^{+\infty} E\omega(E)e^{-\beta E}dE}{\int_{-\infty}^{+\infty} \omega(E)e^{-\beta E}dE} \tag{23}$$

$$\frac{\partial \langle E \rangle}{\partial \beta} = \frac{\int_{-\infty}^{+\infty} -E^2 e^{-\beta E}\omega(E)dE}{\int_{-\infty}^{+\infty} e^{-\beta E}\omega(E)dE} - \left(\frac{\int_{-\infty}^{+\infty} Ee^{-\beta E}\omega(E)dE}{\int_{-\infty}^{+\infty} e^{-\beta E}\omega(E)dE}\right)^2 = \tag{24}$$
$$\langle E^2 \rangle - \langle E \rangle^2 = \text{Var}\{E\}$$

From the Variance in equation (24) above, equation (25) below may be obtained [(72) below].

$$\left(\frac{1}{\beta_M}\right) = \frac{\text{Var}\{E\}}{\left(\frac{1}{\lambda}\right)\left(\frac{\partial \langle E \rangle}{\partial (1/\lambda)}\right)} \tag{25}$$

In equation (25) Var{E} is the Variance of WIP Energies. This expression is used to derive $(1/\beta_M)$ in Appendix 4, resulting in equation (26) [(111) below].

$$\left(\frac{1}{\beta_M}\right) = \$\mu_{(L+O)B}^2 \sigma_\tau \sqrt{2} \tag{26}$$

In equation (26) $\sigma_\tau$ is the standard deviation of cycle time of batches of WIP per month which empirical data indicates is constant versus reductions in WIP. However, a version of (26) is derived in Appendix 12 if it is found that $\sigma_\tau$ is a function of WIP. Equation (26) may be substituted into (22) to obtain equation (27) below.

$$\Delta\$\text{EBITDA} = (\$\mu_{(L+O)B}\sigma_\tau\sqrt{2})D(\hat{p}_{A_i}|\hat{p}_{B_i}) \tag{27}$$

The conversion constant equation (26) is proportional to $\sigma_\tau$, the fluctuation of cycle times of the batches of WIP in the process as derived in Appendix 2-4, (111). In equation (114), equation (28) below is derived.

$$k_M = \sigma_\tau \sqrt{2}, T = \$\mu_{(L+O)B}^2 \tag{28}$$

The Boltzmann constant $k_B$ is also a function of energy fluctuations in the gas.

It is also noted that equation (27) is identical in form to equation (3). The intrinsic error of equation (27) due to the finite width of the energy distribution is calculated in equation (117) and is negligible.

3.2 Manufacturing WIP Satisfies Equilibrium Conditions:

The following provides a discussion of manufacturing WIP satisfying equilibrium conditions. Little's Law assumes long term stable queues of WIP but is robust against short term fluctuations. Hence the long term average arrival rate $\lambda$ per unit time of WIP equals the departure rate m from WIP to Finished Goods. Thus supply equals demand, which is a criterion of economic equilibrium. Systems that remain in equilibrium during infinitesimal transformations may be termed "reversible" if:

1. Little's Law: The reductions of WIP $\Delta W$ due to process improvement are such that $\Delta W \ll W$, and hence infinitesimal, thus during one manufacturing cycle $\tau$, WIP queues remain in equilibrium.
2. Thermodynamics: The manufacturing equivalent of "Temperature" of p and q in equation (27) must be equal during a transformation $\$\mu_{(L+O)B} \to \$\mu_{(L+O)A}$. "Temperature" in manufacturing is $\$\mu^2$ as derived in equation (114), and $\Delta \$\mu \ll \$\mu$ in cycle time $\tau$, hence the transformation in reversible. The two criteria for reversibility are met in manufacturing process improvement. Reversible transformations are path independent and depend only on the endpoints from WIP level $W_B$ "Before" process improvement to WIP level $W_A$ "After" process improvement due to waste elimination. Equation (27) may be applied to predict the EBITDA increase in a company due to process improvement. Thus the Dissipation of EBITDA as waste is proportional to the Fluctuation of cycle time $\sigma_\tau$ and the Relative Entropy of WIP D $(\hat{p}_{At}|\hat{p}_{Bt})$.

Process Improvement

The following provides a discussion of process improvements. One example of waste elimination through process improvement is the reduction of setup time S. Setup time is the time to changeover a workstation from the production of a batch of part number "1" to produce a batch of a different part number "2". For example, the setup time on a lathe of e.g. 8 hours forces companies to produce e.g. part number "1" in a large batch of 500 pieces for about 80 hours to amortize the 8 hour setup cost and be economically efficient. If the immediate market demand is only for 50 pieces, 450 pieces will flow into Finished Goods inventory where they are subject to the waste of loss, damage, obsolescence, storage, retrieval costs, etc. Thus setup direct labor waste begets much larger hidden manufacturing overhead waste. By applying rapid set up methods, the setup time of a lathe may be reduced by 75% with minimal capital investment. The batch size, hence WIP, and through Little's Law the cycle time, may be reduced by 75% per equation (29) below. Other examples of waste include scrap, rework, machine downtime etc., each of which has a corresponding process improvement tool. The mathematical relationship between the quantity of WIP and these waste elements appears in equation (29) below.

4.0 Prioritization of Projects

The following provides a discussion of the prioritization of projects. Given that there is an EBITDA increase opportunity, the Formula for Process Efficiency Increase may guide the realization of that profit. Managers must decide between Process Improvement projects which are competing for limited resources and money. Assume that Lathe X has a 10 hour setup time, which, by spending $10,000 on rapid change tooling can be reduced to 2 hours. Lathe Y has 10% machine downtime, and by spending $10,000 on Total Productive Maintenance, this can be reduced to 1%. All other parameters are equal. Which project is best? The equation of WIP, derived in Appendix 6, as a function of waste parameters, given below in equation (29) is sufficient to answer this question.

$$W_{MIN} \cong \frac{SQm}{2(1 - X - m(\tilde{P}/(1-M)))} + Q \qquad (29)$$

In equation (29), S=Setup time, Q=number of different internal part numbers needed to produce the products, m=units produced per unit time, X=% scrap, $\tilde{P}$=processing time per unit after setup, M=% machine downtime, etc. Using test data that states that:

$\Delta\$ EBITDA $\cong \$812K$ (0.17)(1.414) (0.84)=$163K per month $\cong$ $2 Million per year is inserted, with parameters changed by process improvement shown in bold type, equation 29 gives:

$$\Delta W_x = \frac{(10)(100)(3.3)}{2(1-0-3.3(0.25/1-0))} - \frac{(2)(100)(3.3)}{2(1-0-3.3(0.25/1-0))} = 7542$$

$$\Delta W_Y = \frac{(10)(100)(3.3)}{2(1-0-3.3(0.25/1-0.1))} - \frac{(10)(100)(3.3)}{2(1-0-3.3(0.25/1-0.01))} = 9900$$

Thus based on WIP reduction, reducing machine downtime is a better project. But what is the return on the $10,000 investment, which is all important to management? For a factory total WIP of approximately 100,000 pieces, using the same data gives:

$\Delta Px=(\$924K)(0.17)(1/1.414)\log(100,000/92,458)$
   =$8700 per month $\Delta Py=(\$924K)(0.17)(1/1.414)\log(100,000/90,100)$
   =$11580 per month Thus reducing the machine downtime on Lathe B is the superior project, although both projects have about a three month payback. With the exception of $\tilde{P}$ in (29), all process parameters are clearly waste. $\tilde{P}$ may naively be interpreted as entirely value add cost. But if $\tilde{P}$ is 10 minutes per unit, and it is found possible to reduce $\tilde{P}$ to 6 minutes per unit due to either process improvement or new technology, then 4 minutes are suddenly waste. The opportunity to reduce $\tilde{P}$ should not be underestimated. While S can be reduced, in most cases it cannot be reduced to zero, hence $\tilde{P}$, M and X remain important and have a non-linear adverse impact on $W_{MIN}$ in (29). It is emphasized that the introduction of a new product may increase the number of internal part numbers beyond Q. This is only justified if the increased EBITDA is enough to offset the increased entropy cost in equation (27).

Sources of Entropy in a Supply Chain

The following provides a discussion of sources of Entropy in a supply chains. From equation (8) it can be seen that entropy may be caused by WIP, and from equation (29) it may be seen that WIP may be primarily caused by deterministic waste parameters. Additional WIP may be caused by the stochastic variation of the parameters in equation (29), and supply and demand which are generally not within the control of management. See also Appendix 10.

The following provides discussions of super-profit increases.

7.1 "Super Profit" Increase I

In Appendix 5 the Formula for Process Efficiency Increase below in equation (30) is derived [below as (129)].

$$\Delta \$EBITDA = (\$\mu_{(L+O)B} \sigma_\tau \sqrt{2}) \frac{D(\hat{p}_{Ai} | \hat{p}_{Bi})}{2} = \quad (30)$$

$$(\$\mu_{(L+O)B}) \left( \sigma_\tau \sqrt{2} \left( \log\left(\frac{W_B}{W_A}\right) + \frac{1}{2} \sum_{j=1}^{K} \left(\frac{n_{W_A j} \bar{b}_j}{W_A}\right) \log\left(\frac{n_{W_A j}}{n_{W_B j}}\right) \right) \right)$$

The first term in (30) is a log of an inverse function that rapidly rises as $W_A \ll W_B$. The second term of (30) is derived in Appendix 5 from a histogram of K bins of the $N_B$ different batch sizes before process improvement, with $K \cong \sqrt{N_B}$ where the j=1 bin contains the smallest batch sizes, and j=K the largest. $n_{W_{B1}}$ is the number of batches in the j=1 bin "Before" Process improvement and is a small number. $n_{W_{A1}}$ is the number of batches in the j=1 bin "After" Process improvement and is a very large number as $W_A \ll W_B$.

7.2 "Super Profit" Increase II

It may be seen that waste cost reduction is related to cycle time reduction from whatever source. If WIP is held constant in (1) but exit rate $\$_\mu$ or equivalently, Revenue $R per unit time is increased, cycle time may be reduced. To maintain constant WIP in (29) despite increased Revenue and hence exit rate m, waste costs S, X, etc. must be reduced. In Appendix 7 the impact on EBITDA of revenue growth from $$R_B$ to $$R_A$, is derived and obtains equation (33) below.

$$\Delta \$EBITDA = (\$\mu_{(L+O)B}) \left( \sigma_\tau \sqrt{2} \right. \quad (31)$$

$$\left. \left( \log\left(\frac{W_B}{W_A (R_B / R_A)}\right) + \frac{1}{2} \sum_{j=1}^{K} \left(\frac{n_{W_A j} \bar{b}_j}{W_A (R_B / R_A)}\right) \log\left(\frac{n_{W_A j} \bar{b}_j}{n_{W_B j} \bar{b}_j}\right) \right) \right)$$

It is noted that if $R_B > R_A$, EBITDA will increase even if $W_A = W_B$ due to cycle time reduction. It may therefore be concluded that the Formula for Process Efficiency Increase allows to the prediction of a potential EBITDA increase to Lean Six Sigma and guides project selections to attain the predicted EBITDA increase.

Figure 4:
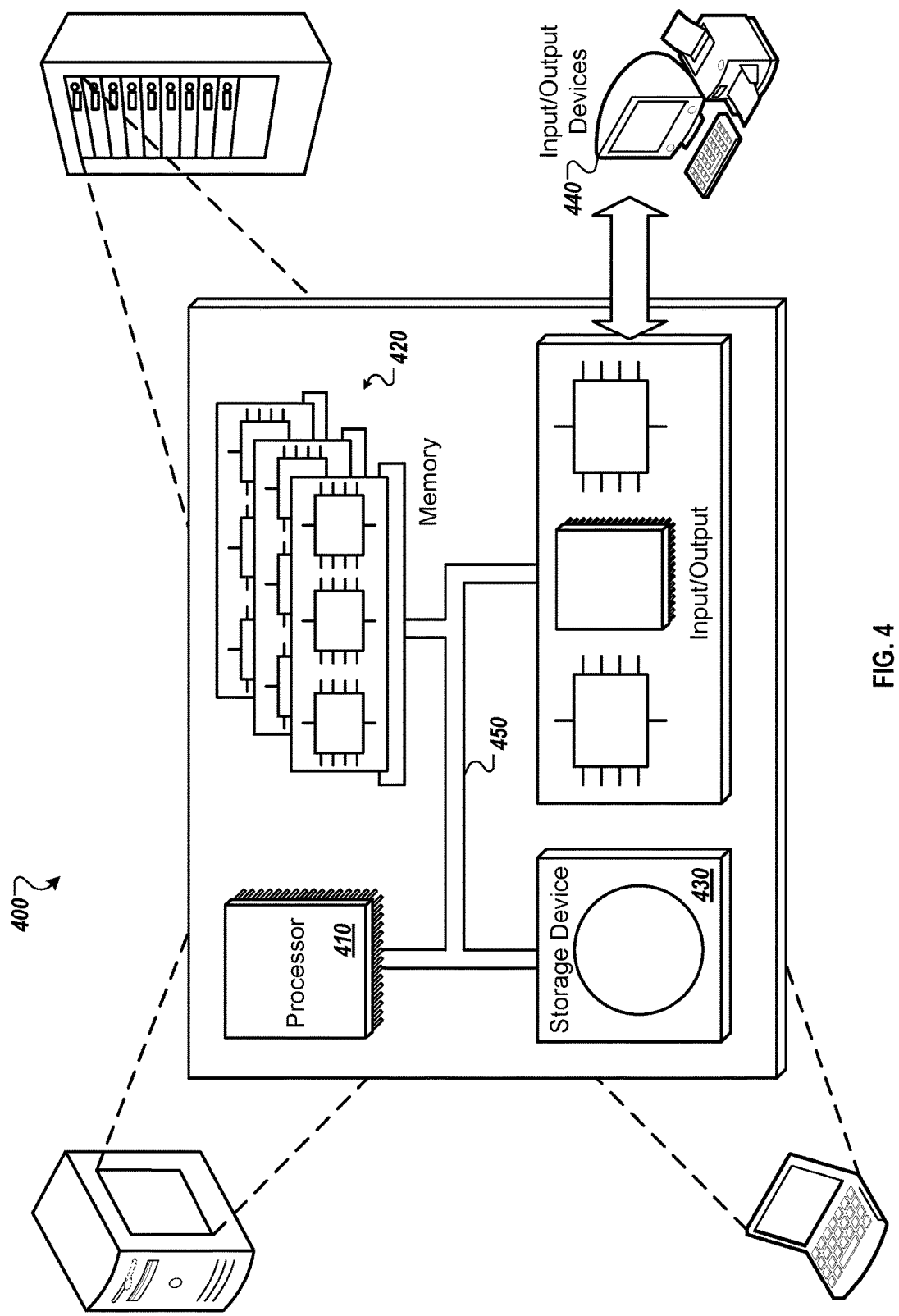
FIG. 4 is a schematic diagram of an exemplary system.
Like reference symbols in the various drawings indicate like elements.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the below claims.

The following appendices are provided as support to the above.

Appendix 1: Derivation of the Formula of Profit Increase

Faster cycle time may be equivalent to faster WIP velocity in equation (12), and higher energy in equation (17). Consider the WIP "Before" process improvement $W_B$. The velocity of $W_B$ through the process may be governed by Little's Law (1). A few units of WIP will travel a process path which has a smaller amount of WIP, and hence whose velocity will be faster than the average, and vice versa. Thus it is expected that the velocities of the pieces of WIP are distributed in a histogram of K bins with probability $p_B = [p_{B1} \ldots p_{Bk}]$ "Before" process improvement, and $p_A = [p_{A1} \ldots p_{Ak}]$ "After" process improvement, such that:

$$p_B = \left\{ p_{Bj} \mid 1 \le j \le K, 0 \le p_{Bj} \le 1, \sum_{j=1}^{K} p_{Bj} = 1 \right\} \tag{32}$$

$$p_A = \left\{ p_{Aj} \mid 1 \le j \le K, 0 \le p_{Aj} \le 1, \sum_{j=1}^{K} p_{Aj} = 1 \right\} \tag{33}$$

where $p_{Bj}$ is the probability that a piece of WIP is in the $j^{th}$ histogram bin in which the average energy per batch before process improvement is $E_{Bj}$ as derived in equation (17). The number of bins K chosen may be irrelevant as it will drop out of the final result. GAAP defines the total Gross Profit per unit "Before" Process Improvement as $G_B$={$Revenue−$(Material+Labor+Mfg. Overhead) }$_B$. (34)

The function G=f(E) may be derived as follows. Assume that the $j^{th}$ energy bin has $n_j$ batches with average batch size $\bar{b}_j$, thus WIP in the $j^{th}$ energy bin is $n_j\bar{b}_j$. Then the probability that a piece of WIP is in the $j^{th}$ bin is:

$$p_j = \frac{n_j \bar{b}_j}{W} = \frac{w_j}{W} \tag{35}$$

as in equation (8). The average energy $\bar{E}(B)$, "Before" Process improvement may be given by equation (38) below.

$$\bar{E}(B) = \sum_{j=1}^{K} p_{Bj} E_{Bj} \tag{36}$$

Given only the average value $\bar{E}(B)$, there may be an infinite number of values of $p_{Bj}$ which satisfy (36). it may be shown that the most probable distribution is that distribution which maximizes Shannon entropy.

$$H_{E(B)} = -k_M \sum_{j=1}^{K} p_{Bj} \log(p_{Bj}) \tag{37}$$

where $k_M$ is derived in Appendix 2. Since all the WIP W is in one of the K bins, the Shannon entropy may be rewritten as a function of the probability that a particular batch has energy which places it in the $j^{th}$ bin. Using equations (8) and (35), Shannon entropy "Before" and "After" process improvement may be given by the below equations.

$$S_{MB} = k_M \log W = \overbrace{-k_M \sum_{j=1}^{K} p_{Bj} \log p_{Bj}}^{\text{Shannon Entropy}} + \overbrace{k_M \sum_{j=1}^{K} p_{Bj} \log w_{Bj}}^{\text{Entropy of WIP/part no.}} \tag{38}$$

$$S_{MA} = k_M \log W = \overbrace{-k_M \sum_{j=1}^{K} p_{Aj} \log p_{Aj}}^{\text{Shannon Entropy}} + \overbrace{k_M \sum_{j=1}^{K} p_{Aj} \log w_{Aj}}^{\text{Entropy of WIP/part no.}} \tag{39}$$

In the above equations, $w_{Bj}$ is the amount of WIP in the $j^{th}$ bin. Given that the first term of (38) is Shannon Entropy, equation (38) may be regarded as an equation of total entropy, Shannon plus entropy of WIP/part no. The most probable distributions $\hat{p}_{Bj}$ and $\hat{p}_{Aj}$ may be obtained by maximizing the entropy S, which maximum occurs when $dS_M=0$. But it may be asked: is the value of the maximizing $\hat{p}_{Bi}$ affected by the addition of the second term in log $w_{Bj}$ in (38)? This question may be answered by applying the Jaynes Maximum Entropy formalism to (38) and showing that the $w_{Bj}$ term in fact drops out of the calculation of $\hat{p}_{Bj}$ and $\hat{p}_{Aj}$. Calculating the differential of (38) to maximize entropy, gives:

$$dS_{MB} = -k_M \sum_{j=1}^{K} (\log p_{Bj} + 1) dp_{Bj} + k_M \sum_{j=1}^{K} \log w_{Bj} dp_{Bj} + 0 = 0 \tag{40}$$

subject to the constraints:

$$\sum_{j=1}^{K} p_{Bj} = 1 \tag{41}$$

$$\sum_{j=1}^{K} dp_{Bj} = 0 \tag{42}$$

With similar expressions for "After" process improvement. From (17):

$$\sum_{j=1}^{K} E_j p_{Bj} = \frac{1}{2}(\$\mu_{(L+O)A})^2 \tag{43}$$

from (36), and $$d\overline{E}(B) = d\sum_{j=1}^{K} p_{Bj} E_{Bj} = \sum_{j=1}^{K} E_j dp_{Bj} = 0 \tag{44}$$

Where $E_j$ is the energy of the batches in the $j^{th}$ bin.

To maximize entropy, Lagrange multipliers $\lambda$ and $\mu$ are introduced, to form the expression:

$$dL_B = -k_M \sum_{j=1}^{K} (\log p_{Bj} + 1) dp_i + \tag{45}$$

$$k_M \sum_{j=1}^{K} \log w_{Bj} dp_{Bj} + \lambda \sum_{j=1}^{K} E_j dp_{Bj} + \mu \sum_{j=1}^{K} dp_{Bj} = 0$$

Where $k_M$, $\mu$, and $\lambda$ will be derived or eliminated below in (111).

$$dL_B = \sum_{j=1}^{K} (-k_M(\log p_{Bj} + 1) + k_M \log w_{Bj} + \lambda E_j + \mu) dp_{Bj} = 0$$

Which for arbitrary $dp_{Bj}$ requires, for all values of $j$:

$$\psi = (-k_M(\log \hat{p}_{Bj} + 1) + k_M \log w_{Bj} - \lambda E_j - \mu) = 0$$

Therefore $$\langle \psi \rangle = \sum_{j=1}^{K} (\hat{p}_{Bj})(-k_M(\log_j + 1) + k_M \log w_j - \lambda E_j - \mu) = 0 \tag{46}$$

$$\langle \psi \rangle = \sum_{j=1}^{K} (\hat{p}_j)(-k_M(\log \hat{p}_j) + k_M \log w_j - \lambda E_j - (\mu + k_M)) = 0$$

With similar expressions for $p_{Aj}$. For all $p_{Bj}$ this infers, from (37) and $$E = \sum_{j=1}^{K} E_j: \tag{47}$$

$$H_{EB} + k_M \sum_{j=1}^{K} \hat{p}_{Bj} \log w_{Bj} - \lambda E - (\mu + k_M) = 0$$

$$-(\mu + k_M) = -\left(H_{EB} + k_M \sum_{j=1}^{K} \hat{p}_{Bj} \log w_{Bj} - \lambda E\right)$$

$$(\mu + k_M) = \left(H_{EB} + k_M \sum_{j=1}^{K} \hat{p}_{Bj} \log w_{Bj} - \lambda E\right)$$

$$\mu = H_{EB} + k_M \sum_{j=1}^{K} \hat{p}_{Bj} \log w_{Bj} - \lambda E - k_M$$

Substituting (47) into (46) obtains $$\psi(\hat{p}_{Bj}) = -k_M(\log \hat{p}_{Bj} + 1) + k_M \log w_{Bj} - \tag{48}$$

$$\lambda E_j - \left(H_{EB} + k_M \sum_{j=1}^{K} \hat{p}_{Bj} \log w_{Bj} - \lambda E - k_M\right) = 0$$

$$\psi(\hat{p}_{Bj}) = -k_M(\log \hat{p}_{Bj}) + k_M \log w_{Bj} - \lambda E_j -$$

$$\left(H_{EB} + k_M \sum_{j=1}^{K} \hat{p}_i \log w_{Bj} - \lambda E\right) = 0$$

$$k_M(\log \hat{p}_{Bj}) = k_M \log w_{Bj} - \lambda E_j - \left(H_{EB} + k_M \sum_{j=1}^{K} \hat{p}_{Bj} \log w_{Bj} - \lambda E\right)$$

It may be seen that $w_{Bj}$ drops out of the final summation result in (54) and (56) below.

Exponentiation of (48) obtains:

$$\hat{p}_{Bj} = e^{-((H_{EB} + \lambda E)/k_M)} e^{-(\lambda E_j/k_M)} \tag{49}$$

$$\sum_{j=1}^{K} \hat{p}_{Bj} = e^{-((H_{EB} + \lambda E)/k_M)} e^{-(\lambda E_j/k_M)} = 1$$

$$e^{-((H_{EB} + \lambda E)/k_M)} = \frac{1}{\sum_{j=1}^{K} e^{-(\lambda E_j/k_M)}}$$

$$\hat{p}_{Bj} = \frac{e^{-(\lambda E_j/k_M)}}{\sum_{j=1}^{K} e^{-(\lambda E_j/k_M)}} = \frac{e^{-(E_j/k_M T)}}{\sum_{j=1}^{K} e^{-(E_j/k_M T)}} = \frac{e^{-\beta E_j}}{\sum_{j=1}^{K} e^{-\beta E_j}}$$

where the substitution $\lambda = 1/T$ has been made, where T is a variable derived in (112). The above equation (49) is the Maxwell-Boltzmann distribution.

Derivation of Formula for Process Efficiency Increase:

Equation (48) gives, "Before" process Improvement:

$$k_M(\log \hat{p}_{Bj}) = k_M \log w_{Bj} - \lambda E_j - \left(H_{EB} + k_M \sum_{j=1}^{K} \hat{p}_{Bj} \log w_{Bj} - \lambda E\right) \tag{50}$$

$$\log \hat{p}_{Bj} = +\log w_{Bj} - \frac{E_j}{k_M T} - \frac{H_{E(B)}}{k_M} - \sum_{j=1}^{K} \hat{p}_{Bj} \log w_{Bj} + \frac{E}{k_M T}$$

And "After" process improvement:

$$\log \hat{p}_{Aj} = \frac{k_M T \left(\log w_{Aj} - \sum_{j=1}^{K} \hat{p}_{Aj} \log w_{Aj}\right) - T H_{E(A)}}{k_M T} \tag{51}$$

$$\log \hat{p}_{Bj} = \frac{K_M T \left(\log w_{Bj} - \sum_{j=1}^{K} \hat{p}_{Bj} \log w_{Bj}\right) - T H_{E(B)}}{k_M T}$$

summing (50) and (51) over $\hat{p}_{Aj}$ gives:

$$\sum_{j=1}^{K} \hat{p}_{Aj}\log\hat{p}_{Bj} = \sum_{j=1}^{K} \hat{p}_{Aj}\left(\frac{k_M T\left(\log w_{Bj} - \sum_{j=1}^{K} \hat{p}_{Bj}\log w_{Bj}\right) - TH_{E(B)}}{k_M T}\right) \quad (52)$$

$$\sum_{j=1}^{K} \hat{p}_{Aj}\log\hat{p}_{Aj} = \sum_{j=1}^{K} \hat{p}_{Aj}\left(\frac{k_M T\left(\log w_{Aj} - \sum_{j=1}^{K} \hat{p}_{Bj}\log w_{Aj}\right) - TH_{E(A)}}{k_M T}\right) \quad (53)$$

Subtracting (52) from (53) obtains $$H_{SA} - H_{SB} = \sum_{j=1}^{K} \hat{p}_{Aj}\log\hat{p}_{Aj} - \sum_{j=1}^{K} \hat{p}_{Aj}\log\hat{p}_{Bj} = \quad (54)$$

$$\sum_{j=1}^{K} \hat{p}_{Aj}\left(\frac{k_M T\left(\log w_{Aj} - \sum_{j=1}^{K} \hat{p}_{Aj}\log w_{Aj}\right) - TH_{E(A)}}{k_M T}\right) - \quad (55)$$

$$\frac{k_M T\left(\log w_{Bj} - \sum_{j=1}^{K} \hat{p}_{Bj}\log w_{Bj}\right) - TH_{E(B)}}{k_M T}$$

Note that, when summed over $\hat{p}_{Aj}$, the term in the first expression, $$\left(\log w_{Aj} - \sum_{j=1}^{K} \hat{p}_{Aj}\log w_{Aj}\right)$$

is zero:

$$\sum_{j=1}^{K} \hat{p}_{Aj}\left(\log w_{Bj} - \sum_{j=1}^{K} \hat{p}_{Bj}\log w_{Bj}\right) = \sum_{j=1}^{K} \hat{p}_{Bj}\log w_{Bj} -$$

$$\sum_{j=1}^{K} \hat{p}_{Bj}\left(\sum_{j=1}^{K} \hat{p}_{Bj}\log w_{Bj}\right)$$

$$= \sum_{j=1}^{K} \hat{p}_{Bj}\log w_{bj} - (1)\left(\sum_{j=1}^{K} \hat{p}_{Bj}\log w_{Bj}\right) = 0$$

It may be concluded that the maximization of total entropy log W in (38) which contains the term $$\sum_{j=1}^{K} p_j \log w_j$$

is equivalent to maximizing only Shannon Entropy $$-\sum_{j=1}^{K} p_j \log p_j.$$

Thus (54) becomes:

$$\sum_{j=1}^{K} \hat{p}_{Aj}\log\hat{p}_{Aj} - \sum_{j=1}^{K} \hat{p}_{Aj}\log\hat{p}_{Bj} = \quad (56)$$

$$\sum_{j=1}^{K} \hat{p}_{Aj}\left(\frac{-TH_{E(A)} + E_{(A)}}{k_M T} - \frac{-TH_{E(B)} + E_{(B)}}{k_M T}\right)$$

Assuming that the number of different part numbers Q and the demand mix is constant:

$$H_{E(A)} = \sum_{j=1}^{K} p_j \log p_j = H_{E(B)}$$

Equation (56) becomes:

$$\sum_{j=1}^{K} \hat{p}_{Aj}\log\hat{p}_{Ai} - \sum_{j=1}^{K} \hat{p}_{Aj}\log\hat{p}_{Bj} = \quad (57)$$

$$D(p_{WA} \| p_{WB}) = \sum_{j=1}^{K} \hat{p}_{Aj}\left(\frac{E_{(A)}}{k_M T} - \frac{E_{(B)}}{k_M T}\right) = \beta(E_{(A)} - E_{(B)})$$

where D $(p_{WA}\|p_{WB})$ is a symbol for Relative Entropy, the divergence of Distribution "A" from distribution "B". Using $$E_{(B)} = \frac{1}{2}(\$\mu_{(L+O)B})^2$$

from (36) gives, with $\beta_M = (1/k_M T)$ $$\sum_{j=1}^{K} \hat{p}_{Aj}\log\hat{p}_{Aj} - \sum_{j=1}^{K} \hat{p}_{Aj}\log = \quad (58)$$

$$D(\hat{p}_{Aj} | \hat{p}_{Bj}) = \beta_M\left(\frac{1}{2}(\$\mu_{(L+O)A})^2 - \frac{1}{2}(\$\mu_{(L+O)B})^2\right)$$

$$\sum_{j=1}^{K} \hat{p}_{Ai}\log\left(\frac{\hat{p}_{Aj}}{\hat{p}_{Bj}}\right) = D(\hat{p}_{Aj} | \hat{p}_{Bj}) \quad (59)$$

which is the Relative Entropy between the distributions $\hat{p}_{Ai}$ and $\hat{p}_{Bi}$. Using (59), (58) becomes:

$$(E_{(A)} - E_{(B)}) = \left(\frac{1}{\beta_M}\right) D(\hat{p}_{Aj} | \hat{p}_{Bj}) \quad (60)$$

Note that neither $k_M$ nor T appears separately, but only their inverse product $\beta_M$ which is derived in Appendix 2-4. The explicit EBITDA increase is obtained below $$\Delta EBITDA = \$\mu_{(L+O)B} - \$\mu_{(L+O)A} \quad (61)$$

by solving equation (60)

$$(E_{(A)} - E_{(B)}) = \frac{1}{2}(\$\mu_{(L+O)A}^2 - \$\mu_{(L+O)B}^2) = \left(\frac{1}{\beta_M}\right)D(\hat{p}_{Aj} \mid \hat{p}_{Bj}) \quad (62)$$

$$\$\mu_{(L+O)A} = \sqrt{\$\mu_{(L+O)B}^2 + \left(\frac{2}{\beta_M}\right)D(\hat{p}_{Aj} \mid \hat{p}_{Bj})} = \$\mu_{(L+O)B}\sqrt{1 + \left(\frac{2}{\beta_M \$\mu_{(L+O)B}^2}\right)D(\hat{p}_{Aj} \mid \hat{p}_{Bj})} \quad (63)$$

Since the waste reduction is much smaller than total cost $\$\mu_{(L+O)B}$, $$\$\mu_{(L+O)B}^2 \gg \left(\frac{1}{\beta_M}\right)D(\hat{p}_{Aj} \mid \hat{p}_{Bj})$$

a Taylor expansion of (63) is performed to obtain:

$$\$\mu_{(L+O)A} \cong \$\mu_{(L+O)B}\left(1 + \left(\frac{2}{2\beta_M \$\mu_{(L+O)B}^2}\right)D(\hat{p}_{Aj} \mid \hat{p}_{Bj})\right) \quad (64)$$

Thus the Equation for Profit Increase is:

$$\Delta\$EBITDA = \$\mu_{(L+O)A} - \$\mu_{(L+O)B} = \quad (65)$$

$$\$\mu_{(L+O)B}\left(\left(\frac{1}{\beta_M}\right)\frac{D(\hat{p}_{Aj} \mid \hat{p}_{Bj})}{(\$\mu_{(L+O)B})^2}\right) = \left(\left(\frac{1}{\beta_M}\right)\frac{D(\hat{p}_{Aj} \mid \hat{p}_{Bj})}{(\$\mu_{(L+O)B})}\right)$$

Appendix 2:
Formal Derivation of the Conversion Factor $1/\beta_M$ from Entropy to Dollars of Waste An expression for $1/\beta_M$ in (65) from first principles in the manufacturing application is derived, culminating in (111). In Appendix 1, Equation (49), the Maxwell-Boltzmann distribution of WIP Energy was derived:

$$\hat{p}_j = \frac{e^{-\beta E_j}}{\sum_{i=1}^{Q} e^{-\beta E_j}} \quad (66)$$

where $E_j$ is the energy of the $j^{th}$ batch. A transition from discrete energy $E_j$ to continuous energy E is performed by defining $\omega(E)$ as the density of energy states as a function of E, between E and E+$\delta$E, with $\beta$ an unknown constant. The average value of energy E may be written as:

$$\langle E \rangle = \frac{\int_{-\infty}^{+\infty} E\omega(E)e^{-\beta E}dE}{\int_{-\infty}^{+\infty} \omega(E)e^{-\beta E}dE} \quad (67)$$

The formula for the mean square fluctuation of energy is the Variance of E defined as:

$$Var\{\hat{E}\} = \langle (E-\bar{E})^2 \rangle = \langle E^2 - 2E\bar{E} + \bar{E}^2 \rangle = \langle E^2 \rangle - 2\langle E \rangle \langle E \rangle + \langle E \rangle^2 = \langle E^2 \rangle - \langle E \rangle^2 \quad (68)$$

It may be shown that $Var\{\hat{E}\} = \partial \langle E \rangle / \partial \beta$ lap by differentiating (67) with respect to $\beta$:

$$\frac{\partial \langle E \rangle}{\partial \beta} = \frac{\int_{-\infty}^{+\infty} -E^2 e^{-\beta E}\omega(E)dE}{\int_{-\infty}^{+\infty} e^{-\beta E}\omega(E)dE} - \left(\frac{\int_{-\infty}^{+\infty} Ee^{-\beta E}\omega(E)dE}{\int_{-\infty}^{+\infty} e^{-\beta E}\omega(E)dE}\right)^2 = \quad (69)$$

$$\langle E^2 \rangle - \langle E \rangle^2 = Var\{E\}$$

$$\frac{\partial \langle E \rangle}{\partial \beta} = \frac{\partial \langle E \rangle}{\partial T}\left(\frac{\partial T}{\partial \beta}\right) \quad (70)$$

Where T is the variable used in (49) which will be derived in (111):

$$\frac{\partial T}{\partial \beta} = -\frac{1}{k_M \beta_M^2} = -k_M T^2 \quad (71)$$

And from (69)

$$\frac{\partial \langle E \rangle}{\partial \beta} = -k_M T^2 \frac{\partial \langle E \rangle}{\partial T} = -Var\{E\} \quad (72)$$

$$\left(\frac{1}{\beta_M}\right) = \frac{Var\{E\}}{\left(\frac{1}{\lambda}\right)\left(\frac{\partial \langle E \rangle}{\partial(1/\lambda)}\right)} = \frac{Var\{E\}}{T\left(\frac{\partial \langle E \rangle}{\partial T}\right)}$$

With $\lambda = 1/T$. It is noted that $k_M$ and T are separately derived in Appendix 4 (114). Thus:

$$1/\beta_M = k_M T = \frac{Var\{E\}}{\langle \partial E/\partial T \rangle T} \quad (73)$$

Recall that the average energy of motion of WIP "Before" process improvement was derived, as a function of dollars, in (17) as $(\frac{1}{2})(\$\mu_{(L+O)B})^2$. $Var\{E\}$ is the Energy due to the fluctuation of WIP energies which must be derived as a function of the variable T to calculate $(\partial E/\partial T)$ in (73). The previously derived supply chain form of Energy (17) and velocity (12) in (73) may then be used.

Calculation of energy of WIP energy fluctuation $\langle E(T) \rangle$ and $\langle (\partial E/\partial T) \rangle$ As noted in above, the conversion factor $\beta = 1/k_M T$ in thermodynamics is the result of fluctuation of the energy of a gas of temperature T. Although the theory only uses the product $\beta = 1/k_M T$, expressions for $k_M$ and T are derived in (114). To compute the term $(\partial E/\partial T)$ in (73) the average $\langle E \rangle$ is computed:

$$\langle E \rangle = \frac{\int f(E)EdP}{\int f(E)dP} \quad (74)$$

In equation (76), P is the momentum of WIP. The calculation of (74) requires that the probability distribution f(E) of the fluctuating energy of WIP which was derived as the Maxwell-Boltzmann distribution in equation (49) using the Jaynes Maximum Entropy methodology is substituted. Equation (49) is then used to compute the average value of $\hat{E}(T)$ in (74) and then $\langle(\partial E/\partial T)\rangle$, using the Maxwell-Boltzmann distribution of energies as:

$$\langle E \rangle = \frac{\int e^{-\beta \hat{E}} \hat{E} dP}{\int e^{-\beta \hat{E}} dP} = \frac{\int e^{-\beta(\$\mu_{(L+O)}^2/2)}((\$\mu_{(L+O)})^2/2)dP}{\int e^{-\beta(\$\mu_{(L+O)})^2/2)}dP} \quad (75)$$

where P is the momentum of WIP. Since the motion of WIP obeys Newtonian dynamics, $P=M_eV$, $E=(\frac{1}{2})M_eV^2$. An expression for Velocity V was given in (12), but an expression for the effective mass $M_e$ of WIP must be derived, which will allow the calculation of (75) and replaces the "formal" equation (73) with an explicit expression in terms of empirical constants.

Appendix 3:

Derivation of the "Effective Mass" $M_e$ of a Supply Chain:

The presently unknown "effective mass" $M_e$ of the WIP will, like any dynamical system, affect the actual motion of the WIP. It may be shown that Newtonian mechanics governs the motion of WIP. To find the "effective mass" of the process, the *Principle of Least Action* from which Newton's Laws may be derived may be applied to the motion of the material particles of WIP. For both non-dissipative and dissipative systems, Action may be defined as:

$$A = \int_{t_i}^{t_r}(L+H)dt = 2\int_{t_i}^{t_r}(E)dt \quad (76)$$

Where L is the Lagrangian L=E−V, and H is the Hamiltonian H=E+V, where E=Kinetic Energy, V=Potential Energy, and $t_f-t_i$ is the time required for the particles to move from initial to final position. Little's Law (12) yields:

$$E = \frac{1}{2}M_eV^2 = \frac{1}{2}M_e\left(\frac{\$\mu_{(L+O)B}}{\$\omega_{(L+O)B}}\right)^2 \quad (77)$$

The effective mass will be that value of $M_e$ which results in a minimum of Action, at which point $$\delta A = 0 \quad (78)$$

$$\delta A =$$

$$0 = \delta \int_{t_i}^{t_r} \frac{1}{2}\left(M_e \frac{(\$\mu_{(L+O)B})^2}{(\$\omega_{(L+O)B})^2}\right)dt = \int_{t_i}^{t_r} \frac{1}{2}\delta\left(M_e \frac{(\$\mu_{(L+O)B})^2}{(\$\omega_{(L+O)B})^2}\right)dt$$

$$\delta A = \int_{t_i}^{t_r} \frac{1}{2}\left(\delta M_e \frac{(\$\mu_{(L+O)B})^2}{(\$\omega_{(L+O)B})^2} + \underbrace{M_e \frac{2(\$\mu_{(L+O)B})\delta(\$\mu_{(L+O)B})}{(\$\omega_{(L+O)B})^2}}_{\cong 0} - M_e \frac{2(\$\mu_{(L+O)B})^2\delta(\$\mu_{(L+O)B})}{(\$\omega_{(L+O)B})^3}\right)dt \quad (79)$$

A small change $\delta(\$\omega_{L+O})$ in the amount of WIP generates negligible changes in cost $\delta(\$\mu_{(L+O)B})$ thus $\delta(\$\mu_{(L+O)B})<<\delta(\$\omega_{(L+O)B})$, and the second term in (78) is small compared to the third term. The first and third terms are functions of WIP $\$\omega_{(L+O)B}$ which is not constant during the process improvement time interval $t_f-t_i$, and therefore whose $\delta(\$\omega_{L+O})$ variation is non-zero. Hence, for $\delta A=0$ it is required that:

$$\delta M_e \frac{(\$\mu_{(L+O)B})^2}{(\$\omega_{(L+O)B})^2} - M_e \frac{2(\$\mu_{(L+O)B})^2\delta(\$\mu_{(L+O)B})}{(\$\omega_{(L+O)B})^3} = 0 \quad (80)$$

re-arranging we obtain:

$$\delta M_e = 2M_e \frac{\delta(\$\omega_{(L+O)B})}{\$\omega_{(L+O)B}},$$

and dividing both sides by $M_e$:

$$\frac{\delta M_e}{M_e} = 2\frac{\delta(\$\omega_{(L+O)B})}{\$\omega_{(L+O)B}},$$

integration yields:

$$\log(M_e) = 2\log(\$\omega_{(L+O)B}) + K$$

$$M_e = e^K(\$\omega_{(L+O)B})^2 \quad (81)$$

Now to determine K in (81) the velocity form of Little's Law is employed (12):

$$V = \frac{\$\mu_{L+O}}{\$\omega_{L+O}} \quad (82)$$

The derivative of the velocity V is taken to obtain the acceleration a, which is equal to Force/Mass:

$$a = \frac{dV}{dt} = -\frac{\$\mu_{L+O}}{(\$\omega_{L+O})^2}\left(\frac{d\omega}{dt}\right) + \frac{1}{\$\omega_{L+O}}\left(\frac{d\mu}{dt}\right) = \frac{F}{M_e}$$

now the rate of cost reduction $$\left(\frac{d\mu}{dt}\right) \square \left(\frac{d\omega}{dt}\right) \text{ and } \frac{\$\mu_{L+O}}{(\$\omega_{L+O})^2} \approx \frac{1}{\$\omega_{L+O}}, \therefore,$$

$$a = -\frac{\$\mu_{L+O}}{(\$\omega_{L+O})^2}\left(\frac{d\omega}{dt}\right) = \frac{F}{M_e}$$

since static mass $M_e$ is not time dependent, the time dependent terms $$\mu_{L+O}\left(\frac{d\omega}{dt}\right)$$

are the Force, $$\frac{1}{(\$\omega_{L+O})^2} = \frac{1}{M_e}$$

and it may be concluded that K=0 in (81)
Thus the condition δA=0 requires that:

$$M_e = \$\omega_{(L+O)B}^2 \tag{83}$$

$$F = -\$\mu_{L+O}\left(\frac{d\omega}{dt}\right) \tag{84}$$

Thus, the accelerating Force on the WIP due to process improvement is proportional to the rate of WIP reduction. The force is positive since dω is negative for process improvement. Note that effective mass in (83) has units of measure $\$^2$, whereas velocity has units of measure per unit time. Thus Energy=(½)MeV² has units of measure ($/time)². Since $\sigma_\tau$ is the standard deviation in months per month and is dimensionless per (108), the Formula of Profit Increase (27) is denominated in dollars per unit time as a natural consequence of Little's Law (1):

$$E_B = \frac{1}{2}M_e\left(\frac{\$\mu_{(L+O)B}}{\$\omega_{(L+O)B}}\right)^2 = \frac{1}{2}(\$\omega_{(L+O)B})^2\left(\frac{\$\mu_{(L+O)B}}{\$\omega_{(L+O)B}}\right)^2 = \tag{85}$$

$$\frac{1}{2}(\$\mu_{(L+O)B})^2$$

$$E_A = \frac{1}{2}(\$\mu_{(L+O)A})^2$$

Note that WIP Energy is measured in units of dollars squared. The theory will show that $\$\mu_{(L+O)B} > \$\mu_{(L+O)A}$ reflecting the result that, "After" process improvement, the same number μ units per unit time are completed in (1) with less dollars of labor and overhead cost $\$\mu_{(L+O)A}$ expended per unit time. The energies (85) may be inserted into (57) which will ultimately allow the computation of the EBITDA increase due to process improvement. The energies calculated in (85) are only dependent on exit rate $\$\mu_{(L+O)A}$. Thus it may be concluded that (85) is the energy of the motion of exits from WIP, not the fluctuations in Energy due to the variation of WIP velocities, which will be derived in Appendix 4. Equation (57) may be written as:

$$E_A - E_B = \frac{1}{2}(\$\mu_{(L+O)A})^2 - \frac{1}{2}(\$\mu_{(L+O)B})^2 = \tag{86}$$

$$g(P_A) - g(P_B) = (1/\beta_M)D(p_{WA} \| p_{WB})$$

where $g(P_A)$ and $g(P_B)$ are functions of the EBITDA "Before" and "After" process improvement which will be derived below. Intuitively, one might have expected that the mass of a process in (83) would be directly proportional to the WIP $\$\omega_{(L+O)}$ rather than $(\$\omega_{(L+O)})^2$. However, average WIP velocity is governed by Little's Law (1). Thus the velocity of motion of each piece of WIP is, on average, coupled to all the other pieces of WIP. This coupling is analogous to an inductor with N turns, in which each turn is magnetically coupled to all the other turns, leading to self-inductance proportional to $N^2$ rather than N. Inductance plays the role of Mass in the differential equations of electrical circuits. The total mass of a process is an example of a "collective phenomena" dependent on the interaction of all units of WIP rather than the sum of separate, non-interacting pieces. Due to (83), $M_e = (\$\omega_{(L+O)B})^2$ hence the mass of each unit of WIP is coupled to all the other units of mass of WIP and act as a single unit of Mass $M_e = (\$\omega_{(L+O)B})^2$. From (12) and (83) the momentum P of WIP is:

$$P = M_e v = (\$\omega_{(L+O)})^2\left(\frac{\$\mu_{L+O}}{\$\omega_{L+O}}\right) = (\$\omega_{(L+O)})(\$\mu_{L+O}) \tag{87}$$

$$dP = (\$\omega_{(L+O)})\$d(\$\mu_{L+O}) + (\$\mu_{L+O})d(\$\omega_{(L+O)})$$

However, $\omega_{(L+O)}$ is slowly declining as a function of a multi-year process improvement, whereas velocity $d(\$\mu_{L+O})$ is changing greatly in magnitude daily due to encountering more or less WIP than average as discussed next, and $(\$\omega_{(L+O)}) > (\$\mu_{(L+O)B})$, hence, $$(\$\omega_{(L+O)})\$d(\$\mu_{L+O}) \gg (\$\mu_{L+O})d(\$\omega_{(L+O)})$$

$$dP \cong (\$\omega_{(L+O)})\$d(\$\mu_{L+O})$$

and (75) becomes $$\langle E \rangle = \frac{\int e^{-\beta((\$\mu_{(L+O)})^2/2)}((\$\mu_{(L+O)})^2/2)\$d(\$\mu_{L+O})}{\int e^{-\beta((\$\mu_{(L+O)})^2/2)}\$d(\$\mu_{L+O})} = \tag{88}$$

$$\frac{\int e^{-\beta((\$\mu_{(L+O)})^2/2)}((\$\mu_{(L+O)})^2/2)\$d(\$\mu_{(L+O)})}{\int e^{-\beta((\$\mu_{(L+O)})^2/2)}\$d(\$\mu_{L+O})}$$

$$\langle E \rangle = \frac{\frac{\partial}{\partial \beta}\int e^{-\beta((\$\mu_{(L+O)})^2/2)}\$d(\$\mu_{(L+O)})}{\int e^{-\beta((\$\mu_{(L+O)})^2/2)}\$d(\$\mu_{(L+O)})} = \tag{89}$$

$$\frac{\partial}{\partial \beta}\log\int e^{-\beta((\$\mu_{(L+O)})^2/2)}\$d(\$\mu_{L+O})$$

To evaluate (89) the dummy variable, y, is defined as $$y = \beta^{1/2}\$\mu_{L+O}/\sqrt{2} \Phi \mu_{(L+O)} = \beta^{-1/2}\sqrt{2}y. \tag{90}$$

Then, $d\mu_{(L+O)} = \beta^{-1/2}\sqrt{2}dy$ and $$\int e^{-\beta((\$\mu_{(L+O)})^2/2)}\$d\mu_{(L+O)} = \beta^{-1/2}\sqrt{2}\int e^{-y^2}dy \tag{91}$$

Substituting (91) into (89), the average Energy can now be obtained as $$\langle E \rangle = -\frac{\partial}{\partial \beta}\log\left(\beta^{-1/2}\sqrt{2}\int e^{-y^2}dy\right) = \tag{92}$$

$$-\frac{\partial}{\partial \beta}\left(-\frac{1}{2}\log\beta + \log\sqrt{2} + \overset{\text{no explicit }\beta\text{ dependence}}{\log\int e^{-y^2}dy}\right) = \frac{\partial}{\partial \beta}\left(\frac{1}{2}\log\beta\right)$$

-continued $$\langle E \rangle = \frac{1}{2}\left(\frac{1}{\beta_M}\right) = \frac{1}{2}\left(\frac{1}{k_M T}\right) \quad (93)$$

There may be one quadratic degree of freedom in the energy, ($\$\mu_{(L+O)}$)² and (93) is the total average energy of WIP as a function of $\beta_M$.

Appendix 4:
Explicit Formula for Conversion factor $\beta_M$ of Manufacturing Entropy to $ Waste Equation (73) is used to calculate $\beta_M$. Differentiation of (93), with $k_M$ and T are derived in (111)

$$\left(\frac{\partial \langle E \rangle}{\partial T}\right) = \frac{\partial}{\partial T}\left(\frac{1}{2}\left(\frac{1}{\beta}\right)\right) = \frac{\partial}{\partial T}\left(\frac{1}{2}k_M T\right) = \frac{1}{2}k_M \quad (94)$$

Hence (73) can be rewritten as, $$1/\beta = k_M T = \frac{\text{Var}\{E_B\}}{(1/2)k_M T} \quad (95)$$

$$(1/\beta)^2 = 2\text{Var}\{E_B\}$$

giving $$(1/\beta_M) = \sqrt{2\text{Var}\{E_B\}} \quad (96)$$

Derivation of the Variance of Energy E:

To obtain the Variance of energy, consider that WIP is produced in N discrete batches of quantity $b_j$ pieces. The subscript "j" refers to one specific batch of the N batches on which data is being gathered, not a part number. As a batch 1), travels through the factory, the amount of WIP it encounters during its route may differ from the average amount of WIP encountered per batch. Hence it may encounter WIP $\$\omega+\Delta\$\omega$ as it travels its entire path through the factory, which may cause variation in velocity from the mean. The variation $\Delta\$\omega$ may be caused by variation from mean values of setup time, processing time per unit after setup, scrap and rework, machine downtime, with resulting increases or decreases in WIP; as well as relatively small impacts of stochastic variation (discussed in Appendix 10). Through Little's Law, the velocity of the $j^{th}$ batch of WIP may thus vary from the average. It is required that the $\Delta\$\omega_j$ of each batch exiting WIP is empirically computed. This calculation may be accomplished since all manufacturing organizations or factories know the date $t_{jr}$ when the $j^{th}$ batch was released into WIP until the date of its departure $t_{jd}$ to Finished Goods. If a batch requires "outside processing" e.g. plating, heat treat, etc., that time may be subtracted. Little's Law may be applied to each batch "Before" process improvement which departed WIP to Finished Goods:

$$(t_{jd} - t_{jr}) - \bar{\tau} = \quad (97)$$

$$\Delta\tau_j = \frac{\$\omega_{(L+O)B} + \Delta\$\omega_{j(L+O)B}}{\$\mu_{(L+O)B}} - \frac{\$\omega_{(L+O)}}{\$\mu_{(L+O)}} = \frac{\Delta\$\omega_{j(L+O)B}}{\$\mu_{(L+O)B}}$$

$$\Delta\$\omega_{j(L+O)B} = \$\mu_{(L+O)B}((t_{jd} - t_{jr}) - \bar{\tau}) = \$\mu_{(L+O)B}(\Delta\tau_j)$$

$$V_j = \frac{\$\mu_{(L+O)B}}{\$\omega_{(L+O)B} + \Delta\$\omega_{i(L+O)B}} =$$

$$\frac{\$\mu_{(L+O)B}}{\$\omega_{(L+O)B} + \$\mu_{(L+O)B}(\Delta\tau_j)} = \frac{\$\mu_{(L+O)B}}{\$\omega_{(L+O)B}\left(1 + \left(\frac{\$\mu_{(L+O)B}}{\$\omega_{(L+O)B}}\right)(\Delta\tau_j)\right)}$$

$$V_j = \frac{\$\mu_{(L+O)B}}{\$\omega_{(L+O)}}\left(1 - \left(\frac{\$\mu_{(L+O)B}}{\$\omega_{(L+O)}}\right)(\Delta\tau_j)\right)$$

The variance of the N data points may be derived directly from the definition of variance.

$$\text{Var}\{E\} = \sum_{j=1}^{N} p_j(E_j - \langle E \rangle)^2 \quad (98)$$

The energy of the $j^{th}$ batch moving with velocity $V_j$ is $E_j$ and $\langle E \rangle$, the expectation of $[E_j]$, is the energy of an equal amount of mass moving with average velocity $\mu/\omega$. Each $E_j$ may be unique because it may not exactly equal any other value $E_k$, hence because the frequency of occurrence is 1. Thus the probability $p_j$ is:

$$p_j = \frac{1}{N} \quad (99)$$

It should be noted that "j" refers to the $j^{th}$ batch, not the $i^{th}$ part number, and in fact a given part number may be repeated in a group of N batches.

Now the total Energy of the Process is: $E=(\frac{1}{2})M_e V^2$. The direct expansion of (98) is:

$$\text{Var}\{E\} = \sum_{j=1}^{N} p_j(E_j - \langle E \rangle)^2 = \sum_{j=1}^{N} p_j\left(\frac{1}{2}M_j V_j^2 - \frac{1}{2}\left(\frac{1}{N}\right)M\langle V \rangle^2\right)^2 \quad (100)$$

where the second term is an expectation. However, as discussed Appendix 3, the mass of a process is the square of the total amount of WIP (either $W^2$ or $(\$\omega)^2$), and is a "collective phenomena" dependent on the interaction of all pieces of WIP through Little's Law. A similar collective phenomena is the inductance L of a solenoid of N turns, in which L varies as the square of the number of turns, i.e., $L \propto N^2$. The inductance of a single turn is however, not proportional to L/N, but is proportional to the log of the radius of a turn. Thus it may not be assumed that the mass of a single batch of the N batches has mass:

$$M_j \stackrel{?}{=} \frac{M}{N} \stackrel{?}{=} \left(\frac{\$\omega_{(L+O)B}^2}{N}\right) \quad (101)$$

Further, it may not be assumed that the mass of the $j^{th}$ batch is $p_j\$\omega_{(L+O)B}^2$ since this would be equivalent to (101). Little's Law must be relied on, which explains the "collective phenomenon" quantitatively. Little's Law (1) requires that the rate $\$_\mu$ per unit time at which WIP exits the process in equation (1) must be matched by an equal amount of raw material, labor and overhead cost which enters WIP at the same rate to maintain constant cycle time. As a dollars leave raw material and enter WIP, they thus must displace a batch of WIP as it is completed in the $1^{st}$ Workstation. WIP from the 1st Workstation must in turn displace WIP just completed in the 2nd Workstation, etc., in accordance with the "Pull" System. If the factory uses ERP "push" scheduling, the average result is the same so long as long-term supply equals long-term demand per the discussion of Section 1.0. Thus to accelerate one batch of WIP under the process improvement force (84) requires the acceleration of all the WIP in the process ahead of and behind the $j^{th}$ batch. Hence the inertial reaction of one batch of WIP equals the total mass of the process which is $W^2$ or $\$\omega_{(L+O)B}^2$ as derived in (83).

$$\text{Var}\{E\} = \sum_{j=1}^{N} p_j (E_j - \langle E \rangle)^2 = \quad (102)$$

$$\sum_{j=1}^{N} p_j \left( \frac{1}{2} M_j V_j^2 - \frac{1}{2} M \langle V \rangle^2 \right)^2 = \sum_{j=1}^{N} p_j \left( \frac{1}{2} M V_j^2 - \frac{1}{2} M \langle V \rangle^2 \right)^2$$

Now since the mass of WIP $M = \$\omega_{(L+O)B}^2$, (102) becomes:

$$\text{Var}\{E\} \cong \sum_{j=1}^{N} M^2 p_j \left( \frac{1}{2} V_j^2 - \frac{1}{2} \langle V \rangle^2 \right)^2 = \quad (103)$$

$$\frac{\$\omega_{(L+O)B}^4}{4} \sum_{j=1}^{N} p_j (V_j^2 - \langle V \rangle^2)^2$$

And substituting (97) into (103) obtains, with $$E = \frac{1}{2} M_e V^2 = \frac{1}{2} \$\omega_{(L+O)B}^2 V^2 :$$

$$\text{Var}\{E\} \cong \frac{\$\omega_{(L+O)B}^4}{4} \quad (104)$$

$$\sum_{j=1}^{N} p_j \left( \left( \frac{\$\mu_{(L+O)B}}{\$\omega_{(L+O)B}} \left( 1 - \left( \frac{\$\mu_{(L+O)B}}{\$\omega_{(L+O)B}} \right) (\Delta \tau_j) \right) \right)^2 - \left( \frac{\$\mu_{(L+O)B}}{\$\omega_{(L+O)B}} \right)^2 \right)^2$$

Expanding the first square term in parenthesis obtains:

$$\text{Var}\{E\} \cong \frac{\$\omega_{(L+O)B}^4}{4} \sum_{j=1}^{N} p_j \quad (105)$$

$$\left( \left( \left( \frac{\$\mu_{(L+O)B}}{\$\omega_{(L+O)B}} \right)^2 \left( 1 - 2 \left( \frac{\$\mu_{(L+O)B}}{\$\omega_{(L+O)B}} \right) (\Delta \tau_j) + \left( \frac{\$\mu_{(L+O)B}}{\$\omega_{(L+O)B}} \right)^2 \right. \right. \right.$$

$$\left. \left. \left. (\Delta \tau_j)^2 \right) \right) - \left( \frac{\$\mu_{(L+O)B}}{\$\omega_{(L+O)B}} \right)^2 \right)^2$$

which has the correct units of measure for Variance as the square of Energy $(\$\mu_{(L+O)B}^2)^2$ in (17)

$$\text{Var}\{E\} \cong \frac{\$\omega_{(L+O)B}^4}{4} \sum_{j=1}^{N} p_j \left( \left( \frac{\$\mu_{(L+O)B}}{\$\omega_{(L+O)B}} \right)^2 \quad (106)$$

-continued $$\left( -2 \left( \frac{\$\mu_{(L+O)B}}{\$\omega_{(L+O)B}} \right) (\Delta \tau_j) + \left( \frac{\$\mu_{(L+O)B}}{\$\omega_{(L+O)B}} \right)^2 (\Delta \tau_j)^2 \right) \right)^2$$

Using the factory data, $(\Delta \bar{\tau}_j) = 0.11$, and $(\$\mu_{(L+O)B}/\$\omega_{(L+O)B}) = 0.63$, therefore $$\left( -2 \left( \frac{\$\mu_{(L+O)B}}{\$\omega_{(L+O)B}} \right) (\Delta \tau_j) = 2 * 0.63 * 0.11 = 0.13 \gg$$

$$0.004 = + \left( \frac{\$\mu_{(L+O)B}}{\$\omega_{(L+O)B}} \right)^2 (\Delta \tau_j)^2 \right)$$

And since the 1st term of (106) is 27 times greater than the 2nd term, to good approximation the below holds:

$$\text{Var}\{E\} \cong \frac{\$\omega_{(L+O)B}^4}{4} \sum_{j=1}^{N} p_j \left( \frac{\$\mu_{(L+O)B}}{\$\omega_{(L+O)B}} \left( -2 \left( \frac{\$\mu_{(L+O)B}}{\$\omega_{(L+O)B}} \right) (\Delta \tau_j) \right) \right)^2 \quad (107)$$

$$\text{Var}\{E\} \cong \$\mu_{(L+O)B}^4 \sum_{j=1}^{N} p_j ((\Delta \tau_j)^2) = \$\mu_{(L+O)B}^4 \sigma_\tau^2 \quad (108)$$

where $\sigma_\tau$ is the Standard Deviation of transit times of batches of WIP in months per month, and hence is dimensionless. Now since the frequency of each $V_j$ is 1, $p_j = 1/N$. Substituting $p_j = 1/N$, (108) into (96) obtains:

$$(1/\beta_M) = \sqrt{2 \text{Var}\{\hat{E}_B\}} = \$\mu_{(L+O)B}^2 \sqrt{2 \sum_{j=1}^{N} \left( \frac{1}{N} \right) ((\Delta \tau_j)^2)} \quad (109)$$

And substituting (109) into (65) obtains:

$$\Delta \$EBITDA = \quad (110)$$

$$\left( \frac{1}{\beta} \right) \frac{D(\hat{p}_{Ai} | \hat{p}_{Bi})}{(\$\mu_{(L-O)B})} = \left( \$\mu_{(L+O)B}^2 \sqrt{2 \sum_{j=1}^{N} \left( \frac{1}{N} \right) ((\Delta \tau_j)^2)} \right) \frac{D(\hat{p}_{Ai} | \hat{p}_{Bi})}{(\$\mu_{(L+O)B})}$$

$$\left( \frac{1}{\beta_M} \right) = k_M T = \$\mu_{(L+O)B}^2 \sigma_\tau \sqrt{2} \quad (111)$$

Also recall from (49) that:

$$\frac{\lambda}{k_M} = \frac{1}{k_M T}$$

hence:

$$\lambda = \frac{1}{T} \quad (112)$$

Recall that the Boltzmann constant in Thermodynamics arises from the energy fluctuations in any small volume of a gas. Similarly, $(1/\beta_M)=k_M T$ arises from the fluctuation $\sigma_\tau$ of the velocity and hence energy of WIP $$\Delta\$G=(\$\mu_{(L+O)B}\sigma_\tau\sqrt{2})D(\hat{p}_{Ai}|\hat{p}_{Bi}) \quad (113)$$

Separate expressions for $k_M$ and Temperature T may now be derived. WIP may be interpreted like a one-dimensional gas with one degree of freedom:

Kinetic Energy=$(\frac{1}{2})k_B T \to (\frac{1}{2})\$\mu_{(L+O)B}^2\sigma_\tau\sqrt{2}$ From (110), the fluctuation factor is $$\sqrt{2\sum_{j=1}^{N}\left(\frac{1}{N}\right)((\Delta\tau_j)^2)} = \sigma_\tau\sqrt{2}.$$

Thus analogies for Boltzmann's constant of manufacturing $k_M$, and Temperature T are determined, although they do not appear separately:

$$k_M=\sigma_\tau\sqrt{2}, T=\$\mu_{(L+O)B}^2 \quad (114)$$

Process improvement thus lowers the temperature of the "cold" heat sink $T_C$, thus reducing waste Energy and increasing output EBITDA as discussed on Section 1.

Standard Deviation of Predicted EBITDA Increase:

The Jaynes methodology may find the most probable distribution of WIP Energy. Thus there is potential error in Energy and hence EBITDA derived from (62) due to Energy fluctuations in a broad distribution. To quantify the error, recall that in Appendix 1 it was found that the Lagrange multiplier associated with Energy was $\lambda$ in (46), that $\lambda=1/T$ in (112), and $T=\$\mu^2$ in (114). The Jaynes Methodology derives the standard deviation of $E=(\frac{1}{2})\mu^2$:

$$\sigma_E = \sqrt{\frac{\partial^2}{\partial E^2}(\lambda)} = \sqrt{\frac{\partial}{\partial E}\left(\frac{\partial}{\partial E}\left(\frac{1}{T}\right)\right)} = \quad (115)$$

$$\sqrt{\frac{\partial}{\partial E}\left(\frac{\partial}{\partial E}\left(\frac{1}{\mu^2}\right)\right)} = \sqrt{4\frac{\partial}{\partial\mu^2}\left(\frac{\partial}{\partial\mu^2}\left(\frac{1}{\mu^2}\right)\right)}, \text{ let } x=\mu^2:$$

$$\sigma_E = \sqrt{4\frac{\partial}{\partial x}\left(\frac{\partial}{\partial x}\left(\frac{1}{x}\right)\right)} = \sqrt{4\frac{\partial}{\partial x}\left(\frac{-1}{x^2}\right)} =$$

$$\sqrt{4\left(\frac{2}{x^3}\right)} = \sqrt{8\left(\frac{1}{\mu^6}\right)} = \frac{\sqrt{8}}{\mu^3}$$

From (85) $\mu=\sqrt{2E}$ thus from (115):

$$\sigma_\mu \cong \sqrt{\frac{\sqrt{8}}{\mu^3}} \quad (116)$$

For some companies $\mu=\$946K/Month$ and (116) results in a variation of EBITDA from (61)

$$\Delta\sigma_G = \sigma_\mu \cong \sqrt{\frac{\sqrt{8}}{\mu^3}} = \frac{1.68}{\mu^{3/2}} = \frac{1.68}{(946,000)^{3/2}} \cong 10^{-9} \quad (117)$$

which is negligible. Although the intrinsic error due to a finite distribution is small, the Job Cost accounting system has monthly errors up to 5% which are only eliminated by an accurately costed Physical Inventory Appendix 5:
Probability Distribution of Work-in-Process Inventory Versus Batch Sizes Having derived $\beta_M$ of manufacturing, the derivation of an expression for the below in (67) is required:

$$D(p_{WA} \| p_{WB})|_G = \sum_{j=1}^{K} p_{W_A j}\log\left(\frac{p_{W_A j}}{p_{W_B j}}\right)$$

in order to use (30) to predict the EBITDA increase due to process improvement. Process $$\Delta\$G =$$

$$\$\mu_{(L+O)A} - \$\mu_{(L+O)B} \cong \$\mu_{(L+O)B}\left(\left(\frac{1}{\beta_M}\right)\frac{D(\hat{p}_{Ai}|\hat{p}_{Bi})}{2(\$\mu_{(L+O)B})^2}\right) = \left(\frac{1}{\beta_M}\right)\frac{D(\hat{p}_{Ai}|\hat{p}_{Bi})}{2(\$\mu_{(L+O)B})}$$

improvement will reduce divergence between supply and demand probability distributions as smaller batches and higher frequency more closely approximate customer demand. The greater the divergence between the probability distribution of the larger "Before" batch sizes and the Probability distribution of the smaller "After" batch sizes, the shorter the "After" cycle time and the greater will be the EBITDA increase. The maximum EBITDA increase may occur when the "After" batch sizes equals the batch size demanded the customer and can be as small as Batch size 1. A quantitative measure of the divergence between probability distributions "$p_{WA}$" and "$p_{WB}$" is the Relative Entropy in (58) defined as:

$$D(p_{WA} \| p_{WB})|_G = \sum_{j=1}^{K} p_{W_A j}\log\left(\frac{p_{W_A j}}{p_{W_B j}}\right) \quad (118)$$

where the batches of WIP have been divided into K "bins" with the smallest batches in the j=1 bin and the largest in the j=K bin. The probability that a batch of WIP after process improvement is in the $j^{th}$ bin is thus $p_{W_A j}$. To calculate the Relative Entropy in (118), it is required to derive the probability distributions "Before" process improvement and "After" process improvement. Firstly, the histogram of the batch sizes in the factory is computed. Let there be K histogram bins in the factory with average batch size $b_j$ in the $j^{th}$ bin, with $\bar{b}_j$ monotonically increasing with j. The choice of the number of bins K is not critical, as K will drop out of the final results used in the calculation of EBITDA increase. Subscripts B and A are used, respectively, to represent the batch sizes "Before" process improvement and "After" process improvement. For example, the number of batches of different part numbers in bin $\bar{b}_1$ "Before" process improvement is denoted as $n_{B1}$, and the number of batches in bin $\bar{b}_2$ "After" process improvement is denoted as $n_{A2}$. Then the total number of batches $N_B$ "Before" and $N_A$ "After" process improvement is:

$$N_B = \sum_{j=1}^{K} n_{Bj}, N_A = \sum_{j=1}^{K} n_{Aj}, \text{ where } N_A \geq N_B$$

Process improvement, such as setup reduction, may reduce the size of the batch needed to produce v units per unit time. Therefore, the number of batches with smaller bin numbers may be larger after process improvement, and the number of batches with larger bin numbers may be smaller. The total number of pieces of WIP for a fixed production rate v thus declines due to process improvement, $W_A < W_B$. After a batch quantity $b_i$ of the $i^{th}$ part number is produced, it will not be produced again until the quantity in inventory is nearly depleted. Thus the average amount of WIP inventory of the $i^{th}$ part number is $b_i/2$. Thus, the total WIP, $W_B$ and $W_A$, "Before" and "After" process improvement, may be written, respectively, as:

$$W_B = \frac{1}{2}\sum_{j=1}^{K} n_{Bj}\bar{b}_j \text{ and } W_A = \frac{1}{2}\sum_{j=1}^{K} n_{Aj}\bar{b}_j \quad (119)$$

where $n_{Bj}$ is the number of batches in bin j with average batch size $\bar{b}_j$. Thus, the probability distributions $p_{wBj}$ and $p_{wAj}$, before and after process improvement are given respectively, by, $$p_{wBj} = \frac{1}{2}\left(\frac{n_{Bj}\bar{b}_j}{W_B}\right) \text{ and } p_{wAj} = \frac{1}{2}\left(\frac{n_{Aj}\bar{b}_j}{W_A}\right) \quad (120)$$

Calculation of Relative Entropy of Manufacturing

The Relative Entropy $D(W_A \| W_B)$, between two discrete probability distributions $W_A$ and $W_B$ may be defined as $$D(p_{WA} \| p_{WB})|_G = \sum_{j=1}^{K} p_{W_Aj} \log\left(\frac{p_{W_Aj}}{p_{W_Bj}}\right) \quad (121)$$

Substituting (120) and (119) into (121), gives:

$$D(p_{WA} \| p_{WB})|_G = \frac{1}{2}\sum_{j=1}^{K}\left(\frac{n_{W_Aj}\bar{b}_j}{W_A}\right)\log\left(\frac{\frac{1}{2}\left(\frac{n_{W_Aj}\bar{b}_j}{W_A}\right)}{\frac{1}{2}\left(\frac{n_{W_Bj}\bar{b}_j}{W_B}\right)}\right) \quad (122)$$

$$= \frac{1}{2}\sum_{j=1}^{K}\left(\frac{n_{W_Aj}\bar{b}_j}{W_A}\right)\log\left(\left(\frac{W_B}{W_A}\right)\left(\frac{n_{W_Aj}\bar{b}_j}{n_{W_Bj}\bar{b}_j}\right)\right) \quad (123)$$

$$= \frac{1}{2}\sum_{j=1}^{K}\left(\frac{n_{W_Aj}\bar{b}_j}{W_A}\right)\left(\log\left(\frac{W_B}{W_A}\right) + \log\left(\frac{n_{W_Aj}\bar{b}_j}{n_{W_Bj}\bar{b}_j}\right)\right) \quad (124)$$

Substituting $(\frac{1}{2})\Sigma(n_{W_{Aj}}\bar{b}_j/W_A)=(\frac{1}{2})$ into (124), obtains:

$$D(p_{WA} \| p_{WB})|_G = \log\left(\frac{W_B}{W_A}\right) + \frac{1}{2}\sum_{j=1}^{K}\left(\frac{n_{W_Aj}\bar{b}_j}{W_A}\right)\log\left(\frac{n_{W_Aj}\bar{b}_j}{n_{W_Bj}\bar{b}_j}\right) \quad (125)$$

Discussion of the Terms of (125):

In the typical range of process improvement, WIP is reduced between 30%-70%. At 80% reduction of WIP, the two term of (125) grow rapidly, increasing EBITDA as discussed above. Empirical data may be used to divide the WIP into j=11 "Bins". Assuming that the batch sizes are rational per (29), the Lean Six Sigma process improvement efforts will first be focused on batches which have the most Work In Process. In some cases, the largest amount of WIP is in j=11, 20, 214 pieces due to $n_{11B}$=220 "Before" Lean improvement batches with an average batch size of 184. The setup time etc. of the machines that produce these batches will be reduced such that all 220 batches can be economically produced with batch size 80. The number of "After" batches in Bin j=10 will be increased to $n_{10A}$=220+200=420, and $n_{11A}$=0 in (125), and so on until all batches are in the j=1 Bin.

The Explicit Formula of Profit Increase

Substituting (125) and (111) into (60), obtains the explicit Formula of Profit Increase at constant departure rate from WIP to Finished Goods μ or constant m in (1), equivalently, constant revenue R:

$$(E_B - E_A)|_v = \frac{1}{2}(\$\mu_{(L+O)B})^2 - \frac{1}{2}(\$\mu_{(L+O)A})^2$$

$$\frac{1}{2}(\$\mu_{(L+O)B})^2 - \frac{1}{2}(\$\mu_{(L+O)A})^2 =$$

$$\$\mu_{(L+O)B}^2 \sigma_\tau \sqrt{2}\left(\log\left(\frac{W_B}{W_A}\right) + \frac{1}{2}\sum_{j=1}^{K}\left(\frac{n_{w_Aj}\bar{b}_j}{W_A}\right)\log\left(\frac{n_{w_Aj}\bar{b}_j}{n_{w_Bj}\bar{b}_j}\right)\right)$$

transposing we obtain:

$$\frac{1}{2}(\$\mu_{(L+O)A})^2 = \frac{1}{2}(\$\mu_{(L+O)B})^2 - \quad (126)$$

$$\$\mu_{(L+O)B}^2 \sigma_\tau \sqrt{2}\left(\log\left(\frac{W_B}{W_A}\right) + \frac{1}{2}\sum_{j=1}^{K}\left(\frac{n_{w_Aj}\bar{b}_j}{W_A}\right)\log\left(\frac{n_{w_Aj}\bar{b}_j}{n_{w_Bj}\bar{b}_j}\right)\right)$$

$$(\$\mu_{(L+O)A})^2 = (\$\mu_{(L+O)B})^2 -$$

$$2\$\mu_{(L+O)B}^2 \sigma_\tau \sqrt{2}\left(\log\left(\frac{W_B}{W_A}\right) + \frac{1}{2}\sum_{j=1}^{K}\left(\frac{n_{w_Aj}\bar{b}_j}{W_A}\right)\log\left(\frac{n_{w_Aj}\bar{b}_j}{n_{w_Bj}\bar{b}_j}\right)\right)$$

$$(\$\mu_{(L+O)A}) = $$

$$\sqrt{(\$\mu_{(L+O)B})^2 - 2\$\mu_{(L+O)B}^2 \sigma_\tau \sqrt{2}\left(\log\left(\frac{W_B}{W_A}\right) + \frac{1}{2}\sum_{j=1}^{K}\left(\frac{n_{w_Aj}\bar{b}_j}{W_A}\right)\log\left(\frac{n_{w_Aj}\bar{b}_j}{n_{w_Bj}\bar{b}_j}\right)\right)}$$

factoring out $(\$\mu_{(L+O)B})^2$ obtain:

$$(\$\mu_{(L+O)A}) =$$

$$(\$\mu_{(L+O)B})\sqrt{1 - 2\sigma_\tau\sqrt{2}\left(\log\left(\frac{W_B}{W_A}\right) + \frac{1}{2}\sum_{j=1}^{K}\left(\frac{n_{w_Aj}\bar{b}_j}{W_A}\right)\log\left(\frac{n_{w_Aj}\bar{b}_j}{n_{w_Bj}\bar{b}_j}\right)\right)}$$

$\Delta$EBITDA=$(\$R-(\$\mu_{(L+O)A})-(\$R-(\$\mu_{(L+O)B}))=(\$\mu_{(L+O)B}-(\$\mu_{(L+O)A})$ where $R is the dollars of Revenue per unit time $$\Delta\$EBITDA = \left(  (\$\mu_{(L+O)B}) - (\$\mu_{(L+O)B}) \right. \tag{127}$$

$$\left. \sqrt{1 - 2\sigma_\tau \sqrt{2} \left( \log\left(\frac{W_B}{W_A}\right) + \frac{1}{2} \sum_{j=1}^{K} \left( \frac{n_{W_A j} \bar{b}_j}{W_A} \right) \log\left( \frac{n_{W_A j} \bar{b}_j}{n_{W_B j} \bar{b}_j} \right) \right)} \right.$$

$$\Delta\$EBITDA = (\$\mu_{(L+O)B}) - (\$\mu_{(L+O)B}) \tag{128}$$

$$\left( 1 - \sigma_\tau \sqrt{2} \left( \log\left(\frac{W_B}{W_A}\right) + \frac{1}{2} \sum_{j=1}^{K} \left( \frac{n_{W_A j} \bar{b}_j}{W_A} \right) \log\left( \frac{n_{W_A j} \bar{b}_j}{n_{W_B j} \bar{b}_j} \right) \right) \right)$$

$$\Delta\$EBITDA = \tag{129}$$

$$(\$\mu_{(L+O)B}) \left( \sigma_\tau \sqrt{2} \left( \log\left(\frac{W_B}{W_A}\right) + \frac{1}{2} \sum_{j=1}^{K} \left( \frac{n_{W_A j} \bar{b}_j}{W_A} \right) \log\left( \frac{n_{W_A j} \bar{b}_j}{n_{W_B j} \bar{b}_j} \right) \right) \right)$$

Process improvement is an endogenous effort that is independent of exogenous market demand. Thus the impact of changes in market demand μ, and the resulting impact of log μ in (4) on WIP and cycle time may be studied separately. Cycle time may be related to waste, and Little's Law proves that cycle time can be reduced either by WIP reduction with constant exit rate m, or with constant WIP and increasing m. Using the above logic, it can be shown that the impact of revenue increase from $R_B$ to $R_A$ on EBITDA is:

$$\Delta\$EBITDA = (\$\mu_{(L+O)B}) \left( \sigma_\tau \sqrt{2} \right. \tag{130}$$

$$\left. \left( \log\left(\frac{W_B}{W_A(R_B/R_A)}\right) + \frac{1}{2} \sum_{j=1}^{K} \left( \frac{n_{W_A j} \bar{b}_j}{W_A(R_B/R_A)} \right) \log\left( \frac{n_{W_A j} \bar{b}_j}{n_{W_B j} \bar{b}_j} \right) \right) \right)$$

Appendix 6:
Minimum WIP Required to Complete m Units/Unit Time of Finished Goods In Section 6 equation (29) was used to prioritize process improvement projects which are derived in this section. A process improvement is first defined using a specific example to provide the motivation for the derivations that follow. It is known that the workstation, e.g. a lathe, or a milling machine, that creates the largest amount of WIP, and through (65) creates the most waste, may have the highest potential priority for process improvement depending on payback on investment. For the moment, it is assumed that the only wasteful parameter of the lathe is its' long setup time. In this section the relationship between setup time, batch size and minimum WIP needed to produce m parts per hour is derived. The same method is then used to derive the impact of other waste parameters such as scrap, machine downtime, and machining time per unit in the online supplement.

The average market demand for parts from this particular lathe is m=3.3 part per hour, or equivalently, one part every 0.3 hours. The lathe requires an average of 15.6 minutes (0.26 hours) to machine each unit after it has been set up. The setup requires 4 hours at $20 per hour plus overhead at 240% for a total cost of $277. The batch size was estimated at b=100 pieces using an EOQ formula:

$$b = \tag{131}$$

$$\sqrt{\frac{2(\$\text{Setup Cost})(\text{Demand/year})}{(\%\text{InterestRate/Year})(\$\text{Cost/Unit})}} = \sqrt{\frac{2(\$277)(100)}{(0.05)(\$110)}} = 100$$

This particular lathe produces a batch size adequate to satisfy customer need for about one year of each of the 100 different part numbers it supplies of the 1000 total parts supplied. Thus it is hoped that the customer buys all 100 pieces in all 100 batches. A significant finished goods inventory a must be maintained and related non-value add cost, and sustain losses due to storage, retrieval, cycle counting, obsolescence, loss, and damage, all of which contribute to the supply chain overhead cost. After a batch of 100 units of one of the part numbers is produced, the Lathe must have its tools changed to produce a batch of 100 of a different part number.

Process Parameter Calculation of Batch Size:

The only process parameter included in the formula, is setup cost. Guidance as to the potential WIP and hence entropy reduction due to other process parameters is needed. Thus an alternative to (131) is derived, which computes WIP using process parameters such as setup time, machining time, etc. to calculate the required batch size to produce m=3.3 part per hour. While the same batch size as (131) is obtained, insight may be gained into the impact of other process parameters on batch size which will provide alternatives to setup time reduction. Let X be the presently unknown minimum batch size that must be run to produce a part every 0.3 hours (18 minutes, or m=3.3 parts per hour) of all 100 different part numbers. Then to produce batches of each of the 100 different part numbers will require a time: $W_{tt}=100(4+0.26*X)$ The time $W_{tt}$ is known as the Workstation turnover time to produce presently unknown batch sizes of each of the 100 different part numbers in quantities adequate to meet customer demand, and be prepared to run another cycle of the 100 different part numbers. Now the market demands an average of 3.33 parts per hour of a mix of the 100 part numbers, which can be used to compute the minimum batch size X as:

$$3.33 \text{ parts/hour} = \frac{100X}{100(4 + 0.26 * X)} \tag{132}$$

which results in X=102 and is not too different from the EOQ formula of 100. Note that if a batch size less than 102 is used, the machine will not be able to supply the demand of 3.33 parts per hour because it is spending too much time in setup and not enough time machining parts. Each part number will be replenished when its inventory level is near zero, hence the average WIP per part of the $i^{th}$ part number is $w_i \cong 102/2=51$, and the minimum WIP needed to produce 3.33 parts per hour of all 100 part numbers is $\text{WIP}_{MIN}=5100$ pieces. Management has multiple process improvement options to apply to reduce cost, including:

1. Time and Motion study to reduce the 0.26 hours per part.
2. Invest in Tool and cooling technologies to improve cutting speed, and
3. The Four Step Rapid Setup method to reduce setup time.

It is shown that Entropy causes waste, much of it in supply chain overhead cost which is often twice as great as direct labor cost. Therefore an important question is: which improvement method will reduce entropy the most per dollar of investment in process improvement, as this cost will be far larger than direct labor cost. Entropy in (8) is a function of WIP W, hence the project with highest priority is that which reduces the WIP and entropy the most per dollar of process improvement investment. A generalization of (132) is derived in (133) showing the impact of Setup time, the number of different part numbers Q, demand per unit time m, scrap % X, machine downtime M, processing time per unit $\tilde{P}$ and calculate the minimum amount of total WIP due to the impact of parameters:

$$W_{MIN} = \frac{SQm}{2(1 - X - m(\tilde{P}/(1-M)))} + Q + m\tau_t \quad (133)$$

Where $T_\tau$ is the average time WIP spends in non-processing travel time. For example, if on average, all units spend an average of $T_\tau$ hours being transported from one workstation to another, then the amount of WIP "trapped in the pipeline" in transport mode is $m\tau_t$, where m is the exit rate from (1). In general, $m\tau_t \ll W_{MIN}$. This does not include pipeline WIP due to variation in supply and demand, which is negligible compared to $m\tau_t$. The advantage of (133) over (131) is that it allows the investigation of which improvement method e.g., setup, scrap, or downtime, will yield the greatest reduction in WIP per dollar of investment. In an earlier example, the lathe required 0.25 hours to produce a part, and the market demands a part every 0.3 hours. Thus if the lathe can setup in ≤0.08 hours, and other wastes X and M are zero, all workstations can meet demand with batch size, $w_i$=1. This condition not only reduces waste at the workstation, but also eliminates supply chain overhead waste costs of quality, inventory control, obsolescence, etc. This minimizes waste, maximizes EBITDA, as the supply chain process obeys Shannon Entropy as the second term in (8) approaches zero. Note that $WIP_{MIN}$ is a linear function of Setup time S and Complexity Q, and is an inverse function of X, $\tilde{P}$ and M which thus have a non-linear impact on WIP. The closer that production rate µ approaches 1/$\tilde{P}$ which is maximum capacity, the greater will be the impact of X and M on WIP. For example, X=10% frequently can cause a 50% increase in WIP. Thus (133) provides more parametric guidance than does the EOQ formula which is only a function of Setup time.

Derivation of Minimum WIP as a Function of Waste:

Each factor in (133) is now derived. The batch size and WIP needed to produce m=3.3 part per hour given a setup time of 4 hours and a machining time per unit of 0.26 hours has been derived. It was then asserted that scrap, machine downtime and machining time per unit also affected the required batch size and WIP. The relationship for minimum WIP due to all these parameters was given in equation (133) and will now be derived from first principles.

A process is considered which builds only two different products: part number 1, denoted "p/n 1", and p/n "2". The setup time to change over from the production of p/n 1 to p/n 2 is denoted $S_{B2}$, and from p/n2 to p/n1 is denoted SB1. The subscript 'B' designates the setup time "Before" application of the Four Step Rapid Setup method. The batch size being produced after setup is denoted $b_{BX}$, and processing time per unit $\tilde{P}x$ where x=1 or 2. The Workstation Cycle Time is defined as the time required to setup and produce a batch of p/n 1, then setup and produce a batch of p/n2.

To make the analysis simpler, and without loss of generality, $S_{B1}=S_{B2}=S_B$, $\tilde{P}_1=\tilde{P}_2=\tilde{P}$, $b_{B1}=b_{B2}=b_B$, and obtains:

$$(WCT)_B = \overbrace{S_B + \tilde{P}b_B}^{\text{Build a batch of p/n "1"}} + \overbrace{S_B + \tilde{P}b_B}^{\text{Build a batch of p/n "2"}} = 2S_B + 2\tilde{P}b_B \quad (131)$$

In each WCT, two batches of quantity $b_S$ are built. Thus the total production Rate is $m_B$:

$$m_B = \frac{2b_B}{2S_B + 2\tilde{P}b_B} = \frac{b_S}{S_B + \tilde{P}b_B} \quad (135)$$

Assume that the Four Step Rapid Setup method is applied to reduce setup time to $S_A$ where A designates the "after" setup reduction condition. The resulting $(WCT)_A$ is:

$$(WCT)_A = \overbrace{S_A + \tilde{P}b_A}^{\text{Build a batch of p/n "1"}} + \overbrace{S_A + \tilde{P}b_A}^{\text{Build a batch of p/n "2"}} = 2S_A + 2\tilde{P}b_A$$

Consequently, the production rate $m_A$ is $$m_A = \frac{2b_A}{2S_A + 2\tilde{P}b_A} = \frac{b_A}{S_A + \tilde{P}b_A} \quad (136)$$

The reduction in batch size from $b_B \to b_A$, is now calculated under the constraint that the total production rate per hour µA remains equal to $\mu_B$, as follows:

$$m = \frac{b_A}{S_A + \tilde{P}b_A} = \frac{b_B}{S_B + \tilde{P}b_B} \quad (137)$$

If the numerator and denominator are multiplied by the ratio of $S_A/S_B$ the below is obtained.

$$m = m\left(\frac{S_A/S_B}{S_A/S_B}\right) = \frac{(S_A/S_B)b_B}{(S_A/S_B)S_B + \tilde{P}(S_A/S_B)b_B}$$

Thus, if the setup time is reduced by 80% such that $S_A/S_B$=0.2 batch size is reduced by 80% and still produces µ units per unit time. Through Little's Law, WIP and cycle time will also be reduced by 80%. The same result occurs without the simplifying assumptions, but requires the solution of a system of six simultaneous linear equations in six unknowns.

Now, given the market demand imposed constraint that $m_A$=$m_B$=m, one can use (136) to compute:

$$b_A = m_A S_A + m_A \tilde{P} b_A \quad (138)$$

$$b_A(1 - m_A \tilde{P}) = m_A S_A$$

$$b_A = \frac{m_A S_A}{(1 - m_A \tilde{P})}, b_B = \frac{m_B S_B}{(1 - m_B \tilde{P})}$$

The minimum batch size has been computed that will meet demand by assuming that at the instant that the j=1 product is produced again, the WIP of j=1 has fallen to zero, a process which can be described as perfect synchronization which is required for minimum WIP. Hence the average amount of WIP contributed by p/n 1 to total WIP is $b_{S1}/2$. By symmetry, each p/n contributes the same average WIP over time $\bar{\tau}$. It is noted that when perfect synchronization does not exist due to variation in demand, setup, etc., WIP will increase beyond the minimum calculated above. The increase in WIP can be calculated using Discrete Event Simulations as is discussed in Appendix 10, but does not affect the intrinsic minimum WIP related to the waste parameters of the workstation in (29) and in (144) below.

Scrap Reduction:

Consider a process which builds two different products "1" and "2" with setup time of S, batch size $B_B$, and processing time per unit P which in the "Before" condition generates no scrap. The "After" batch size $b_A$ needed to maintain the same production rate as "before" the scrap problem arose is now calculated. Since the setup time is constant for this calculation, $S_A=S_B=S$ are set. The "before" Workstation Cycle Time (WCT) B and production rate $\mu_B$ are given respectively by (131) and (135).

Now assume that the process goes out of control and generates X % scrap. The production rate $m_A$ with a scrap of X % is given by, $$m_A = \frac{\text{Quantity}}{\text{Time}} = \frac{2b_A(1-X)}{2S + 2\tilde{P}b_A} = \frac{b_A(1-X)}{S + \tilde{P}b_A} \quad (139)$$

Imposing the boundary condition that $m_A=m_B=m$, obtains $$\frac{b_A(1-X)}{S + \tilde{P}b_A} = \frac{b_B}{S + \tilde{P}b_B}$$

which after simple algebraic simplification results in:

$$b_A = \left(\frac{Sb_B}{S - XS - X\tilde{P}b_B}\right) \quad (140)$$

Note that as X→0, $b_A$→$b_B$. For instance, let S=4 hours, X=10%, P=0.01 hour per part, and $B_B$=1000. Using (140), it is found that $B_A$=1538. Thus a 10% scrap rate requires a 53% increase in batch size, WIP and Cycle time! Intuitively one might have thought that $B_A$=1100, i.e., just enough to make up for the scrap, but this would not count the lost production due to the time lost building scrap that necessitated $B_A$=1538 to maintain the production rate. Given the market demand imposed constraint that $m_A=m_B=m$, (139) is used to obtain:

$$b_A = \frac{mS}{1 - X - m\tilde{P}} \quad (141)$$

Machine Downtime:

Assume that a machine that normally requires $\tilde{P}$ minutes to produces one unit is "down" for repairs or otherwise unavailable for production Y minutes out of an entire production time of Z minutes available. Thus in the entire production time, the machine can only produce $(Z-Y)/\tilde{P}$ units instead to $Z/\tilde{P}$ units. This change can be modeled as effectively increasing the processing time per unit from $\tilde{P}_B$ to $\tilde{P}_A$, which is obtained as:

$$\frac{Z-Y}{\tilde{P}_A} = \frac{Z}{\tilde{P}_A(Z/Z-Y)} \Rightarrow \tilde{P}_A = \frac{\tilde{P}_B}{(1-M)}$$

Where M=Y/Z is the fractional machine down time. Thus (141) becomes:

$$b_A = \frac{mS}{1 - X - m(\tilde{P}/(1-M))} \quad (142)$$

Consequently, as noted before, the WIP, $W_A$ of the $A^{th}$ product, is given by, $$w_A = \frac{mS}{2(1 - X - m\tilde{P}/(1-M))} \quad (143)$$

Now (143) calculates the WIP due to waste parameters. The replenishment pull system requires one of each part number Q to supply customer needs. The total average minimum WIP for all Q products is:

$$W_{MIN} \cong \frac{SQm}{2(1 - X - m(\tilde{P}/(1-M)))} + Q + m\tau_t \quad (144)$$

In agreement with (133)

Appendix 7:

The Effect of Revenue Increase on the Formula for Process Efficiency Increase.

It may be shown that cycle time reduction is the driver of lower waste and higher EBITDA. From Little's Law it may be shown that the two parameters that control cycle time are WIP W and average completion rate m. In Appendix 5 the Relative Entropy of the two distributions of WIP, $W_B$ and $W_A$ was calculated in Equation (130) was then used to calculate the increased EBITDA due to the reduction of WIP. The quantity m, the other parameter that controls cycle time, is now considered as a variable. The Relative Entropy of the two distributions $m_B$ and $m_A$, are calculated and then the EBITDA impact of increased m in terms of the Relative Entropy of these two distributions is computed.

Thus far, it has been assumed that the average completion rate m is constant during the improvement process while $W_B$ is being reduced to $W_A$ thus maintaining the equilibrium condition required by Little's Law. Equation (129) computes the EBITDA increase when $W_B$→$W_A$ but $m_A=m_B$. However, cycle time reduction, is driven by the reduction of non-value add waste. Based on Little's Law, it is possible to also hold W constant and reduce cycle time by increasing $m_B$→$m_A$ where $m_B<m_A$. This change will result in the cycle times $\tau_B$ and $\tau_A$ as follows:

$$\tau_B = \frac{W}{m_B} \quad (145)$$

$$\tau_A = \frac{W}{m_A} = \tau_B\left(\frac{m_B}{m_A}\right) \quad (146)$$

where $\tau_A < \tau_B$ because $m_B < m_A$. The EBITDA increase is now calculated for the transition from $m_B \to m_A$, when W is held constant. As discussed in Appendix 10, An equilibrium condition is maintained as required by Little's Law by holding W constant, since the change in arrivals and departures are equal during the slow transition from $m_B \to m_A$. Now as m increases beyond $m_B$, W will also increase beyond $W_A$ according to (133) unless the process improvement is continued to maintain $W = W_B$. By doing so, the equilibrium conditions discussed in Section 1.0 required for the validity of Little's Law are maintained.

How much process improvement is needed to maintain $W = W_B$ may be determined by imposing the boundary conditions $W = W_B$ and $m = m_A$ in (133). With these boundary conditions practical values of S, $\tilde{P}$, X, N and Q denoted by subscripts $m_A$ which result in maintaining $W_B$ constant despite increasing $m_B \to m_A$ may be selected.

$$W_B = \underbrace{\frac{S_{mA} Q_{mA} m_A}{2(1 - X_{mA} - (\tilde{P}_{mA} + M_{mA})m_A)}}_{\text{WIP due to Workstation Parameters}} + \underbrace{\frac{Q_{mA}}{Q_{mA}}}_{\substack{\text{WIP due to} \\ \text{"Pull" System}}} + \underbrace{t_t m_A M_{mA}}_{\substack{\text{WIP due to Transit Time} \\ \text{between Workstations}}} \quad (147)$$

M is the number of workstations in the factory. If this condition is met, $W_B$ will be held constant as $m_B \to m_A$. This change assumes that setup time can in fact be reduced to $S_{GA}$, etc. These changes will reduce both Workstation and Factory level waste which accounts for the EBITDA increase calculated in (130).

It may not be apparent that a typical factory, with an average completion rate m, in fact has a range of completion rates $m_j$ for each of the Q different part numbers whose overall average is m. The source of the variation in m is the significant variation in the velocity of WIP due to the variation in the amount of WIP in the path of the moving batch as discussed in Appendix 4. Assume that total WIP W is constant and that the velocity of a batch of WIP Before process improvement is $v_{Bj}$. (12) gives:

$$v_{Bj} = \frac{m_{Bj}}{\sum_{i=1}^{N_j} w_{Bij}} \quad (148)$$

where $w_{Bij}$ is the amount of WIP at the $i^{th}$ Workstation which the $j^{th}$ batch of WIP must traverse, and $M_j$ is the last workstation number from which the $j^{th}$ batch exits at $m_{Bj}$ units per unit time. Thus it is seen from (148) that the variation in m is directly proportional to the variation in velocity v. As in Appendix 5 the beginning is to compute the histogram of the $m_{Bj}$ and $m_{Aj}$. Let there be K bins of average completion rate $m_{Bjm}$, each bin containing $w_{Bj}$ pieces of WIP. From (148) it may be written:

$$m_{Bj} = \bar{v}_{Bj} \sum_{i=1}^{N_j} w_{Bij} = \sum_{j=1}^{K} m_{Bj} \quad (149)$$

Hence the probability, $p_{GBj}$, that a unit of WIP has departure rate $m_{Bj}$ is:

$$p_{mBj} = \frac{m_{Bj}}{m_B} \quad (150)$$

Similarly, it can be written that:

$$p_{mAj} = \frac{m_{Aj}}{m_A} \quad (151)$$

The Relative Entropy of the probability distributions $p_{mB} = [p_{mB1} \cdots p_{mBQ}]$ and $p_{mA} = [p_{mA1} \cdots p_{mAQ}]$ may now be calculated (similar to Section 3.2) as, $$D(p_{mB} \| p_{mA}) = \sum_{j=1}^{K} p_{mBj} \log\left(\frac{p_{mBj}}{p_{mAj}}\right) \quad (152)$$

Substituting (150) and (151) into (152), gives $$D(p_{mB} \| p_{mA})|_{WA} = \sum_{j=1}^{K} \left(\frac{m_{Bj}}{m_B}\right) \log\left(\frac{\left(\frac{m_{Bj}}{m_B}\right)}{\left(\frac{m_{Aj}}{m_A}\right)}\right) \quad (153)$$

$$= \sum_{j=1}^{K} \left(\frac{m_{Bj}}{m_B}\right) \log\left(\left(\frac{m_A}{m_B}\right)\left(\frac{m_{Bj}}{m_{Aj}}\right)\right) \quad (154)$$

$$= \sum_{j=1}^{k} \left(\frac{m_{Bj}}{m_B}\right) \log\left(\frac{m_A}{m_B}\right) + \sum_{j=1}^{k} \left(\frac{m_{Bj}}{m_B}\right) \log\left(\frac{m_{Bj}}{m_{Aj}}\right) \quad (155)$$

$$= \log\left(\frac{m_A}{m_B}\right) + \sum_{j=1}^{K} \left(\frac{m_{Bj}}{m_B}\right) \log\left(\frac{m_{Bj}}{m_{Aj}}\right) \quad (156)$$

Revenue Growth: Since the average price per unit p is stable over the typical two year period of process improvement, it can be written:

$$\frac{m_A}{m_B} = \frac{m_A \rho}{m_B \rho} = \frac{R_A}{R_B} \quad (157)$$

where $R_A$ is the Revenue "After" process improvement and $R_B$ is the Revenue "Before" process improvement. Thus it may be written that the general Formula for Process Efficiency Increase by reduction of W and increase of R as $$\Delta \$EBITDA = (\$\mu_{(L+O)B})\left(\sigma_\tau \sqrt{2}\left(\log\left(\frac{W_B}{W_A(R_B/R_A)}\right) + \frac{1}{2}\sum_{j=1}^{K}\left(\frac{n_{W_A j}\bar{b}_j}{W_A(R_B/R_A)}\right)\log\left(\frac{n_{W_A j}\bar{b}_j}{n_{W_B j}\bar{b}_j}\right)\right)\right) \quad (158)$$

Recall from section 3.0, the GAAP definition of Gross Profit $G_B = \{\$Revenue - \$(Material + Labor + Mfg\ Overhead)\}_B$. The initial Gross Profit per unit was $G_B/m_B$, the unit volume has been increased by mA-mB. Assuming that the increased volume would have add the same unimproved Gross Margin per unit $G_B/m_B$, the increased volume will add unimproved Gross Profit to (158):

$$(\Delta \$EBITDA) = \left(\frac{1}{\beta_M}\right)(\log W_B - \log(R_B/R_A)W_A) + (m_A - m_B)\left(\frac{G_B}{m_B}\right) \quad (159)$$

Appendix 8:
Combinatorial Derivation of the Maxwell-Boltzmann Distribution of Manufacturing WIP Energy In Appendix 1, the probability distribution of WIP energies was derived using the Jaynes MaxEnt methodology in equation (49) and it was found to be equal to the Maxwell-Boltzmann distribution. This is of such great importance to the theory that an alternate derivation that is independent of Jaynes is provided. Consider a collection of p boxes, labeled 1, 2, 3, . . . , p and a set of N particles. Let $N_i$ be the number of particles with energy $E_i$. Let $n \leq N$. The number of ways to select n particles out of N in some particular order is $$N(N-1)(N-2) \ldots (N-(n-1)) =$$
$$N(N-1)(N-2) \ldots (N-(n-1)) \cdot \frac{(N-n)(N-n-1) \ldots 1}{(N-n)(N-n-1) \ldots 1} =$$
$$\frac{N!}{(N-n)!} = P_n^N$$

Now the number of ways n objects can be ordered is n!
So the number of ways to select n particles out of N in any order is $$\frac{N!}{n!(N-n)!} = C_n^N$$

The number of ways to select $N_1$ particles out of N and putting them in box#1, then selecting $N_2$ particles from the $N-N_1$ left and putting them in box #2, then selecting $N_2$ particles from the $N-N_1-N_2$ left and putting them in box #3, . . . , until no particle is left to select is $$W_0 = C_{N_1}^N \cdot C_{N_2}^{N-N_1} \cdot C_{N_3}^{N-N_1-N_2} \cdot \ldots \cdot C_{N_p}^{N-N_1-N_2-\ldots-N_{p-1}}$$

Expanding in terms of factorials, gives $$W_0 = \frac{N!}{N_1!(N-N_1)!} \times \frac{(N-N_1)!}{N_2!(N-N_1-N_2)!} \times$$
$$\frac{(N-N_1-N_2)!}{N_3!(N-N_1-N_2-N_3)!} \times \ldots \times \frac{(N-N_1-N_2-\ldots-N_{p-1})!}{N_p!(N-N_1-N_2-\ldots-N_p)!}$$

Terms cancel between consecutive terms in the above product and it may be written that $$W_0 = \frac{N!}{N_1!N_2!N_3! \ldots N_p!(N-N_1-N_2-\ldots-N_p)!}$$

Note that $(N-N_1-N_2-\ldots-N_p)! = 0! = 1$ and so $$W_0 = \frac{N!}{N_1!N_2!N_3! \ldots N_p!}$$

Note: this is just a multinomial coefficient $C_{[N_1,N_2,N_3,\ldots,N_p]}^N$
Now suppose that the $i^{th}$ energy level has a degeneracy, i.e., the particles at this level are distributed among $g_i$ sub-boxes, which are different part numbers having the same energy. The number of ways $N_i$ particles can be arranged within $g_i$ sub-boxes is $g_i^{N_i}$.
The quantity $W_0$ must therefore be multiplied by $g_i^{N_i}$ for every level i. This yields a count $$W = N! \prod_i \frac{g_i^{N_i}}{N_i!}$$

Maximising W subject to the two constraints $$N = \sum_i N_i$$

$$E = \sum_i N_i E_i$$

Note: since ln W is a monotonically increasing function, it is acceptable to maximize it instead of W.
Note: The Stirling approximation for factorials may be employed (in logarithmic form):

$$\ln(Q!) = Q \ln(Q) - Q$$

giving $$\ln W = N \ln N - N + \sum_i N_i \ln g_i - \sum_i (N_i \ln N_i - N_i)$$

Introducing the Lagrange function $$\Omega = \ln W + \alpha\left(N - \sum_i N_i\right) + \beta\left(E - \sum_i N_i E_i\right)$$

And using the above expression for ln W, gives $$\Omega = N \ln N - N + \sum_i N_i \ln g_i -$$
$$\sum_i (N_i \ln N_i - N_i) + \alpha\left(N - \sum_i N_i\right) + \beta\left(E - \sum_i N_i E_i\right)$$

This can be simplified to $$\Omega = N \ln N - N + \alpha N + \beta E + \sum_i N_i(\ln g_i - \ln N_i + 1 - \alpha - \beta E_i)$$

it is now required that $\partial \Omega / \partial N_i = 0$:

$$\ln g_i - \ln N_i - 1 + 1 - \alpha - \beta E_i = \ln g_i - \ln N_i - \alpha - \beta E_i = 0$$

Solving for $N_i$:

$$N_i = \frac{g_i}{e^{\alpha+\beta E_i}}$$

Now inserting this in the constraint which states that the $N_i$ add up to N:

$$N = \sum_i \frac{g_i}{e^{\alpha+\beta E_i}} = e^{-\alpha}\left(\sum_i \frac{g_i}{e^{\beta E_i}}\right)$$

and so $$e^{-\alpha} = \frac{N}{\sum_i g_i e^{-\beta E_i}}$$

So the probability of having a particle in the $i^{th}$ energy level is $$P_i = \frac{N_i}{N} = \frac{g_i e^{-\beta E_i}}{\sum_k g_k e^{-\beta E_k}}$$

Which is the Maxwell-Boltzmann distribution

Appendix 9:
The Langevin Equation and Manufacturing Fluctuation/Dissipation of Waste Dollars It has been noted that the cycle times of individual batches of WIP are random, and have an empirically observed standard deviation $\sigma_\tau$ inserted into (111). This amounts to a random motion about the moving center of mass of the process caused by differing amounts of WIP, setup times, etc encountered by WIP in transit. This random motion is similar to Brownian motion of small particles propelled by the statistical fluctuations of bombarding solute molecules which are governed by the Langevin Equation. If WIP obeys the Langevin equation, it would provide an independent confirmation of the theory. Langevin divided the Brownian motion of a particle into a slowly varying velocity $\dot{x}$ plus a rapid random oscillation which integrates to zero. The stochastic equation showed that the fluctuations, which resulted in Brownian Motion, produce dissipation of energy.

$$M\frac{d\dot{x}}{dt} = \underset{\text{Friction}}{-\alpha\dot{x}} + \underset{\langle\text{Rapid Osc}\rangle=0}{F(t)} \quad (160)$$

Where $\dot{x}$ is the velocity, $\alpha$ is the "friction constant". Note that the energy dissipation increases with increasing velocity in Brownian motion. Solving (160) for average position $\langle x \rangle$, obtains:

$$\langle x^2 \rangle = \left(\frac{2}{\alpha\beta}\right)t \quad (161)$$

$$\langle x \rangle \cong \sqrt{\left(\frac{2}{\alpha\beta}\right)}t^{1/2} \quad (162)$$

Thus the particles behave like a particle executing a random walk in accord with the Diffusion equation. The fluctuation of motion of a suspended particle leading to energy dissipation in (160) is an example of a Fluctuation-Dissipation theorem. The faster the velocity, the larger the dissipation.

Brownian motion is analogous to the random motion of WIP around the moving center of mass of the process, as discussed in Appendix 4. However, it may be expected that the dissipation (waste cost) decreases with increasing velocity corresponding to faster cycle times. Thus the Langevin equation is an independent test of the validity of the Formula for Process Efficiency Increase. The energy dissipation has been derived in (62) and, using (111), the energy of dissipation is:

$$(E_{(A)} - E_{(B)}) = \$\mu^2_{(L+O)A} - \$\mu^2_{(L+O)B} = \quad (163)$$
$$\left(\frac{1}{\beta}\right)D(\hat{p}_{Ai} \mid \hat{p}_{Bi}) = (\$\mu^2_{(L+O)B}\sigma_\tau\sqrt{2})D(\hat{p}_{Ai} \mid \hat{p}_{Bi})$$

Therefore the force is:

$$F = M\frac{d\dot{x}}{dt} = -\frac{dE}{dx} = -\frac{dE}{\dot{x}dt} = -\left(\frac{1}{\dot{x}}\right)\frac{d}{dt}\left(\frac{1}{\beta}\right)\log W(D(\hat{p}_{Ai} \mid \hat{p}_{Bi})) \quad (164)$$

$$F = -\left(\frac{1}{\dot{x}\beta}\right)\frac{d}{dt}(\log G + \log\tau)(D(\hat{p}_{Ai} \mid \hat{p}_{Bi})) = -\left(\frac{1}{\dot{x}\beta\tau}\right)(D(\hat{p}_{Ai} \mid \hat{p}_{Bi}))$$

But from Little's Law $$\dot{x} = v = \frac{\$\mu_{(L+O)B}}{\$\omega_{(L+O)B}} \text{ and } \tau = \frac{\$\omega_{(L+O)B}}{\$\mu_{(L+O)B}},$$

thus $\dot{x}\tau=1$ and $$F = -\left(\frac{1}{\beta}\right)D(\hat{p}_{Ai} \mid \hat{p}_{Bi}) = -\$\mu^2_{(L+O)B}\sigma_\tau\sqrt{2}\,D(\hat{p}_{Ai} \mid \hat{p}_{Bi}) \quad (165)$$

$$F = -\$\omega^2_{(L+O)B}\tau^2\sigma_\tau\sqrt{2}\,D(\hat{p}_{Ai} \mid \hat{p}_{Bi}) =$$

$$-\left(\frac{\$\omega^2_{(L+O)B}\sigma_T\sqrt{2}\,D(\hat{p}_{Ai} \mid \hat{p}_{Bi})}{v^2}\right) = \frac{k}{v^2}$$

The dissipative force thus declines with increasing velocity v. From (165):

$$F = M\frac{d\dot{x}}{dt} = -\frac{k}{v^2} = -\frac{k}{\dot{x}^2}$$

$$\dot{x}^2\frac{d\dot{x}}{dt} = -\frac{k}{M}$$

$$\dot{x}^2\frac{d\dot{x}}{dt} = \frac{1}{3}\frac{d(\dot{x}^3)}{dt}$$

$$\frac{1}{3}\frac{d(\dot{x}^3)}{dt} = -\frac{k}{M}$$

-continued $$d(\dot{x}^3) = -\frac{3k}{M}dt$$

$$\dot{x}^3 = -\frac{3k}{M}t = \frac{3\left(\$\omega_{(L+O)B}^2 \sigma_\tau \sqrt{2}\, D(\hat{p}_{Ai} \mid \hat{p}_{Bi})\right)}{\$\omega_{(L+O)B}^2}t = 3\sigma_\tau\sqrt{2}\,D(\hat{p}_{Ai}\mid\hat{p}_{Bi})t$$

$$\dot{x}^3 = -\frac{3k}{M}t = \frac{3\left(\$\omega_{(L+O)B}^2 \sigma_\tau \sqrt{2}\, D(\hat{p}_{Ai} \mid \hat{p}_{Bi})\right)}{\$\omega_{(L+O)B}^2}t = 3\sigma_\tau\sqrt{2}\,D(\hat{p}_{Ai}\mid\hat{p}_{Bi})t$$

$$\langle \dot{x}\rangle \cong \sqrt[3]{3\sigma_\tau\sqrt{2}\,D(\hat{p}_{Ai}\mid\hat{p}_{Bi})}\; t^{1/3}$$

$$d\langle x\rangle \cong \sqrt[3]{3\sigma\sqrt{2}\,D(\hat{p}_{Ai}\mid\hat{p}_{Bi})}\; t^{1/3} dt,$$

and assuming x=0 at t=0 we have $$\langle x\rangle \cong \frac{3}{4}\sqrt[3]{3\sigma_\tau\sqrt{2}\,D(\hat{p}_{Ai}\mid\hat{p}_{Bi})}\; t^{4/3} \tag{166}$$

Since $t^{4/3} \gg t^{1/2}$, the disturbance to WIP is much greater in extent than is Brownian motion in (162). Also note from (27)

$$\Delta\$\text{Profit} = \tag{167}$$

$$\left(\$\mu_{(L+O)B}\sigma_\tau\sqrt{2}\right)\frac{D(\hat{p}_{Ai}\mid\hat{p}_{Bi})}{2} = v\left(\$\omega_{(L+O)B}\sigma_\tau\sqrt{2}\right)\frac{D(\hat{p}_{Ai}\mid\hat{p}_{Bi})}{2} \propto v$$

Thus the EBITDA increases directly with increasing process velocity v since the dissipation diminishes. Thus the theory is at least consistent with the Langevin equation.

Appendix 12: Derivation of Formula for Process Efficiency Increase from Appendix 1 with $k_{MB} \neq k_{MA}$:

In Section 5 the hypothesis that $\sigma_{\tau B} \neq \sigma_{\tau A}$ was considered, which thus far has not yet been observed in practice. In particular, the region for WIP reduction>80% has not been explored and may result in $\sigma_{\tau B} \neq \sigma_{\tau A}$. From (114) it is known that if such were the case, the "Boltzmann" constants of manufacturing will not be equal: $k_{MB} \neq k_{MA}$. The general Formula for Process Efficiency Increase for this case is derived, and empirical graphs of $k_{MA}$ are developed to allow a good estimator. These expressions are inserted into (48):

$$k_{MB}(\log\hat{p}_{Bj}) = k_M \log w_{Bj} - \lambda E_j - \left(H_{EB} + k_{MB}\sum_{j=1}^{K}\hat{p}_{Bj}\log w_{Bj} - \lambda E\right) \tag{168}$$

$$\log\hat{p}_{Bj} = +\log w_{Bj} - \frac{E_j}{k_{MB}T} - \frac{H_{E(B)}}{k_{MB}} - \sum_{j=1}^{K}\hat{p}_{Bj}\log w_{Bj} + \frac{E}{k_{MB}T} \tag{169}$$

And "After" process improvement:

$$\log\hat{p}_{Aj} = \frac{k_{MA}T\left(\log w_{Aj} - \sum_{j=1}^{K}\hat{p}_{Aj}\log w_{Aj}\right) - TH_{E(A)}}{k_{MA}T} \tag{170}$$

$$\log\hat{p}_{Bj} = \frac{k_{MB}T\left(\log w_{Bj} - \sum_{j=1}^{K}\hat{p}_{Bj}\log w_{Bj}\right) - TH_{E(B)}}{k_{MB}T} \tag{171}$$

Now sum (170) and (171) over:

$$\sum_{j=1}^{K}\hat{p}_{Aj}\log\hat{p}_{Bj} = \sum_{j=1}^{K}\hat{p}_{Aj}\left(\frac{k_{MB}T\left(\log w_{Bj} - \sum_{j=1}^{K}\hat{p}_{Bj}\log w_{Bj}\right) - TH_{E(B)}}{k_{MB}T}\right) \tag{172}$$

$$\sum_{j=1}^{K}\hat{p}_{Aj}\log\hat{p}_{Aj} = \sum_{j=1}^{K}\hat{p}_{Aj}\left(\frac{k_{MA}T\left(\log w_{Aj} - \sum_{j=1}^{K}\hat{p}_{Bj}\log w_{Aj}\right) - TH_{E(A)}}{k_{MA}T}\right) \tag{173}$$

Subtract (172) from (173) and obtain:

$$H_{SA} - H_{SB} = \sum_{j=1}^{K}\hat{p}_{Aj}\log\hat{p}_{Aj} - \sum_{j=1}^{K}\hat{p}_{Aj}\log\hat{p}_{Bj} \tag{174}$$

$$H_{SA} - H_{SB} = \sum_{j=1}^{K}\hat{p}_{Aj}\left(\frac{k_{MA}T\left(\log w_{Aj} - \sum_{j=1}^{K}\hat{p}_{Aj}\log w_{Aj}\right) - TH_{E(A)}}{k_{MA}T} - \frac{k_{MB}T\left(\log w_{Bj} - \sum_{j=1}^{K}\hat{p}_{Bj}\log w_{Bj}\right) - TH_{E(B)}}{k_{MB}T}\right) \tag{175}$$

Note that, when summed over $\hat{p}_{Aj}$, the term in the first expression, $$\left(\log w_{Aj} - \sum_{j=1}^{K}\hat{p}_{Aj}\log w_{Aj}\right)$$

is zero:

$$\sum_{j=1}^{K}\hat{p}_{Aj}\left(\log w_{Bj} - \sum_{j=1}^{K}\hat{p}_{Bj}\log w_{Bj}\right) = \sum_{j=1}^{K}\hat{p}_{Bj}\log w_{Bj} -$$

$$\sum_{j=1}^{K}\hat{p}_{Bj}\left(\sum_{j=1}^{K}\hat{p}_{Bj}\log w_{Bj}\right)$$

$$= \sum_{j=1}^{K}\hat{p}_{Bj}\log w_{Bj} - (1)$$

$$\left(\sum_{j=1}^{K}\hat{p}_{Bj}\log w_{Bj}\right) = 0$$

It may be concluded that the maximization of total entropy log W in (38) which contains the term $$\sum_{j=1}^{K} p_j \log w_j$$

is equivalent to maximizing only Shannon Entropy $$-\sum_{j=1}^{K} p_j \log p_j.$$

In addition, the amount of WIP $W_{Aj}$ and $W_{Bj}$ are proportional to demand m from (29). Therefore, on average, $\hat{p}_{Bj} \cong \hat{p}_{Aj}$. Thus $$\sum_{j=1}^{K} \hat{p}_{Aj}\left(\log w_{Bj} - \sum_{j=1}^{K} \hat{p}_{Bj} \log w_{Bj}\right) \cong \sum_{j=1}^{K} \hat{p}_{Bj}\left(\log w_{Bj} - \sum_{j=1}^{K} \hat{p}_{Bj} \log w_{Bj}\right) = 0$$

It is concluded that the maximization of total entropy log W in (38) which contains the term $$\sum_{j=1}^{K} p_j \log w_j$$

is equivalent to maximizing only Shannon Entropy $$-\sum_{j=1}^{K} p_j \log p_j.$$

Thus (175) becomes $$\sum_{j=1}^{K} \hat{p}_{Aj} \log \hat{p}_{Aj} - \sum_{j=1}^{K} \hat{p}_{Aj} \log \hat{p}_{Bj} = \qquad (176)$$

$$\sum_{j=1}^{K} \hat{p}_{Aj} \left( \frac{-T_A H_{E(A)} + E_{(A)}}{k_{MA} T_A} - \frac{-T_A H_{E(B)} + E_{(B)}}{k_{MB} T_A} \right)$$

Assuming that the number of different part numbers Q and the demand mix is constant:

$$H_{E(A)} = \sum_{j=1}^{K} p_j \log p_j = H_{E(B)}$$

And the equivalent of (56) becomes:

$$\sum_{j=1}^{K} \hat{p}_{Aj} \log \hat{p}_{Aj} - \sum_{j=1}^{K} \hat{p}_{Aj} \log \hat{p}_{Bj} = \sum_{j=1}^{K} \hat{p}_{Aj} \left( \frac{-T_A H_{E(A)} + E_{(A)}}{k_{MA} T_A} - \frac{-T_B H_{E(B)} + E_{(B)}}{k_{MB} T_B} \right)$$

-continued $$= \sum_{j=1}^{K} \hat{p}_{Aj} \left( H_E \left( \frac{1}{k_{MB}} - \frac{1}{k_{MA}} \right) + \frac{E_{(A)}}{k_{MA} T_A} - \frac{E_{(B)}}{k_{MB} T_B} \right)$$

$$E_{(B)} = \frac{1}{2}(\$\mu_{(L+O)B})^2$$

from (36) gives:

$$\sum_{j=1}^{K} \hat{p}_{Aj} \log \hat{p}_{Aj} - \sum_{j=1}^{K} \hat{p}_{Aj} \log \hat{p}_{Bj} = \qquad (177)$$

$$\sum_{j=1}^{K} \hat{p}_{Aj} \left( H_E \left( \frac{1}{k_{MB}} - \frac{1}{k_{MA}} \right) + \frac{(\$\mu_{(L+O)A})^2}{k_{MA} T_A} - \frac{(\$\mu_{(L+O)B})^2}{k_{MB} T_B} \right)$$

$D(p_{WA} \| p_{WB})$ is the symbol for Relative Entropy, the divergence of Distribution "A" from distribution "B".

$$\sum_{j=1}^{K} \hat{p}_{Aj} \log \hat{p}_{Aj} - \sum_{j=1}^{K} \hat{p}_{Aj} \log \hat{p}_{Bj} = D(\hat{p}_{Aj} \| \hat{p}_{Bj}) = \qquad (178)$$

$$H_E \left( \frac{k_{MA} - k_{MB}}{k_{MA} k_{MB}} \right) + \beta_{MA} \frac{1}{2}(\$\mu_{(L+O)A})^2 - \beta_{MB} \frac{1}{2}(\$\mu_{(L+O)B})^2$$

To confirm the validity of the derivation, note than for $k_{MA} = k_{MB}$ and $\beta_{MA} = \beta_{MA}$, (178) identical to (58):

$$\sum_{j=1}^{K} \hat{p}_{Aj} \log \hat{p}_{Aj} - \sum_{j=1}^{K} \hat{p}_{Aj} \log = \beta_M \left( \frac{1}{2}(\$\mu_{(L+O)A})^2 - \frac{1}{2}(\$\mu_{(L+O)B})^2 \right) \qquad (58)$$

The explicit EBITDA increase is obtained $\Delta G = \$\mu_{(L+O)B} - \$\mu_{(L+O)A}$ by solving equation (178):

$$D(\hat{p}_{Aj} \| \hat{p}_{Bj}) = \qquad (179)$$

$$H_E \left( \frac{k_{MA} - k_{MB}}{k_{MA} k_{MB}} \right) + \beta_{MA} \frac{1}{2}(\$\mu_{(L+O)A})^2 - \beta_{MB} \frac{1}{2}(\$\mu_{(L+O)B})^2$$

$$D(\hat{p}_{Aj} \| \hat{p}_{Bj}) - H_E \left( \frac{k_{MA} - k_{MB}}{k_{MA} k_{MB}} \right) + \beta_{MB} \frac{1}{2}(\$\mu_{(L+O)B})^2 = \qquad (180)$$

$$+ \beta_{MA} \frac{1}{2}(\$\mu_{(L+O)A})^2$$

$$2D(\hat{p}_{Aj} \| \hat{p}_{Bj}) - 2H_E \left( \frac{k_{MA} - k_{MB}}{k_{MA} k_{MB}} \right) + \beta_{MB}(\$\mu_{(L+O)B})^2 = \qquad (181)$$

$$+ \beta_{MA}(\$\mu_{(L+O)A})^2$$

$$\left( \frac{2}{\beta_{MA}} \right) D(\hat{p}_{Aj} \| \hat{p}_{Bj}) - 2H_E \left( \frac{k_{MA} - k_{MB}}{\beta_{MA} k_{MA} k_{MB}} \right) + \left( \frac{\beta_{MB}}{\beta_{MA}} \right) (\$\mu_{(L+O)B})^2 = \qquad (182)$$

$$+ (\$\mu_{(L+O)A})^2$$

$$(\$\mu_{(L+O)A})^2 = \qquad (183)$$

$$\left( \frac{\beta_{MB}}{\beta_{MA}} \right) (\$\mu_{(L+O)B})^2 + \left( \frac{2}{\beta_{MA}} \right) D(\hat{p}_{Aj} \| \hat{p}_{Bj}) - 2H_E \left( \frac{k_{MA} - k_{MB}}{\beta_{MA} k_{MA} k_{MB}} \right)$$

-continued $$(\$\mu_{(L+O)A})^2 = \tag{184}$$
$$\left(\frac{\beta_{MB}}{\beta_{MA}}\right)(\$\mu_{(L+O)B})^2 \left(1 + \left(\frac{2\beta_{MA}}{(\$\mu_{(L+O)B})^2 \beta_{MB}\beta_{MA}}\right) D(\hat{p}_{Aj} \mid \hat{p}_{Bj}) - 2\beta_{MA} H_E \left(\frac{k_{MA} - k_{MB}}{(\$\mu_{(L+O)B})^2 \beta_{MB}\beta_{MA} k_{MA} k_{MB}}\right)\right)$$

$$(\$\mu_{(L+O)A})^2 = \tag{185}$$
$$\left(\frac{\beta_{MB}}{\beta_{MA}}\right)(\$\mu_{(L+O)B})^2 \left(1 + \left(\frac{2\beta_{MA}}{(\$\mu_{(L+O)B})^2 \beta_{MB}\beta_{MA}}\right) D(\hat{p}_{Aj} \mid \hat{p}_{Bj}) - 2\beta_{MA} H_E \left(\frac{k_{MA} - k_{MB}}{(\$\mu_{(L+O)B})^2 \beta_{MB}\beta_{MA} k_{MA} k_{MB}}\right)\right)$$

$$\$\mu_{(L+O)A} = \tag{186}$$
$$\$\mu_{(L+O)B} \sqrt{\left(\frac{\beta_{MB}}{\beta_{MA}}\right)} \sqrt{\left(1 + \left(\frac{2\beta_{MA}}{(\$\mu_{(L+O)B})^2 \beta_{MB}\beta_{MA}}\right) D(\hat{p}_{Aj} \mid \hat{p}_{Bj}) - 2\beta_{MA} H_E \left(\frac{k_{MA} - k_{MB}}{(\$\mu_{(L+O)B})^2 \beta_{MB}\beta_{MA} k_{MA} k_{MB}}\right)\right)}$$

With a Taylor Expansion of (186) using the approximations of (64), (186) becomes:

$$\$\mu_{(L+O)A} \cong \tag{187}$$
$$\$\mu_{(L+O)B} \sqrt{\left(\frac{\beta_{MB}}{\beta_{MA}}\right)} \left(1 + \left(\frac{\beta_{MA}}{(\$\mu_{(L+O)B})^2 \beta_{MB}\beta_{MA}}\right) D(\hat{p}_{Aj} \mid \hat{p}_{Bj}) - \beta_{MA} H_E \left(\frac{k_{MA} - k_{MB}}{(\$\mu_{(L+O)B})^2 \beta_{MB}\beta_{MA} k_{MA} k_{MB}}\right)\right)$$

$$\Delta\$EBITDA = \$\mu_{(L+O)A} - \$\mu_{(L+O)B} \tag{188}$$

$$\Delta\$EBITDA = \tag{189}$$
$$\$\mu_{(L+O)B} \sqrt{\left(\frac{\beta_{MB}}{\beta_{MA}}\right)} \left(1 + \left(\frac{1}{(\$\mu_{(L+O)B})^2 \beta_{MB}}\right) D(\hat{p}_{Aj} \mid \hat{p}_{Bj}) - H_E \left(\frac{k_{MA} - k_{MB}}{(\$\mu_{(L+O)B})^2 \beta_{MB} k_{MA} k_{MB}}\right)\right) - \$\mu_{(L+O)B}$$

Note that if $\beta_{MB}=\beta_{MA}$, and $k_{MA}=k_{MB}$, then (189) becomes identical to (65):

$$\Delta\$EBITDA = \$\mu_{(L+O)A} - \$\mu_{(L+O)B} =$$
$$\$\mu_{(L+O)B}\left(\left(\frac{1}{\beta_M}\right)\frac{D(\hat{p}_{Aj} \mid \hat{p}_{Bj})}{(\$\mu_{(L+O)B})^2}\right) = \left(\left(\frac{1}{\beta_M}\right)\frac{D(\hat{p}_{Aj} \mid \hat{p}_{Bj})}{(\$\mu_{(L+O)B})}\right)$$

The invention claimed is:

1. A system comprising:
   a collection of machine tool workstations used in a work process, wherein each workstation is associated with a set of performance parameters and one or more of the machine tool workstations comprise (i) a cutting tool, (ii) a drilling machine, (iii) a lathe, (iv) a boring machine or (v) a grinding machine;
   one or more data sensors, the one or more data sensors:
   in data communication with each other, and performing operations comprising:
      generating a set of sensor data, wherein the sensor data includes measured transit time information for items flowing through the work process,
      accessing a set of production control data for each workstation and a set of accounting data for the work process,
      calculating a standard deviation of the measured transit time information, and
      calculating an achievable minimum work in progress (WIP) for each workstation using current values of workstation performance parameters, comprising calculating an achievable minimum WIP for each workstation using $$W_{MIN} \cong \frac{SQm}{2(1 - X - m(\tilde{P}/(1 - M)))} + Q$$

wherein S represents the workstation setup time, Q represents the workstation number of different part numbers, m represents the units produced by the workstation per unit time, X represents the workstation scrap percentage, $\tilde{P}$ represents the workstation machining time per unit, and M represents the machine downtime;
      receiving input including (i) information identifying process improvement projects and corresponding predictive performance parameter values, and (ii) information identifying resources available for process improvement;
      for each workstation (i) determining an achievable minimum WIP using the corresponding predictive performance parameter values, and (ii) determining a reduction in minimum WIP based on the difference between the achievable minimum WIP for the current values of performance parameters and the predictive performance parameter values; and
      determining one or more process efficiency improvements associated with the determined reductions in minimum WIP, the accounting data and the calculated standard deviation.

2. The system of claim 1, wherein the one or more sensors in data communication with each other perform operations further comprising implementing one or more of the determined process efficiency improvements.

3. The system of claim 2, wherein:
   one or more of the determined process efficiency improvements comprises increasing a number of units produced per unit time by a cutting tool in the collection of machine tool workstations used in the work process; and
   implementing one or more of the determined process efficiency improvements comprises adjusting the feed rate of the cutting tool.

4. The system of claim 3, wherein adjusting the feed rate of the cutting tool comprises adjusting one or more of (i) a desired surface finish of an item processed by the cutting tool, (ii) power available to the cutting tool, (iii) threads per inch (TPI) for threading tools included in the cutting tool, or (iv) rigidity of the cutting tool.

5. The system of claim 1, wherein the performance parameters include one or more of setup time, number of different part numbers, units produced per unit time, scrap percentage, and machining time per unit, and machine downtime.

6. The system of claim 1, wherein the production control data is data relating to one or more of the performance parameters.

7. The system of claim 1, wherein the accounting data for the work process is data relating to overhead costs and labor costs for the work process.

8. The system of claim 1, wherein determining one or more process efficiency improvements associated with the determined reductions in minimum WIP, the accounting data and the calculated standard deviation comprises:
  determining a total WIP prior to a process efficiency improvement based on the set of sensor data;
  defining one or more histograms of K bins that represent, for one or more respective randomly selected items of WIP flowing through the work process, probability distributions that assign a probability to the velocities of the items;
  for each combination of determined reductions in minimum WIP for one or more corresponding workstations:
    subtracting the combined one or more determined reductions in minimum WIP for one or more corresponding workstations from the determined total WIP prior to process efficiency improvement;
    determining a process efficiency improvement using:

$$\text{process efficiency improvement} = \frac{\$\mu_{(L+O)B}\sigma_{\tau B}}{\sqrt{2}D(\hat{p}_{WA}|\hat{p}_{WB})}$$

wherein $\$\mu_{(L+O)B}$ represents labor and overhead expended per month prior to process efficiency improvement; $\sigma_{\tau B}$ represents the calculated standard deviation; D represents a relative entropy $$D(\hat{p}_{WA} | \hat{p}_{WB}) = \sum_{j=1}^{K} \hat{p}_{WAj} \log \frac{\hat{p}_{WAj}}{\hat{p}_{WBj}}, \text{ and}$$

$$\hat{p}_{WAj} = 1/2(n_{Bj}\bar{b}_j / W_B),\ \hat{p}_{WBj} = 1/2(n_{Aj}\bar{b}_j / W_A),$$

wherein $W_B$ represents the total WIP prior to process efficiency improvement, $W_A$ represents the total WIP prior to process efficiency improvement minus the combined one or more determined reductions in minimum WIP for one or more corresponding workstations, K is a number of histogram bins, $n_{Bj}\bar{b}_j$ represents an amount of WIP prior to process efficiency improvement in the j-th bin, and $n_{Aj}\bar{b}_j$ represents an amount of WIP prior to process efficiency improvement minus the combined one or more determined reductions in minimum WIP for one or more corresponding workstations in the j-th bin.

9. The system of claim 8, wherein $\hat{p}_{WA_j}$ and $\hat{p}_{WB_j}$ are distributed according to the Maxwell-Boltzmann distribution.

10. The system of claim 8, further comprising a thermodynamic model configured to determine the one or more process efficiency improvements for the process, the process efficiency improvements being derived from thermodynamic principles.

11. The system of claim 10, wherein the thermodynamic model includes a conversion factory β that is given by $$\left(\frac{1}{\beta}\right) = \$\mu_{(L+O)B}^2 \sigma_\tau \sqrt{2}$$

wherein $\$\mu_{(L+O)B}$ represents labor and overhead expended per month prior to process efficiency improvement, and $\sigma_{\tau B}$ represents the standard deviation of the measured transit time information prior to process improvement.

12. The system of claim 10, wherein the process efficiency improvement is derived from thermodynamic free energy.

13. The system of claim 10, wherein the thermodynamic model is derived from manufacturing entropy.

14. The system of claim 13, wherein the manufacturing entropy is derived from Little's Law and comprises a Shannon entropy and an entropy of scale.

15. The system of claim 14, wherein the thermodynamic model is derived from maximizing the Shannon entropy.

16. The system of claim 1, wherein calculating an achievable minimum work in progress (WIP) for each workstation comprises calculating an achievable minimum WIP for each workstation using $$W_{MIN} \cong \frac{SQm}{2(1 - X - m(\tilde{P}/(1-M)))} + Q + m\tau_t$$

wherein S represents the workstation setup time, Q represents the workstation number of different part numbers, m represents the units produced by the workstation per unit time, X represents the workstation scrap percentage, $\tilde{P}$ represents the workstation machining time per unit, M represents the machine downtime, and $\tau_t$ represents the average time WIP is in transit between workstations.

17. A computer implemented method, comprising:
  generating a set of sensor data, wherein the sensor data includes measured transit time information for items flowing through a work process;
  accessing a set of production control data for one or more machine tool workstations and a set of accounting data for the work process, wherein one or more of the machine tool workstations comprise (i) a cutting tool, (ii) a drilling machine, (iii) a lathe, (iv) a boring machine or (v) a grinding machine;
  calculating a standard deviation of the measured transit time information;
  calculating an achievable minimum work in progress (WIP) for at least one of the one or more workstations using current values of workstation performance parameters, comprising calculating an achievable minimum WIP for each workstation using $$W_{MIN} \cong \frac{SQm}{2(1 - X - m(\tilde{P}/(1-M)))} + Q$$

wherein S represents the workstation setup time, Q represents the workstation number of different part numbers, m represents the units produced by the workstation per unit time, X represents the workstation scrap percentage, $\tilde{P}$ represents the workstation machining time per unit, and M represents the machine downtime;
  receiving input including:
    information identifying process improvement projects and corresponding predictive performance parameter values, and
    information identifying resources available for process improvement;
  for the at least one of the one or more workstations:
    determining an achievable minimum WIP using the corresponding predictive performance parameter values, and
    determining a reduction in minimum WIP based on the difference between the achievable minimum WIP for the current values of performance parameters and the predictive performance parameter values; and determining one or more process efficiency improvements associated with the determined reductions in minimum WIP, the accounting data and the calculated standard deviation.

18. The method of claim 17, further comprising implementing one or more of the determined process efficiency improvements.

19. A computer-readable storage device encoded with a computer program, the program comprising instructions that, when executed by one or more computers, cause the one or more computers to perform operations comprising:

generating a set of sensor data, wherein the sensor data includes measured transit time information for items flowing through a work process;

accessing a set of production control data for one or more machine tool workstations and a set of accounting data for the work process, wherein one or more of the machine tool workstations comprise (i) a cutting tool, (ii) a drilling machine, (iii) a lathe, (iv) a boring machine or (v) a grinding machine;

calculating a standard deviation of the measured transit time information;

calculating an achievable minimum work in progress (WIP) for at least one of the one or more workstations using current values of workstation performance parameters, comprising calculating an achievable minimum WIP for each workstation using $$W_{MIN} \cong \frac{SQm}{2(1 - X - m(\tilde{P}/(1-M)))} + Q$$

wherein S represents the workstation setup time, Q represents the workstation number of different part numbers, m represents the units produced by the workstation per unit time, X represents the workstation scrap percentage, $\tilde{P}$ represents the workstation machining time per unit, and M represents the machine downtime;

receiving input including:
information identifying process improvement projects and corresponding predictive performance parameter values, and
information identifying resources available for process improvement;

for the at least one of the one or more workstations:
determining an achievable minimum WIP using the corresponding predictive performance parameter values, and
determining a reduction in minimum WIP based on the difference between the achievable minimum WIP for the current values of performance parameters and the predictive performance parameter values; and determining one or more process efficiency improvements associated with the determined reductions in minimum WIP, the accounting data and the calculated standard deviation.

* * * * *

UNITED STATES PATENT AND TRADEMARK OFFICE
CERTIFICATE OF CORRECTION

PATENT NO. : 10,054,929 B1
APPLICATION NO. : 15/056024
DATED : August 21, 2018
INVENTOR(S) : Michael L. George, Sr.

Page 1 of 1

It is certified that error appears in the above-identified patent and that said Letters Patent is hereby corrected as shown below:

In the Claims

At Column 65, Line 35 (Claim 8), replace "$\hat{\rho}_{WA_j} = 1/2(n_{Bj}\bar{b}_j/W_B), \hat{\rho}_{WB_j} = 1/2(n_{Aj}\bar{b}_j/W_A),$" with "$\hat{\rho}_{WA_i} = 1/2(n_{Bj}\bar{b}_j/W_B), \hat{\rho}_{WB_i} = 1/2(n_{Aj}\bar{b}_j/W_A),$".

At Column 65, Line 61 (Claim 11), replace "$\left(\frac{1}{\beta}\right) = \$\mu^2_{(L+O)B^{\sigma\tau}}\sqrt{2}$" with "$\left(\frac{1}{\beta}\right) = \$\mu_{(L+O)B^{2\tau}}\sqrt{2}$".

Signed and Sealed this
Twenty-seventh Day of August, 2019

Andrei Iancu
*Director of the United States Patent and Trademark Office*